US010673200B2

(12) United States Patent
Fujimaki et al.

(10) Patent No.: US 10,673,200 B2
(45) Date of Patent: Jun. 2, 2020

(54) EXCIMER LASER APPARATUS

(71) Applicant: Gigaphoton Inc., Tochigi (JP)

(72) Inventors: Yousuke Fujimaki, Oyama (JP); Hiroaki Tsushima, Oyama (JP); Hiroyuki Ikeda, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 44 days.

(21) Appl. No.: 15/973,846

(22) Filed: May 8, 2018

(65) Prior Publication Data

US 2018/0261973 A1    Sep. 13, 2018

Related U.S. Application Data

(63) Continuation of application No. PCT/JP2016/083147, filed on Nov. 8, 2016.

(30) Foreign Application Priority Data

Dec. 1, 2015   (WO) ................. PCT/JP2015/083708

(51) Int. Cl.
*H01S 3/134*     (2006.01)
*H01S 3/036*     (2006.01)
(Continued)

(52) U.S. Cl.
CPC .............. *H01S 3/134* (2013.01); *H01S 3/036* (2013.01); *H01S 3/038* (2013.01);
(Continued)

(58) Field of Classification Search
CPC ........ H01S 3/134; H01S 3/11; H01S 3/09702; H01S 3/038; H01S 3/036; H01S 3/1305; H01S 3/225; H01S 3/2366; H01S 3/08009
See application file for complete search history.

(56) References Cited

U.S. PATENT DOCUMENTS 5,710,787 A    1/1998   Amada et al.
5,982,800 A    11/1999   Ishihara et al.
(Continued)

FOREIGN PATENT DOCUMENTS

JP    H10-154842 A    6/1998
JP    H10-173262 A    6/1998
(Continued)

OTHER PUBLICATIONS

International Search Report issued in corresponding International Application No. PCT/JP2016/083147; dated Feb. 7, 2017.
(Continued)

*Primary Examiner* — Xinning(Tom) Niu
(74) *Attorney, Agent, or Firm* — Studebaker & Brackett PC

(57) ABSTRACT

An excimer laser apparatus may include an optical resonator, a chamber including a pair of discharge electrodes, the chamber being provided in the optical resonator and configured to store laser gas, an electric power source configured to receive a trigger signal and apply a pulsed voltage to the pair of discharge electrodes based on the trigger signal, an energy monitor configured to measure pulse energy of a pulse laser beam outputted from the optical resonator, a unit for adjusting partial pressure of halogen gas configured to perform exhausting a part of the laser gas stored in the chamber and supplying laser gas to the chamber, and a controller configured to acquire measurement results of the pulse energy measured by the energy monitor, detect energy depression based on the measurement results of the pulse energy, and control the unit for adjusting partial pressure of halogen gas based on results of detecting the energy depression to adjust the partial pressure of halogen gas in the chamber.

15 Claims, 52 Drawing Sheets

(51) Int. Cl.
*H01S 3/038* (2006.01)
*H01S 3/097* (2006.01)
*H01S 3/11* (2006.01)
H01S 3/225 (2006.01)
H01S 3/23 (2006.01)
H01S 3/08 (2006.01)
H01S 3/13 (2006.01)

(52) U.S. Cl.
CPC .......... *H01S 3/09702* (2013.01); *H01S 3/11* (2013.01); *H01S 3/08009* (2013.01); *H01S 3/1305* (2013.01); *H01S 3/225* (2013.01); *H01S 3/2366* (2013.01)

(56) References Cited

U.S. PATENT DOCUMENTS

| | | | |
|---|---|---|---|
| 6,330,261 | B1 | 12/2001 | Ishihara et al. |
| 6,366,039 | B1 | 4/2002 | Sekiguchi et al. |
| 6,490,307 | B1 | 12/2002 | de Mos et al. |
| 2007/0273852 | A1* | 11/2007 | Arai ............... G03F 7/7005 355/44 |
| 2015/0003485 | A1 | 1/2015 | Abe et al. |
| 2016/0248214 | A1 | 8/2016 | Kurosu et al. |
| 2016/0254634 | A1* | 9/2016 | Asayama ............. H01S 3/134 372/38.04 |
| 2016/0359291 | A1 | 12/2016 | Asayama et al. |

FOREIGN PATENT DOCUMENTS

| | | |
|---|---|---|
| JP | 2000-294857 A | 10/2000 |
| JP | 2000-306813 A | 11/2000 |
| JP | 2002-502134 A | 1/2002 |
| JP | 2008-235646 A | 10/2008 |
| JP | 2010-109195 A | 5/2010 |
| WO | 99/39414 A1 | 8/1999 |
| WO | 2015/068205 A1 | 5/2015 |
| WO | 2015/097790 A1 | 7/2015 |
| WO | 2015/140930 A1 | 9/2015 |

OTHER PUBLICATIONS

International Preliminary Report on Patentability issued in corresponding International Application No. PCT/JP2016/083147; dated Jun. 5, 2018.

International Search Report issued in corresponding International Application No. PCT/JP2015/083708; dated Feb. 23, 2016.

International Preliminary Report on Patentability issued in corresponding International Application No. PCT/JP2015/083708; dated Jun. 5, 2018.

An Office Action mailed by the State Intellectual Property Office of the People's Republic of China dated Nov. 5, 2019, which corresponds to Chinese Patent Application No. CN201680063144.9 and is related to U.S. Appl. No. 15/973,846.

* cited by examiner

Normal situation

Situation where deterioration of electrodes has proceeded

EXCIMER LASER APPARATUS

TECHNICAL FIELD

The present disclosure relates to an excimer laser apparatus.

BACKGROUND ART

The recent miniaturization and the increased levels of integration of semiconductor integrated circuits have led to a demand for increasing in a resolution of semiconductor exposure apparatuses. A semiconductor exposure apparatus is hereinafter referred to simply as "exposure apparatus". Accordingly, exposure light sources to emit light at shorter wavelengths have been under development. As the exposure light sources, gas laser apparatuses instead of conventional mercury lamps are typically used. The gas laser apparatuses for exposure include a KrF excimer laser apparatus that emits an ultraviolet laser beam at a wavelength of 248 nm and an ArF excimer laser apparatus that emits an ultraviolet laser beam at a wavelength of 193 nm.

As an advanced exposure technology, immersion exposure has been put into practical use. In the immersion exposure, a gap between an exposure lens and a wafer in an exposure apparatus is filled with a fluid such as water. The immersion exposure allows the refractive index of the gap to be changed and thus an apparent wavelength of the light from the exposure light source is shortened. The immersion exposure using an ArF excimer laser apparatus as an exposure light source allows a wafer to be irradiated with ultraviolet light having a wavelength in water of 134 nm. This technology is referred to as "ArF immersion exposure" or "ArF immersion lithography".

Spectral line widths of KrF and ArF excimer laser apparatuses in natural oscillation are as wide as approximately 350 pm to 400 pm. This may cause chromatic aberration by using exposure lenses that are made of a material that transmits ultraviolet light such as KrF and ArF laser beams. The chromatic aberration thus causes a reduction in resolution. Accordingly, the spectral line width of the laser beam outputted from the gas laser apparatus needs to be narrowed to such an extent that the chromatic aberration can be ignored. To narrow the spectral line width, a laser resonator of a gas laser apparatus may be equipped with a line narrow module (LNM) having a line narrow element. The line narrow element may be an etalon, a grating, or the like. A laser apparatus whose spectral line width is narrowed is hereinafter referred to as "line narrowed laser apparatus".

Patent Document 1: International Publication No. WO2015/068205 A
Patent Document 2: Japanese Patent Application Publication No. 2000-306813 A
Patent Document 3: U.S. Pat. No. 6,330,261 B

SUMMARY

An aspect of the present disclosure may be related to an excimer laser apparatus that includes an optical resonator, a chamber including a pair of discharge electrodes, the chamber being provided in the optical resonator and configured to store laser gas, an electric power source configured to receive a trigger signal and apply a pulsed voltage to the pair of discharge electrodes based on the trigger signal, an energy monitor configured to measure pulse energy of a pulse laser beam outputted from the optical resonator, a unit for adjusting partial pressure of halogen gas configured to perform exhausting a part of the laser gas stored in the chamber and supplying laser gas to the chamber, and a controller configured to acquire measurement results of the pulse energy measured by the energy monitor, detect energy depression based on the measurement results of the pulse energy, and control the unit for adjusting partial pressure of halogen gas based on results of detecting the energy depression to adjust the partial pressure of halogen gas in the chamber.

Another aspect of the present disclosure may be related to an excimer laser apparatus that includes an optical resonator, a chamber including a pair of discharge electrodes, the chamber being provided in the optical resonator and configured to store laser gas, a fan configured to circulate the laser gas in the chamber, an electric power source configured to receive a trigger signal and apply a pulsed voltage to the pair of discharge electrodes based on the trigger signal, an energy monitor configured to measure pulse energy of a pulse laser beam outputted from the optical resonator, and a controller configured to perform a first mode to allow the pulse laser beam outputted from the optical resonator to be outputted outside of the excimer laser apparatus with a rotating speed of the fan being set to a first rotating speed, and a second mode to acquire the measurement results of the pulse energy measured by the energy monitor with a rotating speed of the fan being set to a second rotating speed lower than the first rotating speed, and to detect energy depression based on the measurement results of the pulse energy.

Another aspect of the present disclosure may be related to an excimer laser apparatus that includes a first optical resonator, a first chamber including a first pair of discharge electrodes, provided in the first optical resonator and configured to store laser gas, a first electric power source configured to receive a first trigger signal and apply a pulsed voltage to the first pair of discharge electrodes based on the first trigger signal, a first energy monitor configured to measure first pulse energy of a first pulse laser beam outputted from the first optical resonator, a second optical resonator to which the first pulse laser beam enters, a second chamber including a second pair of discharge electrodes, provided in the second optical resonator and configured to store laser gas, a second electric power source configured to receive a second trigger signal and apply a pulsed voltage to the second pair of discharge electrodes based on the second trigger signal, a second energy monitor configured to measure second pulse energy of a second pulse laser beam outputted from the second optical resonator, a unit for adjusting partial pressure of halogen gas configured to perform exhausting a part of the laser gas stored in the first chamber and supplying laser gas to the first chamber, and exhausting a part of the laser gas stored in the second chamber and supplying laser gas to the second chamber, and a controller configured to detect energy depression of the first chamber based on the measurement results of the first pulse energy measured by the first energy monitor, and control the unit for adjusting partial pressure of halogen gas based on results of detecting the energy depression of the first chamber to adjust the partial pressure of halogen gas in the first chamber, and detect energy depression of the second chamber based on the measurement results of the second pulse energy measured by the second energy monitor, and control the unit for adjusting partial pressure of halogen gas based on results of detecting the energy depression of the second chamber to adjust the partial pressure of halogen gas in the second chamber.

BRIEF DESCRIPTION OF DRAWINGS

Embodiments of the present disclosure will be described below as mere examples with reference to the attached drawings.

DESCRIPTION OF EMBODIMENTS

Figure 1:
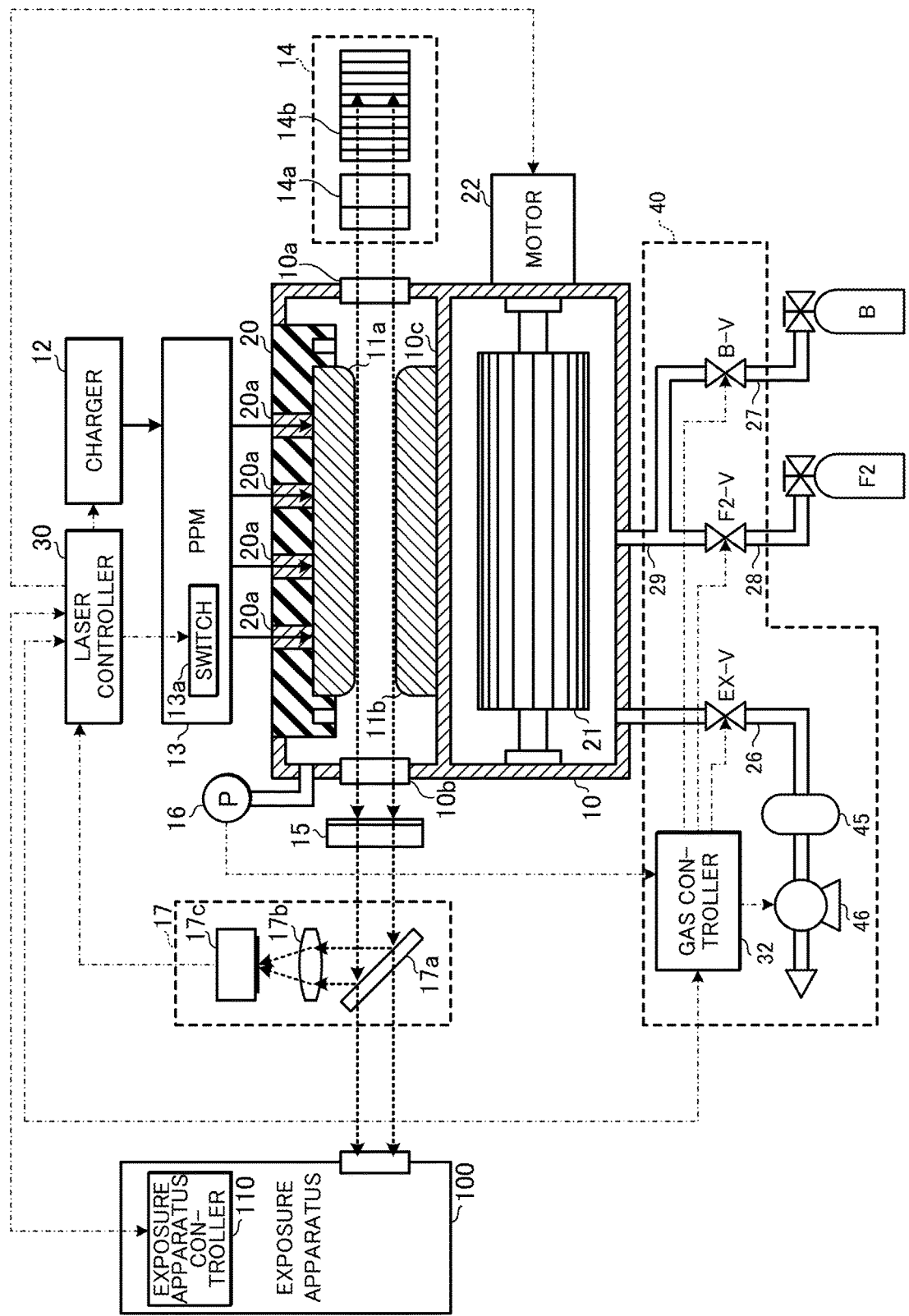
FIG. 1 schematically shows a configuration of an excimer laser apparatus according to a comparative example.

Contents
1. Summary
2. Excimer Laser Apparatus of Comparative Example
   2.1 Configuration
      2.1.1 Laser Oscillation System
      2.1.2 Laser Gas Control System
   2.2 Operation
      2.2.1 Operation of Laser Oscillation System
      2.2.2 Energy Control
      2.2.3 Laser Gas Control
         2.2.3.1 Total Gas Replacement
         2.2.3.2 Gas Pressure Control
         2.2.3.3 Measurement of the Number of Pulses
         2.2.3.4 Partial Gas Replacement
   2.3 Problem
3. Excimer Laser Apparatus to Detect Energy Depression and Adjust Partial Pressure of Halogen Gas
   3.1 Configuration
   3.2 Operation
      3.2.1 Detecting Energy Depression
         3.2.1.1 First Example of Process to Count the Number of Times Nd of Detecting Energy Depression
         3.2.1.2 Second Example of Process to Count the Number of Times Nd of Detecting Energy Depression
         3.2.1.3 Third Example of Process to Count the Number of Times Nd of Detecting Energy Depression
         3.2.1.4 Fourth Example of Process to Count the Number of Times Nd of Detecting Energy Depression
      3.2.2 Laser Gas Control Including Control for Reducing Energy Depression
         3.2.2.1 Gas Pressure Control
         3.2.2.2 Control for Reducing Energy Depression
            3.2.2.2.1 First Example of Control of Decreasing Partial Pressure of Halogen Gas
            3.2.2.2.2 Second Example of Control of Decreasing Partial Pressure of Halogen Gas
   3.3 Others
   3.4 Effect
4. Excimer Laser Apparatus to Detect Energy Depression with Reduced Rotating Speed of Fan
   4.1 Configuration
   4.2 Operation
      4.2.1 Control for Reducing Energy Depression
         4.2.1.2 Calculating Energy Depression Index ED
         4.2.1.3 Reading Energy Depression Index ED
   4.3 Effect
5. Excimer Laser Apparatus Including Laser Oscillator and Laser Amplifier
   5.1 Configuration
      5.1.1 Laser Oscillator
      5.1.2 Laser Amplifier
      5.1.3 Pipes
   5.2 Operation
      5.2.1 First Example of Process to Detect Energy Depression
         5.2.1.1 Example of Process to Count the Number of Times of Detecting Energy Depression
         5.2.1.2 Example of Process to Set Energy Depression Flag
      5.2.2 Second Example of Process to Detect Energy Depression
      5.2.3 Energy Control
      5.2.4 Laser Gas Control Including Control for Reducing Energy Depression
         5.2.4.1 Total Gas Replacement
         5.2.4.2 Gas Pressure Control
         5.2.4.3 Measurement of the Number of Pulses
         5.2.4.4 Partial Gas Replacement
         5.2.4.5 First Example of Control for Reducing Energy Depression
         5.2.4.6 Second Example of Control for Reducing Energy Depression
         5.2.4.7 Example of Control of Decreasing Partial Pressure of Halogen Gas
         5.2.4.8 Third Example of Control for Reducing Energy Depression
            5.2.4.8.1 Calculating Energy Depression Index ED
            5.2.4.8.2 Reading Energy Depression Index ED
   5.3 Effect
6. Configuration of Controller Embodiments of the present disclosure will be described in detail below with reference to the drawings. The embodiments described below show examples of the present disclosure and do not intend to limit the content of the present disclosure. Not all of the configurations and operations described in each embodiment are indispensable in the present disclosure. Identical reference symbols may be assigned to identical constituent elements and redundant descriptions thereof may be omitted.

1. Summary

An embodiment of the present disclosure may be related to an excimer laser apparatus. The excimer laser apparatus may include an optical resonator and a chamber provided in the optical resonator. The chamber may include a pair of discharge electrodes and store laser gas. Applying pulsed voltage to the pair of discharge electrodes may cause the laser gas to be excited and cause a pulse laser beam to be outputted.

The excimer laser apparatus of the embodiment of the present disclosure may detect an energy depression and adjust the partial pressure of halogen gas in the chamber based on the detected energy depression. The adjustment of the partial pressure of halogen gas may include decreasing the partial pressure of halogen gas. Decreasing the partial pressure of halogen gas may suppress the occurrence of the energy depression.

The excimer laser apparatus of the embodiment of the present disclosure may execute a first mode to output a stable pulse laser beam to an exposure apparatus. The excimer laser apparatus may further execute a second mode to detect the energy depression. The first mode may be performed with a high rotating speed of a cross-flow fan. The second mode may be performed with a low rotating speed of the cross-flow fan. The low rotating speed of the cross-flow fan may cause the energy depression to be detected in a short term.

2. Excimer Laser Apparatus of Comparative Example 2.1 Configuration

FIG. 1 schematically shows a configuration of an excimer laser apparatus according to a comparative example.

The excimer laser apparatus may be used with an exposure apparatus 100. A laser beam outputted from a chamber 10 of the excimer laser apparatus may enter the exposure apparatus 100. The exposure apparatus 100 may include an exposure apparatus controller 110. The exposure apparatus controller 110 may control the exposure apparatus 100. The exposure apparatus controller 110 may send, to a laser controller 30 included in the excimer laser apparatus, setting data of a target value of the pulse energy or an oscillation trigger signal.

The excimer laser apparatus in FIG. 1 may include a laser oscillation system, the laser controller 30, and a laser gas control system 40. The laser oscillation system may include the chamber 10, a charger 12, a pulse power module 13, a line narrow module 14, an output coupling mirror 15, a chamber pressure sensor 16, an energy monitor 17, a cross-flow fan 21, and a motor 22.

The laser controller 30 may integrally control the entire excimer laser apparatus. The laser controller 30 may receive measured data from the energy monitor 17.

2.1.1 Laser Oscillation System

The chamber 10 included in the laser oscillation system may be provided in an optical path of a laser resonator configured by the line narrow module 14 and the output coupling mirror 15. The chamber 10 may have two windows 10a and 10b. The chamber 10 may store a pair of discharge electrodes 11a and 11b. The chamber 10 may store laser gas.

The chamber 10 may have an opening that is covered by an insulating member 20. The electrode 11a may be supported by the insulating member 20. The electrode 11b may be supported by a partitioning plate 10c of the chamber 10. Conductive members 20a may be molded in the insulating member 20. The conductive members 20a may apply high voltage supplied from the pulse power module 13 to the electrode 11a.

The partitioning plate 10c may separate incompletely the interior of the chamber 10. Unillustrated gaps may be provided behind and in front of the section of the partitioning plate 10c shown in FIG. 1.

The cross-flow fan 21 may be provided in the chamber 10. In the present disclosure, the cross-flow fan 21 may be referred to simply as the fan. A rotating shaft of the cross-flow fan 21 may be connected to the motor 22 provided outside of the chamber 10. The motor 22 may rotate the cross-flow fan 21 according to a control signal from the laser controller 30. Rotating the cross-flow fan 21 may cause the laser gas to be circulated in the chamber 10.

The charger 12 may hold electric energy to be supplied to the pulse power module 13. The pulse power module 13 may include a switch 13a. The pulse power module 13 may apply a pulsed voltage across the pair of discharge electrodes 11a and 11b.

The line narrow module 14 may include a prism 14a and a grating 14b. However, the line narrow module 14 may be replaced by a high-reflective mirror. The output coupling mirror 15 may be configured by a partially reflective mirror.

The chamber pressure sensor 16 may measure the pressure of the laser gas in the chamber 10. The pressure of the laser gas measured by the chamber pressure sensor 16 may be the total pressure of the laser gas. The chamber pressure sensor 16 may send measured data on the pressure to a gas controller 32 included in the laser gas control system 40.

The energy monitor 17 may include a beam splitter 17a, a focusing lens 17b, and an optical sensor 17c. The beam splitter 17a may be provided in the optical path of the laser beam outputted from the output coupling mirror 15. The beam splitter 17a may transmit a part of the laser beam outputted from the output coupling mirror 15 to the exposure apparatus 100 at a high transmittance. The beam splitter 17a may reflect another part of the laser beam. The focusing lens 17b and the optical sensor 17c may be provided in the optical path of the laser beam reflected by the beam splitter 17a. The focusing lens 17b may concentrate the laser beam reflected by the beam splitter 17a on the photosensitive surface of the optical sensor 17c. The optical sensor 17c may send an electric signal according to the pulse energy of the laser beam concentrated by the focusing lens 17b as the measured data to the laser controller 30.

2.1.2 Laser Gas Control System

The laser gas control system 40 included in the excimer laser apparatus may include a gas supply device, an exhausting device, and the gas controller 32. The gas controller 32 may send and receive signals to and from the laser controller 30. The gas controller 32 may receive the measured data outputted from the chamber pressure sensor 16.

The gas supply device in the laser gas control system 40 may include pipes 27, 28, and 29, and valves B-V and F2-V.

The pipe 28 may be connected to a halogen-containing gas supply source F2. The pipe 29 may be connected to the chamber 10. The pipe 28 may be connected to the pipe 29. This may allow the halogen-containing gas supply source F2 to supply halogen-containing gas to the chamber 10. The halogen-containing gas supply source F2 may be a gas cylinder that stores laser gas including fluorine. The halogen-containing gas may be a laser gas in which fluorine gas, argon gas, and neon gas are mixed.

The valve F2-V may be provided in the pipe 28. Supplying the halogen-containing gas from the halogen-containing gas supply source F2 via the pipe 29 to the chamber 10 may be controlled by opening and closing the valve F2-V. The opening and closing of the valve F2-V may be controlled by the gas controller 32.

The pipe 27 may be connected between the buffer gas supply source B and the pipe 29. The pipe 27 may be connected to the pipe 29. This may allow the buffer gas supply source B to supply buffer gas to the chamber 10. The buffer gas may be a laser gas including argon gas and neon gas. The buffer gas may not necessarily include halogen gas. Alternatively, the buffer gas may include halogen gas at a concentration lower than the concentration of halogen gas in the halogen-containing gas supplied from the halogen-containing gas supply source F2.

The valve B-V may be provided in the pipe 27. Supplying the buffer gas from the buffer gas supply source B via the pipe 29 to the chamber 10 may be controlled by opening and closing the valve B-V. The opening and closing of the valve B-V may be controlled by the gas controller 32.

The exhausting device in the laser gas control system 40 may include a pipe 26, a valve EX-V, a halogen gas trap 45, and an exhaust pump 46.

The pipe 26 may be connected between the chamber 10 and an unillustrated exhaust gas treating device or the like outside the laser gas control system 40. The pipe 26 may allow emission gas emitted from the chamber 10 to be exhausted to the outside of the laser gas control system 40.

The valve EX-V, the halogen gas trap 45, and the exhaust pump 46 may be provided in the pipe 26. The valve EX-V, the halogen gas trap 45, and the exhaust pump 46 may be arranged in this order from the position near the chamber 10. Supplying the emission gas from the chamber 10 to the halogen gas trap 45 may be controlled by opening and closing the valve EX-V. The opening and closing of the valve EX-V may be controlled by the gas controller 32.

The halogen gas trap 45 may catch halogen gas included in the emission gas emitted from the chamber 10. Treating agent to catch the halogen gas may be, for example, activated carbon.

When the valve EX-V is open, the exhaust pump 46 may forcibly exhaust the laser gas to decrease the pressure in the chamber 10 to a value equal to or lower than the atmospheric pressure. The operation of the exhaust pump 46 may be controlled by the gas controller 32.

2.2 Operation 2.2.1 Operation of Laser Oscillation System

The laser controller 30 may receive the setting data on the target value of the pulse energy and the oscillation trigger signal from the exposure apparatus controller 110. The laser controller 30 may send setting data of charging voltage to the charger 12 based on the setting data of the target value of the pulse energy received from the exposure apparatus controller 110. The laser controller 30 may further send a trigger signal to the switch 13a included in the pulse power module (PPM) 13 based on the oscillation trigger signal received from the exposure apparatus controller 110.

Upon receiving the trigger signal from the laser controller 30, the switch 13a in the pulse power module 13 may be turned ON. The pulse power module 13, in which the switch 13a is turned ON, may generate a pulsed high voltage from the electric energy charged in the charger 12. The pulse power module 13 may apply the high voltage across the pair of discharge electrodes 11a and 11b.

Applying the high voltage across the pair of discharge electrodes 11a and 11b may cause an electric discharge between the pair of discharge electrodes 11a and 11b. The energy of the electric discharge may cause laser gas in the chamber 10 to be excited and shift to a high energy level. The excited laser gas may then shift back to a low energy level to emit light having a wavelength according to the difference in the energy level.

The light generated in the chamber 10 may be emitted via the windows 10a and 10b to the outside of the chamber 10. The light emitted via the window 10a of the chamber 10 may be expanded by the prism 14a and be incident on the grating 14b. The light incident on the grating 14b from the prism 14a may be reflected by a plurality of grooves of the grating 14b to be diffracted in directions according to the wavelength of the light. The grating 14b may be in a Littrow arrangement such that the angle of incidence of the light incident on the grating 14b from the prism 14a and the angle of diffraction of the diffracted light having a desired wavelength substantially coincide with each other. This may allow the light around the desired wavelength to be returned via the prism 14a to the chamber 10.

The output coupling mirror 15 may transmit and output a part of the light emitted via the window 10b of the chamber 10. The output coupling mirror 15 may reflect and return another part to the chamber 10.

The light thus emitted from the chamber 10 may reciprocate between the line narrow module 14 and the output coupling mirror 15. The light may be amplified each time it passes through the electric discharge space sandwiched between the pair of discharge electrodes 11a and 11b, causing laser oscillation. The light may also be narrow-banded each time it is returned by the line narrow module 14. The light thus amplified and narrow-banded may be outputted from the output coupling mirror 15 as a laser beam.

The energy monitor 17 may detect the pulse energy of the laser beam outputted from the output coupling mirror 15. The energy monitor 17 may send data on the detect pulse energy to the laser controller 30.

The laser controller 30 may perform a feedback control of the charging voltage to be set to the charger 12. The feedback control may be based on the measured data of the pulse energy received from the energy monitor 17 and the setting data of the target value of the pulse energy received from the exposure apparatus controller 110.

2.2.2 Energy Control

Figure 2:
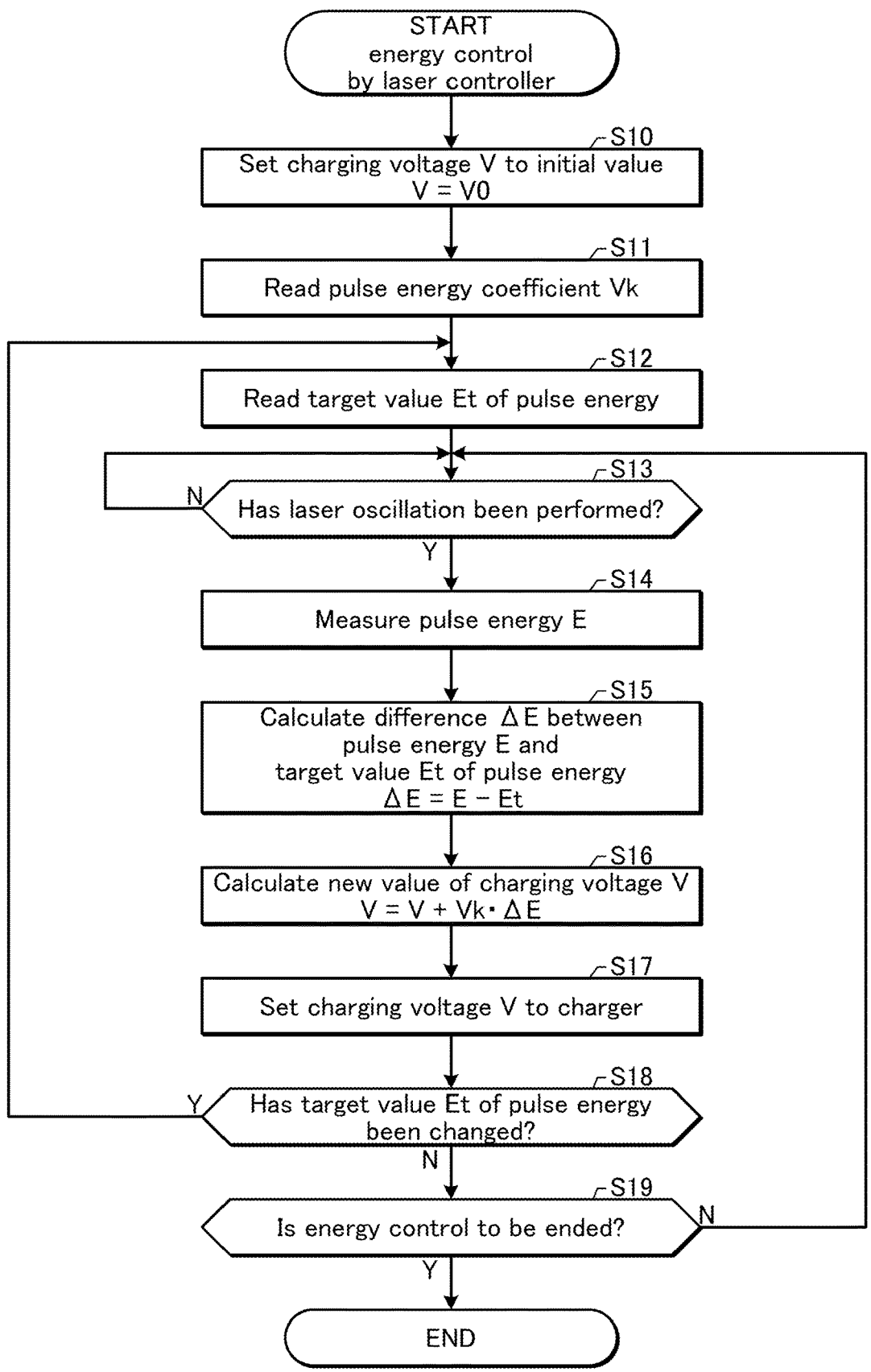
FIG. 2 is a flowchart showing an energy control performed by a laser controller 30 of the excimer laser apparatus of the comparative example.

FIG. 2 is a flowchart showing an energy control performed by a laser controller 30 of the excimer laser apparatus of the comparative example. The laser controller 30 may perform the following process to keep the pulse energy of the output pulse laser beam in the vicinity of the target value of the pulse energy.

First, at S10, the laser controller 30 may set the charging voltage V to an initial value V0. The initial value V0 may be a value to cause an electric discharge between the pair of discharge electrodes 11a and 11b and output of a pulse laser beam from the chamber 10.

Next, at S11, the laser controller 30 may read a pulse energy coefficient Vk from a storage device. The pulse energy coefficient Vk may be a coefficient for calculating an amount of change in the charging voltage V to change the pulse energy by $\Delta E$. The storage device may be a memory 1002 described below with reference to FIG. 56.

Next, at S12, the laser controller 30 may read a target value Et of the pulse energy from the storage device. The target value Et of the pulse energy may be a value set by the exposure apparatus 100.

Next, at S13, the laser controller 30 may determine whether a laser oscillation has been performed. This determination may be made based on whether the laser controller 30 has outputted the trigger signal to the switch 13a of the pulse power module 13. If the laser oscillation has not been performed, the laser controller 30 may wait until the laser oscillation is performed. If the laser oscillation has been performed, the laser controller 30 may proceed to S14.

At S14, the laser controller 30 may measure the pulse energy E based on the output from the energy monitor 17.

Next, at S15, the laser controller 30 may calculate a difference $\Delta E$ between the pulse energy E measured at S14 and the target value Et of the pulse energy read at S12 by the following formula.

$$\Delta E = E - Et$$

Next, at S16, the laser controller 30 may calculate a new value of charging voltage V based on the present value of charging voltage V by the following formula to update the charging voltage V. The new value of charging voltage V may be a value to allow the pulse energy E to approach the target value Et of the pulse energy.

$$V = V + Vk * \Delta E$$

Next, at S17, the laser controller 30 may set the charging voltage V calculated at S16 to the charger 12.

Next, at S18, the laser controller 30 may determine whether the target value Et of the pulse energy has been changed. If the target value Et of the pulse energy has been changed, the laser controller 30 may return to S12. If the target value Et of the pulse energy has not been changed, the laser controller 30 may proceed to S19.

At S19, the laser controller 30 may determine whether the energy control is to be ended. If the energy control is not to be ended, the laser controller 30 may return to S13. If the energy control is to be ended, the laser controller 30 may end the process of this flowchart.

2.2.3 Laser Gas Control

Figure 3:
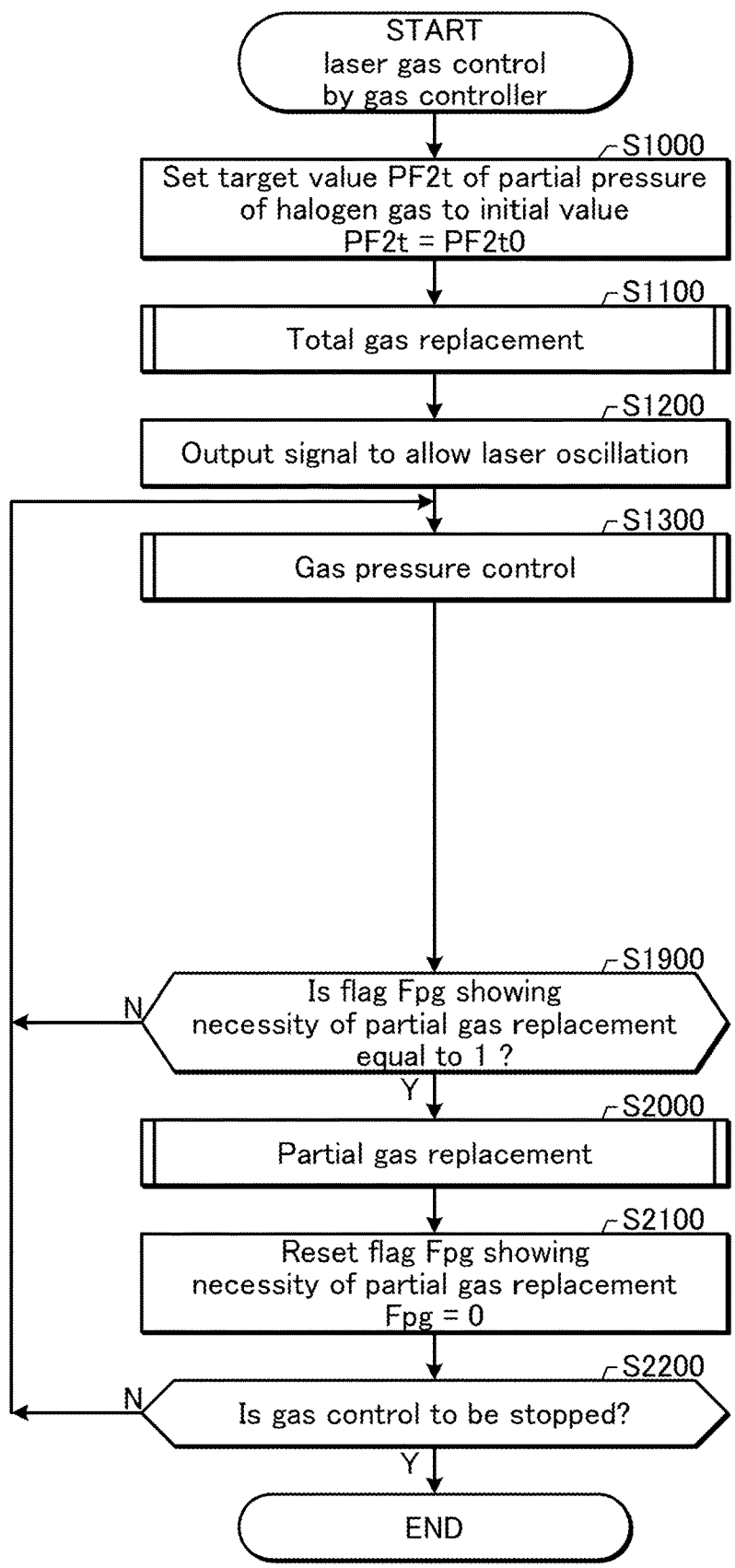
FIG. 3 is a flowchart showing a process of a laser gas control performed by a gas controller 32 in the excimer laser apparatus of the comparative example.

FIG. 3 is a flowchart showing a process of a laser gas control performed by the gas controller 32 in the excimer laser apparatus of the comparative example. The gas controller 32 may perform the following process to execute a total gas replacement, a gas pressure control, and a partial gas replacement.

First, at S1000, the gas controller 32 may set a target value PF2t of the partial pressure of halogen gas to an initial value PF2t0. The initial value PF2t0 may be a value where the laser gas is excited by the electric discharge between the pair of discharge electrodes 11a and 11b to cause a pulse laser beam to be outputted from the chamber 10. The initial value PF2t0 may be in a range from 0.13 kPa to 0.18 kPa.

Next, at S1100, the gas controller 32 may control the laser gas control system 40 to perform the total gas replacement. The total gas replacement may be performed such that the partial pressure of halogen gas in the chamber 10 is adjusted to the initial value PF2t0 that has been set. Details of the total gas replacement will be described below with reference to FIG. 4.

Next, at S1200, the gas controller 32 may output a signal to allow laser oscillation to the laser controller 30. Upon receiving the signal to allow laser oscillation, the laser controller 30 may determine that the gas condition in the chamber 10 is completed and allow the excimer laser apparatus to start outputting the pulse laser beam.

Next, at S1300, the gas controller 32 may control the laser gas control system 40 to perform the gas pressure control based on the charging voltage V. Details of the gas pressure control will be described below with reference to FIG. 5.

Next, at S1900, the gas controller 32 may determine whether a flag Fpg showing the necessity of the partial gas replacement is 1. The flag Fpg may represent whether it is necessary to perform the partial gas replacement. The flag Fpg will be described below with reference to FIG. 6. If the flag Fpg is 1, the gas controller 32 may proceed to S2000. If the flag Fpg is not 1, the gas controller 32 may return to S1300.

At S2000, the gas controller 32 may control the laser gas control system 40 to perform the partial gas replacement. Details of the partial gas replacement will be described with reference to FIG. 7.

Next, at S2100, the gas controller 32 may reset the flag Fpg showing the necessity of the partial gas replacement to 0.

Next, at S2200, the gas controller 32 may determine whether the gas control is to be stopped. If the gas control is not to be stopped, the gas controller 32 may return to S1300. If the gas control is to be stopped, the gas controller 32 may end the process of this flowchart.

2.2.3.1 Total Gas Replacement

Figure 4:
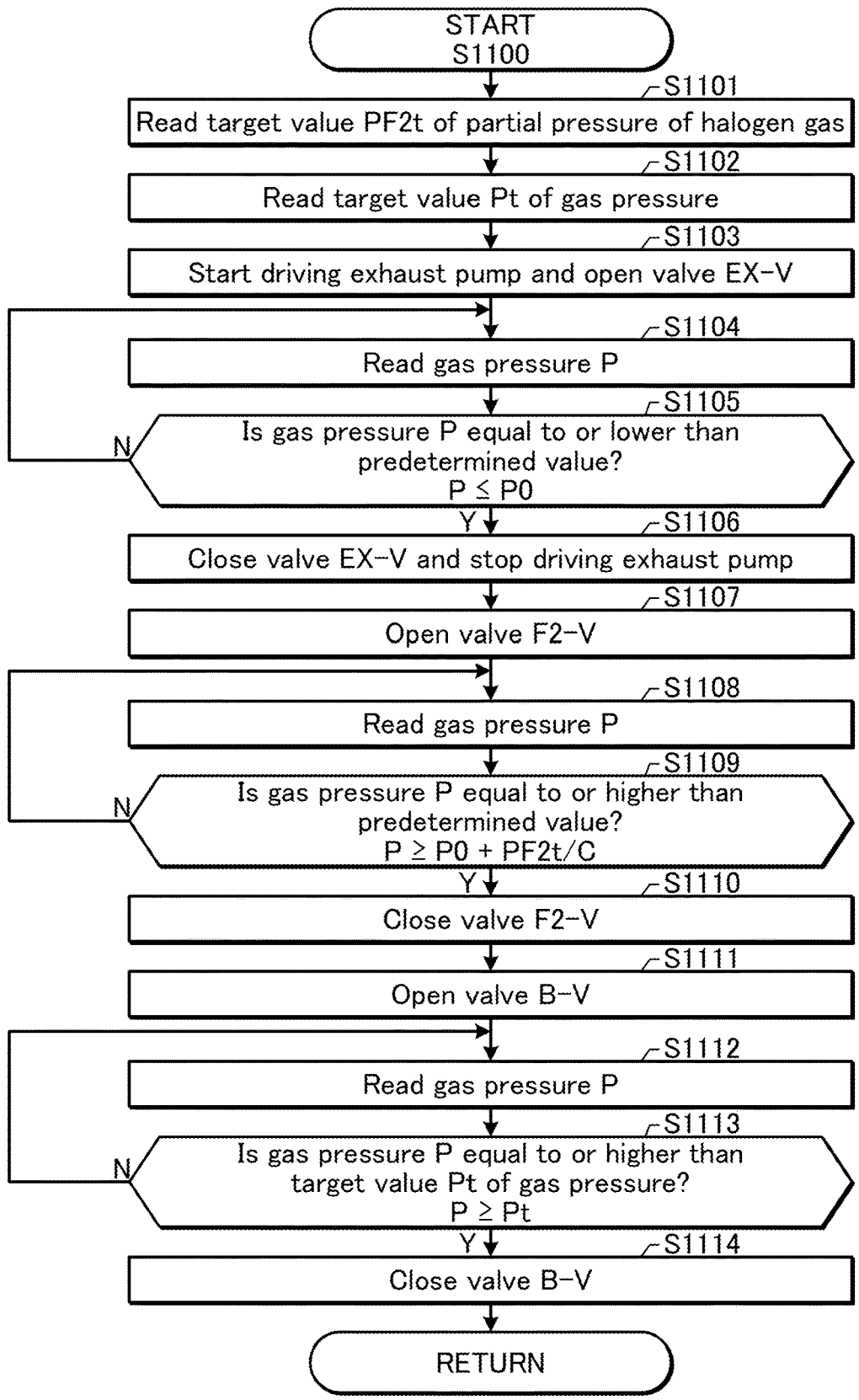
FIG. 4 is a flowchart showing details of a total gas replacement shown in FIG. 3.

FIG. 4 is a flowchart showing details of the total gas replacement shown in FIG. 3. The process of FIG. 4 may be performed by the gas controller 32 as a subroutine of S1100 shown in FIG. 3.

First, at S1101, the gas controller 32 may read the target value PF2t of the partial pressure of halogen gas from a storage device. The target value PF2t of the partial pressure of halogen gas may be the value set at S1000 in FIG. 3.

Next, at S1102, the gas controller 32 may read a target value Pt of the gas pressure from a storage device. The target value Pt of the gas pressure may be a value where the laser gas is excited by the electric discharge between the pair of discharge electrodes 11a and 11b to cause a pulse laser beam to be outputted from the chamber 10.

Next, at S1103, the gas controller 32 may start driving the exhaust pump 46 and open the valve EX-V. Exhausting the laser gas in the chamber 10 may thus start.

Next, at S1104, the gas controller 32 may read the gas pressure P in the chamber 10 from the chamber pressure sensor 16.

Next, at S1105, the gas controller 32 may determine whether the gas pressure P is equal to or lower than a predetermined value P0. The predetermined value PO may be equal to or lower than the atmospheric pressure. The predetermined value PO may be in a range from 10 hPa to 50 hPa. If the gas pressure P is higher than the predetermined value P0 (S1105: NO), the gas controller 32 may return to S1104. If the gas pressure P is equal to or lower than the predetermined value PO (S1105: YES), the gas controller 32 may proceed to S1106.

At S1106, the gas controller 32 may close the valve EX-V and stop driving the exhaust pump 46.

Next, at S1107, the gas controller 32 may open the valve F2-V. Injecting the halogen-containing gas into the chamber 10 may thus start.

Next, at S1108, the gas controller 32 may read the gas pressure P in the chamber 10 from the chamber pressure sensor 16.

Next, at S1109, the gas controller 32 may determine whether the gas pressure P is equal to or higher than a predetermined value P0+PF2t/C. Here, PF2t may be the target value of the partial pressure of halogen gas. C may be the halogen gas concentration in the halogen-containing gas at volume ratio. Injecting the halogen-containing gas into the chamber 10 until the gas pressure P reaches the predetermined value P0+PF2t/C may cause the partial pressure of halogen gas in the chamber 10 to be in the vicinity of the target value of the partial pressure of halogen gas.

If the gas pressure P is lower than the predetermined value P0+PF2t/C (S1109: NO), the gas controller 32 may return to S1108. If the gas pressure P is equal to or higher than the predetermined value P0+PF2t/C (S1109: YES), the gas controller 32 may proceed to S1110.

At S1110, the gas controller 32 may close the valve F2-V.

Next, at S1111, the gas controller 32 may open the valve B-V. Injecting the buffer gas into the chamber 10 may thus start.

Next, at S1112, the gas controller 32 may read the gas pressure P in the chamber 10 from the chamber pressure sensor 16.

Next, at S1113, the gas controller 32 may determine whether the gas pressure P is equal to or higher than the target value Pt of the gas pressure. If the gas pressure P is lower than the target value Pt of the gas pressure (S1113: NO), the gas controller 32 may return to S1112. If the gas pressure P is equal to or higher than the target value Pt of the gas pressure (S1113: YES), the gas controller 32 may proceed to S1114.

At S1114, the gas controller 32 may close the valve B-V.

After S1114, the gas controller 32 may end the process of this flowchart and return to the process of FIG. 3.

2.2.3.2 Gas Pressure Control

Figure 5:
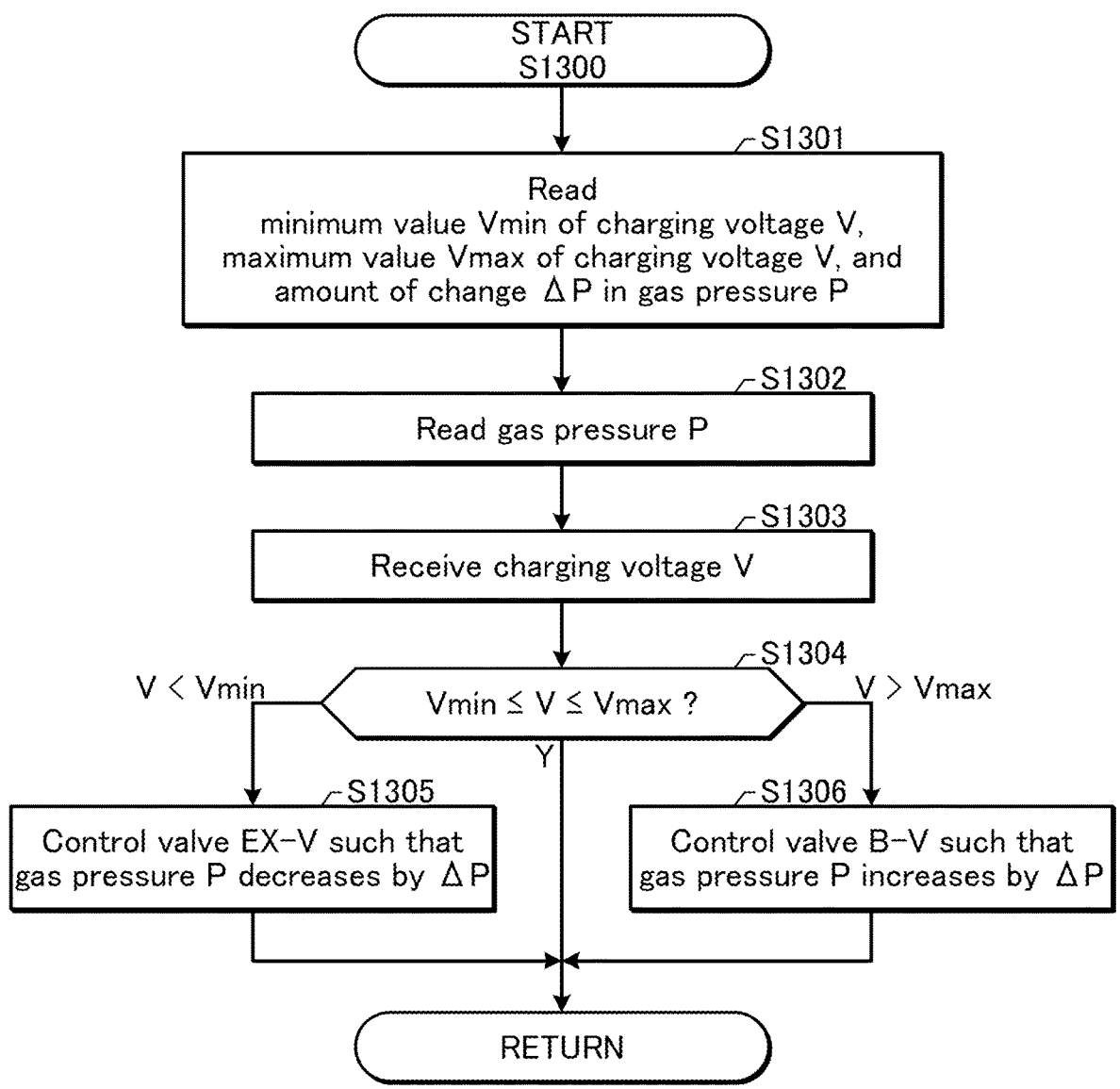
FIG. 5 is a flowchart showing details of a gas pressure control shown in FIG. 3.

FIG. 5 is a flowchart showing details of the gas pressure control shown in FIG. 3. The process of FIG. 5 may be performed by the gas controller 32 as a subroutine of S1300 shown in FIG. 3. The gas controller 32 may control the gas pressure in the chamber 10 based on the charging voltage V set by the energy control shown in FIG. 2.

First, at S1301, the gas controller 32 may read parameters for the gas pressure control from a storage device. The parameters for the gas pressure control may include minimum and maximum values Vmin and Vmax of the charging voltage V and an amount of change ΔP in the gas pressure P.

Next, at S1302, the gas controller 32 may read the gas pressure P in the chamber 10 from the chamber pressure sensor 16.

Next, at S1303, the gas controller 32 may receive a value of the charging voltage V from the laser controller 30. The value of the charging voltage V may have been set in the process described with reference to FIG. 2 such that the pulse energy E is in the vicinity of the target value Et of the pulse energy.

Next, at S1304, the gas controller 32 may determine whether the received charging voltage V is in a range from a minimum value Vmin to a maximum value Vmax. If the charging voltage V is in the range from the minimum value Vmin to the maximum value Vmax, the gas controller 32 may end the process of this flowchart and return to the process of FIG. 3.

If the charging voltage V is lower than the minimum value Vmin, the gas controller 32 may control the valve EX-V at S1305 such that the gas pressure P decreases by ΔP. Controlling the valve EX-V may cause a part of the laser gas in the chamber 10 to be exhausted and the gas pressure P to be decreased. The gas controller 32 may then end the process of this flowchart and return to the process of FIG. 3.

If the charging voltage V is higher than the maximum value Vmax, the gas controller 32 may control the valve B-V at S1306 such that the gas pressure P increases by ΔP. Controlling the valve B-V may cause the buffer gas to be injected into the chamber 10 and the gas pressure P to be increased. The gas controller 32 may then end the process of this flowchart and return to the process of FIG. 3.

2.2.3.3 Measurement of the Number of Pulses

Figure 6:
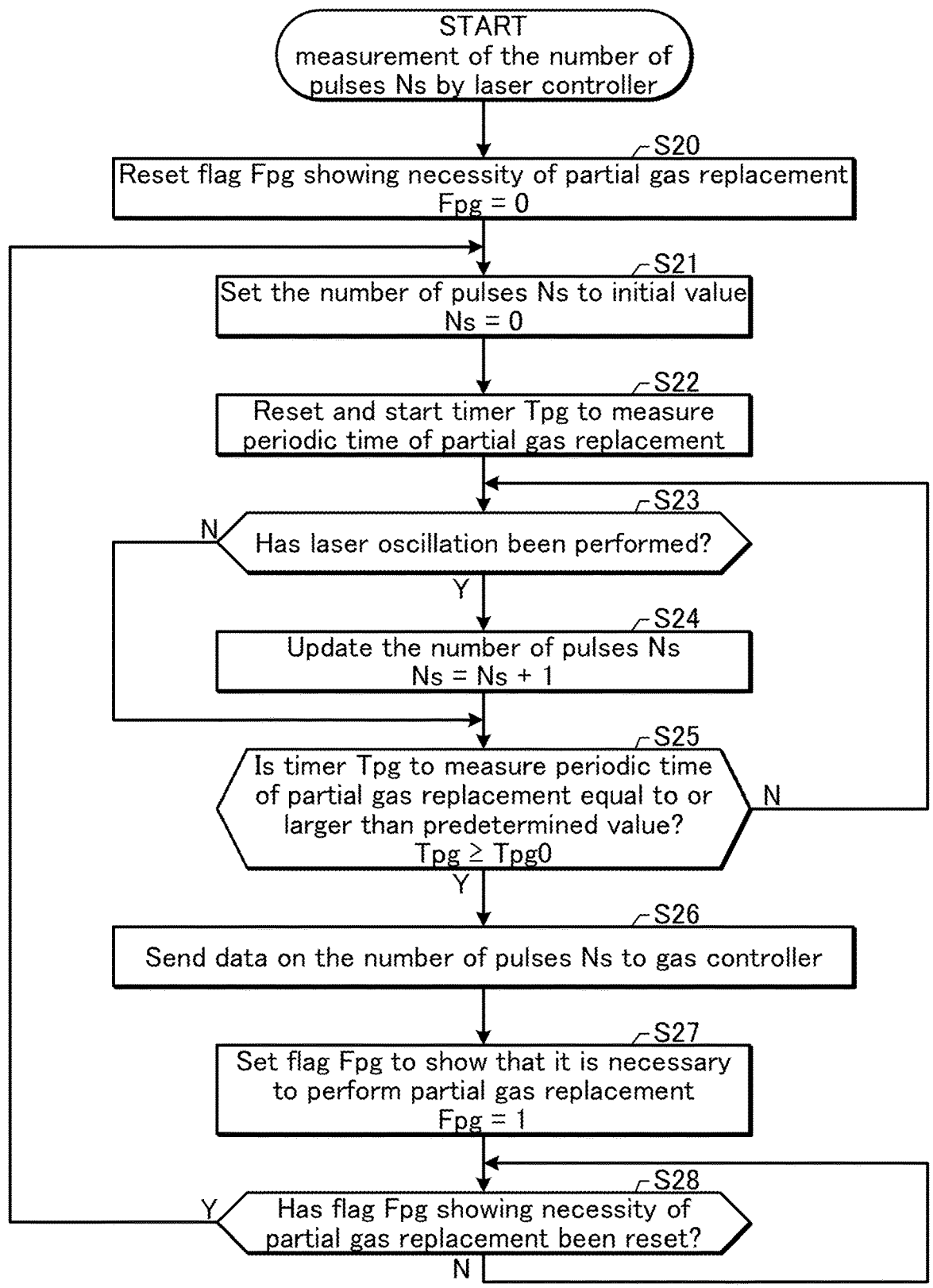
FIG. 6 is a flowchart showing a process of measuring the number of pulses Ns performed by the laser controller 30 of the excimer laser apparatus of the comparative example.

FIG. 6 is a flowchart showing a process of measuring the number of pulses Ns performed by the laser controller 30 of the excimer laser apparatus of the comparative example. The laser controller 30 may perform the following process to measure the number of pulses Ns after the partial gas replacement. The number of pulses Ns after the partial gas replacement may, as described with reference to FIG. 7, be used to calculate a buffer gas injection amount ΔPbg and a halogen-containing gas injection amount ΔPhg for the next partial gas replacement.

First, at S20, the laser controller 30 may reset the flag Fpg showing the necessity of the partial gas replacement to 0. The flag Fpg may represent whether it is necessary to perform a partial gas replacement.

Next, at S21, the laser controller 30 may set the number of pulses Ns to an initial value 0.

Next, at S22, the laser controller 30 may reset and start a timer Tpg to measure the periodic time of the partial gas replacement.

Next, at S23, the laser controller 30 may determine whether a laser oscillation has been performed. This determination may be made based on whether the laser controller 30 has outputted the trigger signal to the switch 13a of the pulse power module 13. If the laser oscillation has been performed, the laser controller 30 may proceed to S24. If the laser oscillation has not been performed, the laser controller 30 may skip S24 to proceed to S25.

At S24, the laser controller 30 may add 1 to the number of pulses Ns to update Ns. After S24, the laser controller 30 may proceed to S25.

At S25, the laser controller 30 may determine whether the value of the timer Tpg to measure the periodic time of the partial gas replacement is equal to or larger than a predetermined value Tpg0. If the value of the timer Tpg to measure the periodic time of the partial gas replacement is smaller than the predetermined value Tpg0 (S25: NO), the laser controller 30 may return to S23. If the value of the timer Tpg to measure the periodic time of the partial gas replacement is equal to or larger than the predetermined value Tpg0 (S25: YES), the laser controller 30 may proceed to S26.

At S26, the laser controller 30 may send data on the number of pulses Ns to the gas controller 32.

Next, at S27, the laser controller 30 may set the flag Fpg showing the necessity of the partial gas replacement to 1, showing that it is necessary to perform the partial gas replacement. Based on the flag Fpg, the gas controller 32 may execute the partial gas replacement in the process of FIG. 7.

Next, at S28, the laser controller 30 may determine whether the flag Fpg has been reset. For example, immediately after executing the partial gas replacement, the flag Fpg may be reset at S2100 in FIG. 3. If the flag Fpg has not been reset, the laser controller 30 may wait until it is reset. If the flag Fpg has been reset, the laser controller 30 may return to S21.

2.2.3.4 Partial Gas Replacement

Figure 7:
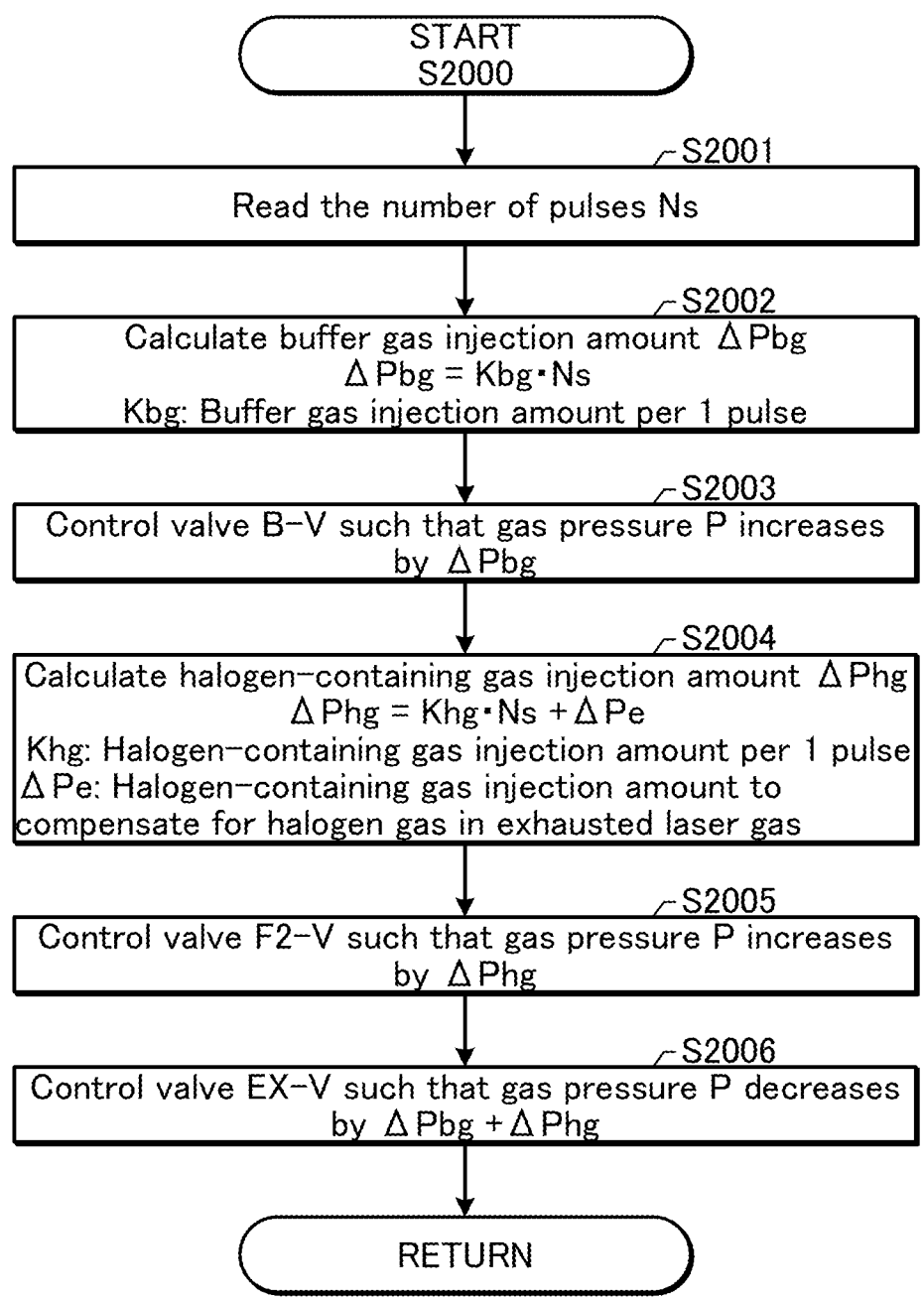
FIG. 7 is a flowchart showing details of a partial gas replacement shown in FIG. 3.

FIG. 7 is a flowchart showing details of the partial gas replacement shown in FIG. 3. The process of FIG. 7 may be performed by the gas controller 32 as a subroutine of S2000 shown in FIG. 3. In contrast to the total gas replacement described above with reference to FIG. 4 performed in a period of suspending laser oscillation, the partial gas replacement described below may be performed in a period of performing laser oscillation.

First, at S2001, the gas controller 32 may read the number of pulses Ns from a storage device. The number of pulses Ns may be measured by the laser controller 30 in the process of FIG. 6.

Next, at S2002, the gas controller 32 may calculate the buffer gas injection amount ΔPbg by the following formula.

$$\Delta Pbg = Kbg \cdot Ns$$

Here, Kbg may be a value that is set as a buffer gas injection amount per 1 pulse.

Next, at S2003, the gas controller 32 may control the valve B-V such that the gas pressure P in the chamber 10 increases by ΔPbg. Controlling the valve B-V may cause buffer gas to be injected into the chamber 10 and the gas pressure P to be increased.

Next, at S2004, the gas controller 32 may calculate the halogen-containing gas injection amount ΔPhg by the following formula.

$$\Delta Phg = Khg \cdot Ns + \Delta Pe$$

Here, Khg may be a value that is set as a halogen-containing gas injection amount per 1 pulse. ΔPe may be a halogen-containing gas injection amount calculated to compensate for the amount of halogen gas included in the laser gas exhausted at S2006 described below. If the amount of the laser gas exhausted at S2006 is very small relative to the amount of the laser gas in the chamber 10, ΔPe may be ignored.

Next, at S2005, the gas controller 32 may control the valve F2-V such that the gas pressure P in the chamber 10 increases by ΔPhg. Controlling the valve F2-V may cause halogen-containing gas to be injected into the chamber 10 and the gas pressure P to be increased.

Next, at S2006, the gas controller 32 may control the valve EX-V such that the gas pressure P in the chamber 10 decreases by ΔPbg+ΔPhg. Controlling the valve EX-V may cause a part of the laser gas in the chamber 10 to be exhausted and the gas pressure P to be decreased.

After S2006, the gas controller 32 may end the process of this flowchart and return to the process of FIG. 3.

2.3 Problem

Operating the excimer laser apparatus for a long time to the extent that, for example, the number of pulses of the output pulse laser beam reaches tens of billions of pulses may cause deterioration of the pair of discharge electrodes 11a and 11b. This may cause a phenomenon that is called energy depression. Even where most of the pulses of the pulse laser beam have pulse energies in the vicinity of the target value of the pulse energy, some pulses may have significantly small pulse energies relative to the target value of the pulse energy. In this specification, the phenomenon where the pulse energy of a pulse is significantly small relative to the target value of the pulse energy may be referred to as energy depression.

Figure 8A:
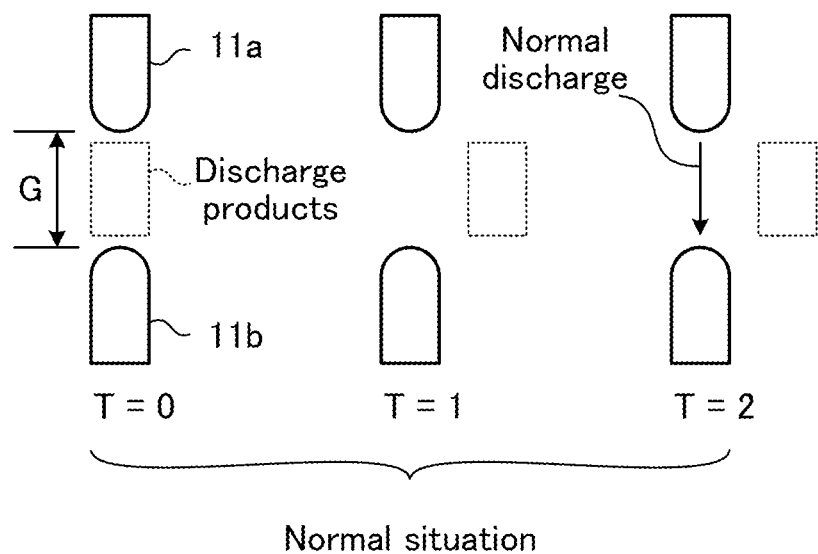
FIGS. 8A and 8B explain a supposed mechanism of energy depression.
Figure 8B:
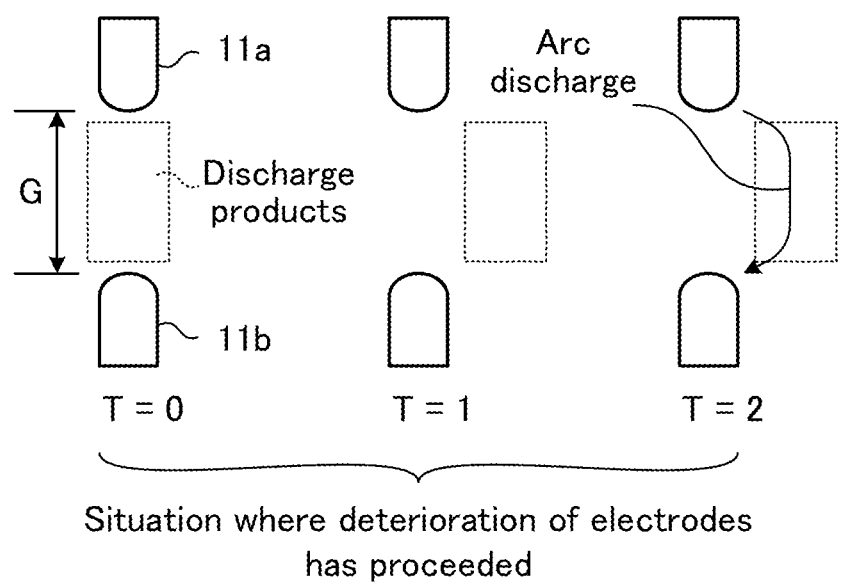

FIGS. 8A and 8B explain a supposed mechanism of the energy depression. FIG. 8A shows a normal situation where the deterioration of the electrodes has not proceeded and the energy depression hardly occurs. An electric discharge between the pair of discharge electrodes 11a and 11b may cause the laser gas in the electric discharge space between the pair of discharge electrodes 11a and 11b to be excited to generate a pulse of the pulse laser beam. As shown in FIG. 8A, exciting the laser gas may cause discharge products to be generated at the time T=0. The discharge products may include plasma laser gas. As described above, the laser gas may be circulated in the chamber 10 by the cross-flow fan 21. The direction of the gas flow may be substantially perpendicular to both the direction of the electric discharge between the pair of discharge electrodes 11a and 11b and the direction of the output of the pulse laser beam. The gas flow may move the discharge products by the time T=1. The next electric discharge may occur at the time T=2 between the pair of discharge electrodes 11a and 11b. At this time, the discharge products may be distanced from the pair of discharge electrodes 11a and 11b and another part of the laser gas may be supplied to the space between the pair of discharge electrodes 11a and 11b from the upstream of the gas flow. Accordingly, the part of the laser gas supplied from the upstream of the gas flow may be excited to generate the next pulse of the pulse laser beam.

FIG. 8B shows another situation where the deterioration of the electrodes has proceeded and the energy depression tends to occur. The deterioration of the electrodes may cause a gap G between the pair of discharge electrodes 11a and 11b to be enlarged. This may cause the electric discharge at the time T=2 to be an arc discharge through the discharge products including plasma laser gas generated by the last electric discharge. It is supposed that there are following two reasons for the arc discharge with the enlarged gap G between the electrodes. Firstly, enlarging the gap G between the pair of discharge electrodes 11a and 11b may cause the electric discharge space to be expanded not only in the direction of the electric discharge but also in the direction of the gas flow perpendicular to the direction of the electric discharge. Accordingly, as shown for the times T=0 and T=1, the discharge products may be widely distributed and thus the discharge products may not be sufficiently distanced from the electrodes at the time T=2. Secondly, assuming that the rotating speed of the cross-flow fan 21 is constant, enlarging the gap G between the pair of discharge electrodes 11a and 11b may cause the cross-sectional area of the gas flow path between the pair of discharge electrodes 11a and 11b to be expanded. Accordingly, even if the rotating speed of the cross-flow fan 21 is constant, the speed of the gas flow may be reduced. This may prevent the discharge products from being sufficiently distanced from the electrodes at the time T=2.

Such arc discharge may prevent the laser gas between the pair of discharge electrodes 11a and 11b from being sufficiently excited, and cause the pulse energy of the pulse laser beam to be insufficient.

Such energy depression during the exposure at the exposure apparatus 100 may badly influence the quality of exposure. The energy depression may be reduced by exchanging the chamber 10 including the pair of discharge electrodes 11a and 11b to a new one. However, exchanging the chamber 10 may require stopping the output of the pulse laser beam. Stopping the output of the pulse laser beam to exchange the chamber 10 at the time other than a prescheduled periodic maintenance may influence the production schedule in the semiconductor factory and decrease the productivity.

In the first embodiment described below, the excimer laser apparatus may detect the energy depression. The excimer laser apparatus may adjust the partial pressure of halogen gas in the chamber based on the results of detecting the energy depression. Decreasing the partial pressure of halogen gas may suppress the occurrence of the energy depression. The lifetime of the chamber may thus be extended. Stopping the output of the pulse laser beam to exchange the chamber may be temporarily avoided. Influence on the production schedule in the semiconductor factory may thus be suppressed.

Even if the energy depression occurs, for example, tens of pulses in tens of millions of pulses of the output pulse laser beam, the quality of exposure may be worsened. Detecting the energy depression that occurs at such a low frequency may require a long time.

In a second embodiment described below, the excimer laser apparatus may detect the energy depression with a rotating speed of the cross-flow fan 21 lower than the rotating speed in the period of outputting the pulse laser beam. The low rotating speed of the cross-flow fan 21 may allow the frequent occurrence of the energy depression. Detecting the energy depression with the low rotating speed of the cross-flow fan 21 may require a shorter time than that with a normal rotating speed.

Figure 9:
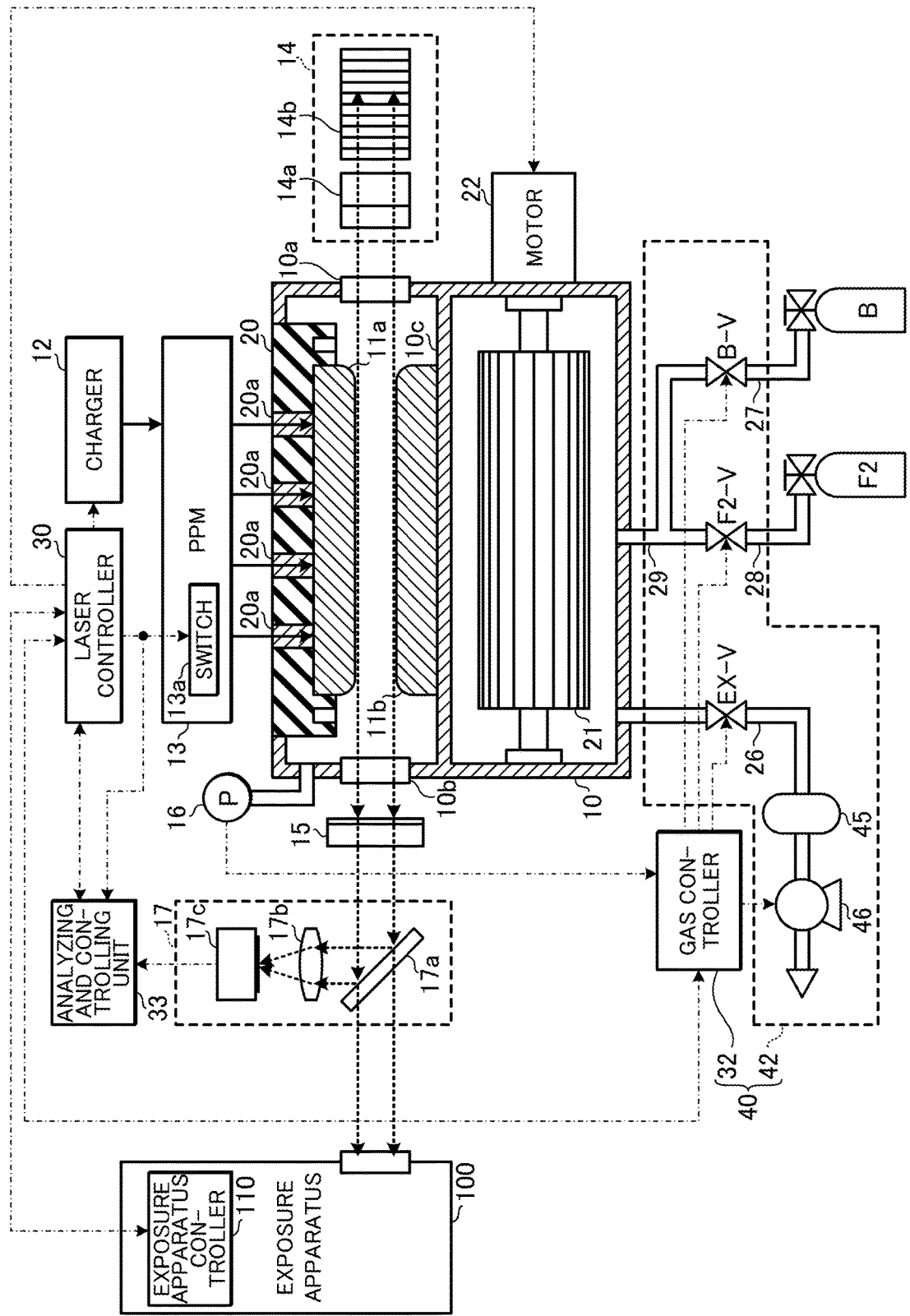
FIG. 9 schematically shows a configuration of an excimer laser apparatus according to a first embodiment of the present disclosure.

3. Excimer Laser Apparatus to Detect Energy Depression and Adjust Partial Pressure of Halogen Gas 3.1 Configuration FIG. 9 schematically shows a configuration of an excimer laser apparatus according to a first embodiment of the present disclosure. In the first embodiment, the excimer laser apparatus may include an analyzing and controlling unit 33.

The analyzing and controlling unit 33 may be connected to the energy monitor 17. The analyzing and controlling unit 33 may receive an output signal from the energy monitor 17. The analyzing and controlling unit 33 may also be connected to a signal line of the trigger signal outputted from the laser controller 30 to the switch 13a of the pulse power module 13. The analyzing and controlling unit 33 may thus receive the trigger signal. The laser gas control system 40 may include a gas controller 32 and a unit for adjusting the partial pressure of halogen gas 42.

The analyzing and controlling unit 33 may detect the energy depression based on the output signal of the energy monitor 17 and the trigger signal. Detection of the energy depression will be described below with reference to FIGS. 10 to 14. The analyzing and controlling unit 33 may further be connected to the laser controller 30. The analyzing and controlling unit 33 may receive the target value of the pulse energy from the laser controller 30. The analyzing and controlling unit 33 may output the detection results of the energy depression to the laser controller 30. The laser controller 30, the gas controller 32, and the analyzing and controlling unit 33 may be included in the controller according to the present disclosure.

In other aspects, the first embodiment may have substantially the same configuration as the comparative example described with reference to FIG. 1.

3.2 Operation

In the excimer laser apparatus of the first embodiment, the process of the laser controller 30 may be substantially the same as the process in the comparative example described with reference to FIGS. 2 and 6.

3.2.1 Detecting Energy Depression

Figure 10:
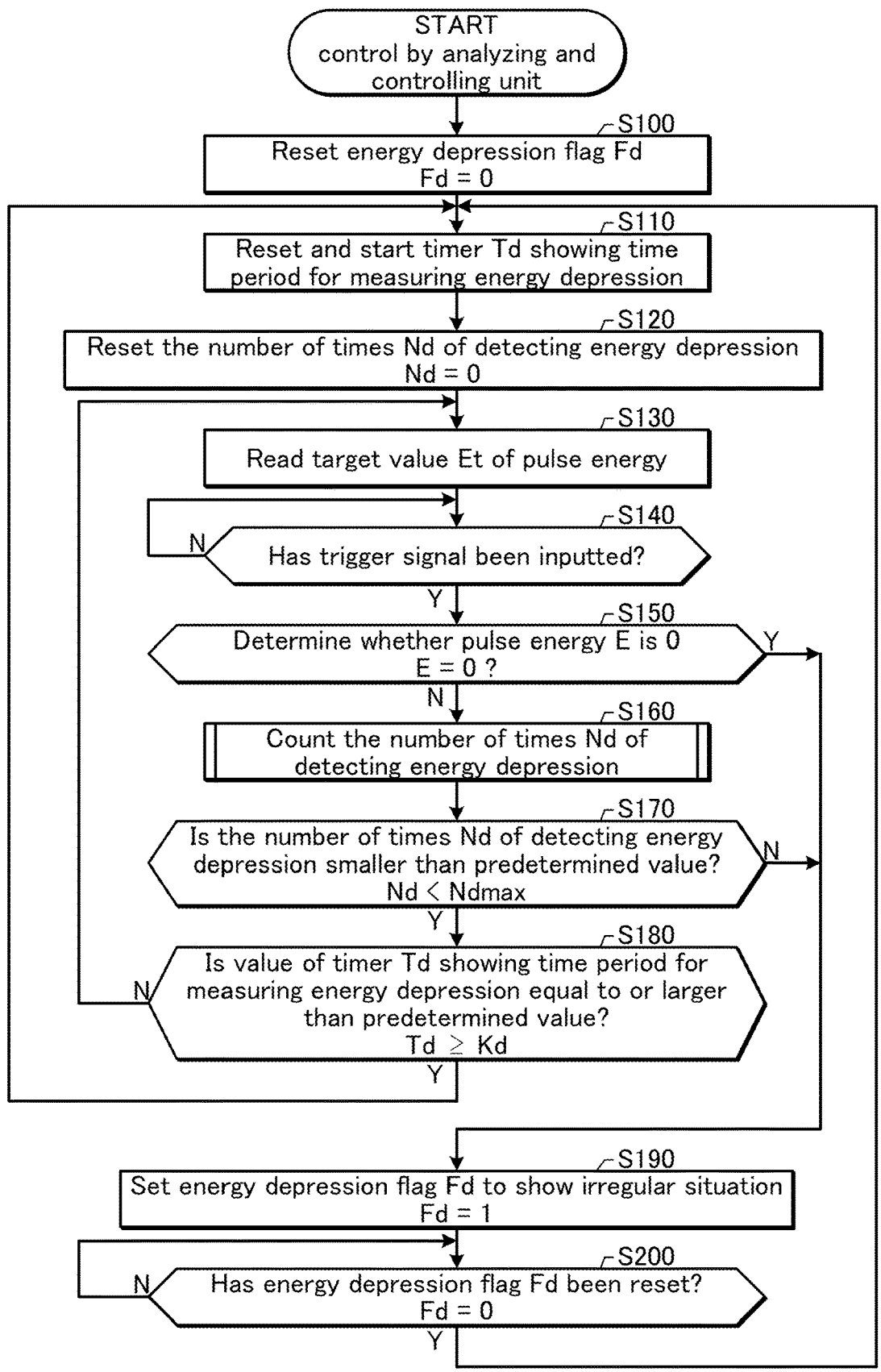
FIG. 10 is a flowchart showing a process of an analyzing and controlling unit 33 in the excimer laser apparatus of the first embodiment.

FIG. 10 is a flowchart showing a process of an analyzing and controlling unit 33 in the excimer laser apparatus of the first embodiment. The analyzing and controlling unit 33 may perform the following process to detect the energy depression.

First, at S100, the analyzing and controlling unit 33 may reset an energy depression flag Fd to 0. The energy depression flag Fd may represent whether it is a normal situation where the energy depression hardly occurs, or it is an irregular situation where the energy depression tends to occur.

Next, at S110, the analyzing and controlling unit 33 may reset and start a timer Td showing the time period for measuring the energy depression.

Next, at S120, the analyzing and controlling unit 33 may reset the number of times Nd of detecting the energy depression to 0.

Next, at S130, the analyzing and controlling unit 33 may receive data on the target value Et of the pulse energy from the laser controller 30 to read the target value Et of the pulse energy.

Next, at S140, the analyzing and controlling unit 33 may determine whether the trigger signal has been inputted. If the trigger signal has not been inputted (S140: NO), the analyzing and controlling unit 33 may wait until the trigger signal is inputted. If the trigger signal has been inputted (S140: YES), the analyzing and controlling unit 33 may proceed to S150.

At S150, the analyzing and controlling unit 33 may measure the pulse energy E based on the output from the energy monitor 17, and determine whether the pulse energy E is 0. If the pulse energy E is 0 in spite of the input of the trigger signal (S150: YES), the analyzing and controlling unit 33 may proceed to S190. If the pulse energy E is not 0 (S150: NO), the analyzing and controlling unit 33 may proceed to S160.

At S160, the analyzing and controlling unit 33 may execute a process of counting the number of times Nd of detecting the energy depression. First to fourth examples of the process of counting the number of times Nd of detecting the energy depression will be described with reference to FIGS. 11 to 14.

Next, at S170, the analyzing and controlling unit 33 may determine whether the number of times Nd of detecting the energy depression is smaller than a predetermined value Ndmax. If the number of times Nd of detecting the energy depression is equal to or larger than the predetermined value Ndmax (S170: NO), the analyzing and controlling unit 33 may proceed to S190. If the number of times Nd of detecting the energy depression is smaller than the predetermined value Ndmax (S170: YES), the analyzing and controlling unit 33 may proceed to S180. The predetermined value Ndmax may be in a range from 20 to 500.

At S190, the analyzing and controlling unit 33 may set the energy depression flag Fd to 1, showing the irregular situation. The energy depression flag Fd may be used in the process of the gas controller shown in FIG. 15 described below.

Next to S190, at S200, the analyzing and controlling unit 33 may determine whether the energy depression flag Fd has been reset to 0. If the energy depression flag Fd has not been reset (S200: NO), the analyzing and controlling unit 33 may wait until the energy depression flag Fd is reset. If the energy depression flag Fd has been reset (S200: YES), the analyzing and controlling unit 33 may return to S110. For example, if a control for reducing the energy depression has been performed in the process of the gas controller shown in FIG. 15 described below, the energy depression flag Fd may be reset.

At S180, the analyzing and controlling unit 33 may determine whether the value of the timer Td showing the time period for measuring the energy depression is equal to or larger than a predetermined value Kd. The predetermined value Kd may be in a range from 1 hour to 24 hours. If the value of the timer Td showing the time period for measuring the energy depression is smaller than the predetermined value Kd (S180: NO), the analyzing and controlling unit 33 may return to S130. If the value of the timer Td showing the time period for measuring the energy depression is equal to or larger than the predetermined value Kd (S180: YES), the analyzing and controlling unit 33 may return to S110.

Figure 11:
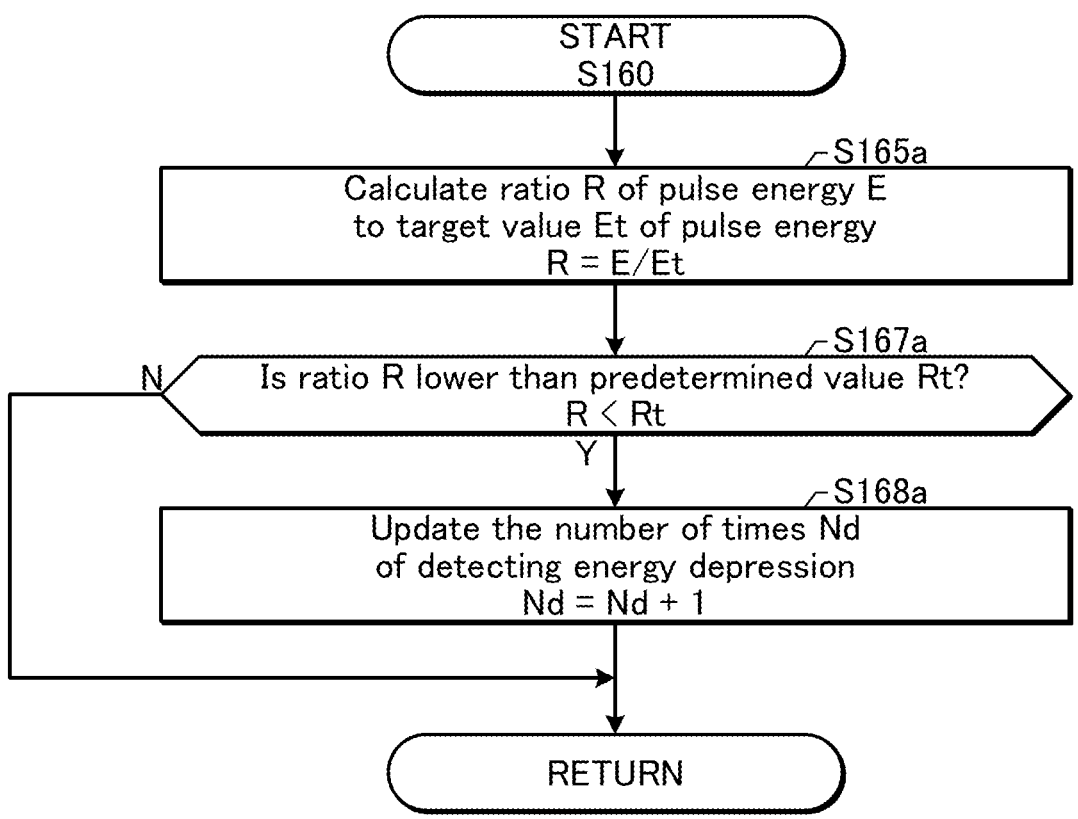
FIG. 11 is a flowchart showing a first example of a process to count the number of times Nd of detecting the energy depression shown in FIG. 10.

3.2.1.1 First Example of Process to Count the Number of Times Nd of Detecting Energy Depression FIG. 11 is a flowchart showing a first example of the process to count the number of times Nd of detecting the energy depression shown in FIG. 10. The process of FIG. 11 may be performed by the analyzing and controlling unit 33 as a subroutine of S160 shown in FIG. 10. The analyzing and controlling unit 33 may perform the following process to detect the energy depression based on the ratio of the pulse energy of the pulse laser beam to the target value of the pulse energy and count the number of times Nd of detecting the energy depression.

First, at S165a, the analyzing and controlling unit 33 may calculate the ratio R of the pulse energy E measured at S150 and the target value Et of the pulse energy read at S130 by the following formula.

$$R = E/Et$$

Next, at S167a, the analyzing and controlling unit 33 may determine whether the ratio R is lower than a predetermined value Rt. The predetermined value Rt may be in a range from 0.01 to 0.5. If the ratio R is smaller than the predetermined value Rt (S167a: YES), the pulse energy E may be lower than 50% of the target value Et of the pulse energy, for example. It may thus be determined that the energy depression has occurred. Accordingly, the analyzing and controlling unit 33 may proceed to S168a.

At S168a, the analyzing and controlling unit 33 may add 1 to the number of times Nd of detecting the energy depression to update Nd. After S168a, the analyzing and controlling unit 33 may end the process of this flowchart and return to the process of FIG. 10. The number of times Nd of detecting the energy depression updated at S168a may be used in the process of S170 in FIG. 10.

At S167a, if the ratio R is not smaller than the predetermined value Rt (S167a: NO), the analyzing and controlling unit 33 may end the process of this flowchart without updating the number of times Nd of detecting the energy depression. The analyzing and controlling unit 33 may then return to the process of FIG. 10.

Figure 12:
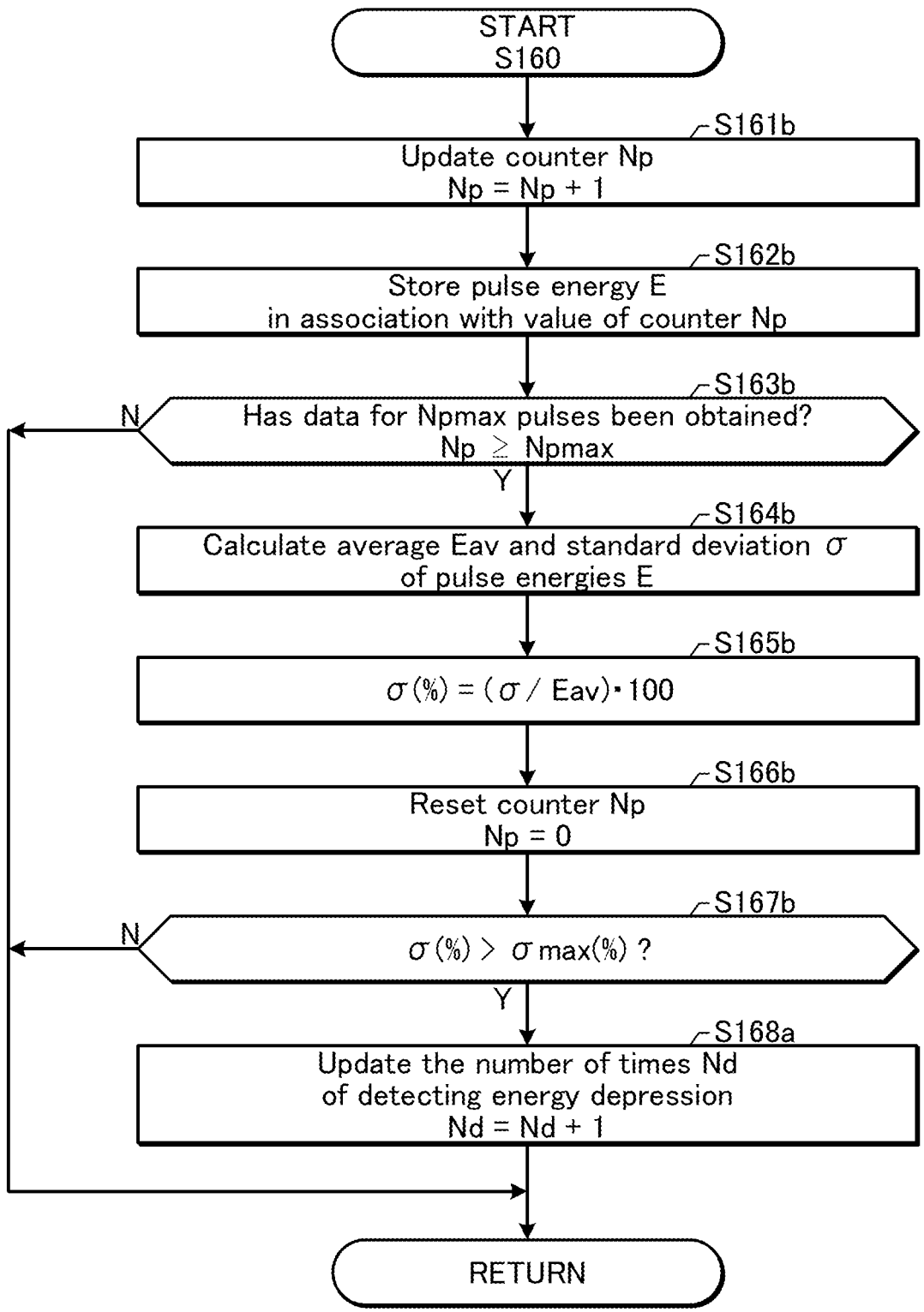
FIG. 12 is a flowchart showing a second example of the process to count the number of times Nd of detecting the energy depression shown in FIG. 10.

3.2.1.2 Second Example of Process to Count the Number of Times Nd of Detecting Energy Depression FIG. 12 is a flowchart showing a second example of the process to count the number of times Nd of detecting the energy depression shown in FIG. 10. The process of FIG. 12 may be performed by the analyzing and controlling unit 33 as a subroutine of S160 shown in FIG. 10. The analyzing and controlling unit 33 may perform the following process to estimate the stability in pulse energy and count the number of times Nd of detecting the energy depression based on the estimated stability.

First, at S161b, the analyzing and controlling unit 33 may add 1 to a counter Np for counting the number of samples to update Np. The number of samples may be used for calculating an average and a standard deviation of pulse energies.

Next, at S162b, the analyzing and controlling unit 33 may store the pulse energy E measured at S150 in association with the value of the counter Np in a storage device.

Next, at S163b, the analyzing and controlling unit 33 may determine whether it has obtained data on the pulse energies E for Npmax pulses. Npmax is a predetermined number. This process may be made by comparing the value of the counter Np with the predetermined number Npmax. The predetermined number Npmax may be in a range from 40 to 60. If the analyzing and controlling unit 33 has not obtained the data on the pulse energies E for Npmax pulses (S163b: NO), it may end the process of this flowchart without calculating the stability in pulse energy. The analyzing and controlling unit 33 may then return to the process of FIG. 10. If the analyzing and controlling unit 33 has obtained the data on the pulse energies E for Npmax pulses by repeating the process of FIG. 10 and the process of S161b to S163b (S163b: YES), it may proceed to S164b.

At S164b, the analyzing and controlling unit 33 may calculate the average Eav and the standard deviation a of the pulse energies E based on the data on the pulse energies E for the Npmax pulses.

Next, at S165b, the analyzing and controlling unit 33 may calculate σ (%) by the following formula.

$$\sigma\ (\%) = (\sigma/Eav) \cdot 100$$

The smaller the deviation of the pulse energies E is, the smaller σ (%) is. Accordingly, the smaller σ (%) is, the higher the stability in pulse energy is.

Next, at S166b, the analyzing and controlling unit 33 may reset the counter Np to 0. Thus, at the start of the next execution of this flowchart, the number of samples may be counted from 0.

Next, at S167b, the analyzing and controlling unit 33 may determine whether σ (%) is larger than a predetermined value σmax (%). The predetermined value σmax (%) may be in a range from 10% to 30%. If σ (%) is larger than the predetermined value σmax (%), the deviation of the pulse energies E is large and it may be conceived that the energy depression is likely to be occurring. Accordingly, the analyzing and controlling unit 33 may proceed to S168a.

The process of S168a may be substantially the same as the corresponding process described with reference to FIG. 11.

At S167b, if σ (%) is not larger than the predetermined value σmax (%), the analyzing and controlling unit 33 may end the process of this flowchart without updating the number of times Nd of detecting the energy depression. The analyzing and controlling unit 33 may then return to the process of FIG. 10.

The initial value of the counter Np may be set to Np=0 at an unillustrated step next to the start of the process of the analyzing and controlling unit shown in FIG. 10.

Figure 13:
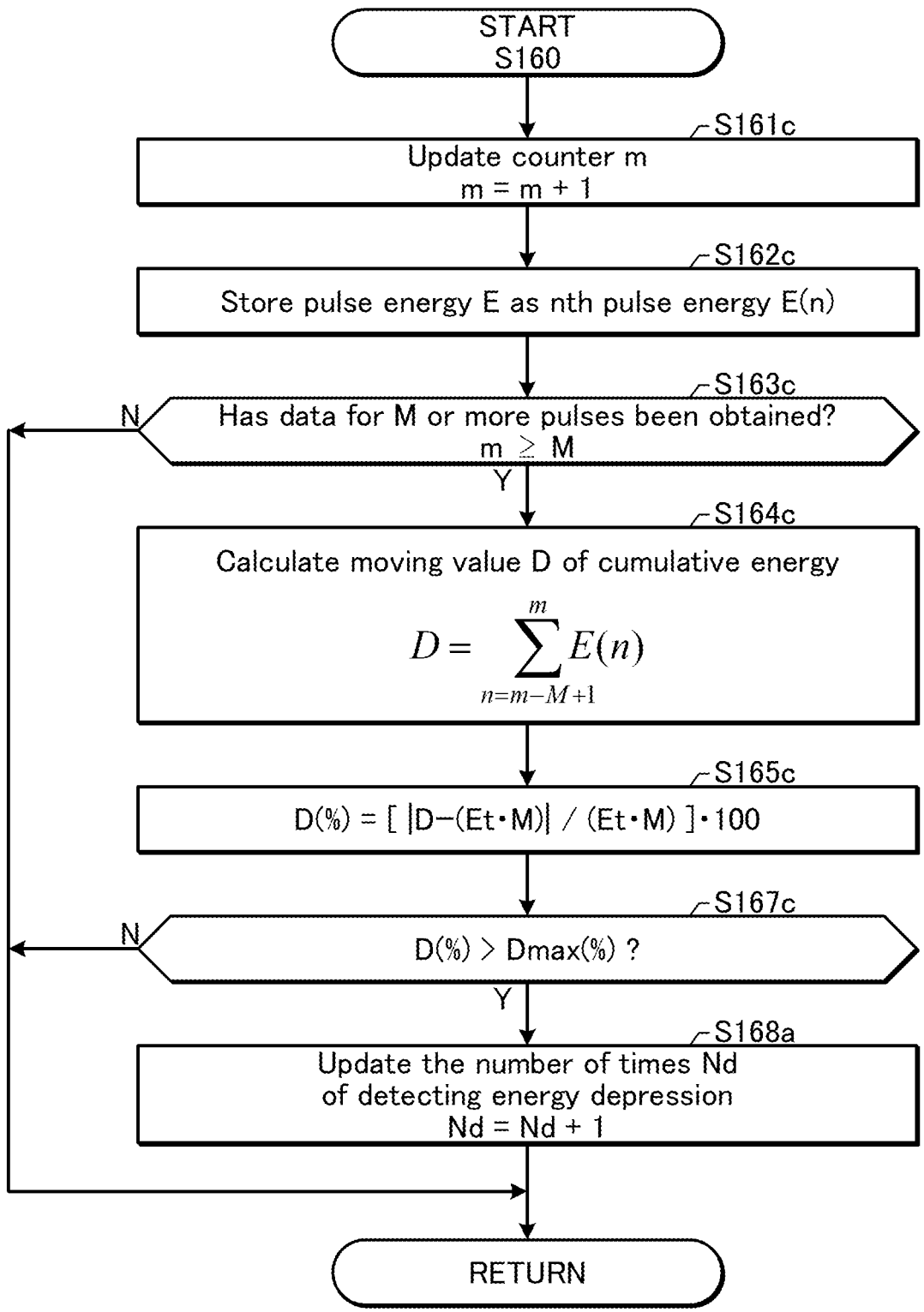
FIG. 13 is a flowchart showing a third example of the process to count the number of times Nd of detecting the energy depression shown in FIG. 10.

3.2.1.3 Third Example of Process to Count the Number of Times Nd of Detecting Energy Depression FIG. 13 is a flowchart showing a third example of the process to count the number of times Nd of detecting the energy depression shown in FIG. 10. The process of FIG. 13 may be performed by the analyzing and controlling unit 33 as a subroutine of S160 shown in FIG. 10. The analyzing and controlling unit 33 may perform the following process to estimate the stability in dosing and count the number of times Nd of detecting the energy depression based on the estimated stability.

First, at S161c, the analyzing and controlling unit 33 may add 1 to the value of the counter m for counting the cumulative number of pulses to update the value of m.

Next, at S162c, the analyzing and controlling unit 33 may store the pulse energy E measured at S150 as an nth pulse energy E(n) in a storage device. The value of n may be the same as the value of m for each time of executing S162c. While the value of m is updated at each time of executing S161c, a plurality of n values may be generated according to the number of times of executing S162c. Accordingly, a plurality of pulse energies E(n) may be stored in the storage device according to a plurality of executions of S162c.

Next, at S163c, the analyzing and controlling unit 33 may determine whether it has obtained data on the pulse energies E(n) for M or more pulses. M is a predetermined number. This process may be made by comparing the value of the counter m with the predetermined number M. The predetermined number M may be in a range from 40 to 60. If the analyzing and controlling unit 33 has not obtained the data on the pulse energies E(n) for M pulses (S163c: NO), it may end the process of this flowchart without calculating the stability in dosing. The analyzing and controlling unit 33 may then return to the process of FIG. 10. If the analyzing and controlling unit 33 has obtained the data on the pulse energies E(n) for M pulses by repeating the process of FIG. 10 and the process of S161c to S163c (S163c: YES), it may proceed to S164c.

At S164c, the analyzing and controlling unit 33 may calculate a moving cumulative value D of energy based on the data on the pulse energies E(n) for the M pulses. The moving cumulative value D of energy may be calculated by the following formula.

$$D = \sum_{n=m-M+1}^{m} E(n)$$

The moving cumulative value D of energy may be a total value of the pulse energies E(n) for the most recent M pulses. After the execution of S164c, the next execution of S164c may calculate the moving cumulative value D in which a new pulse energy E(n) is added and an old pulse energy E(n) is removed.

Next, at S165c, the analyzing and controlling unit 33 may calculate D (%) by the following formula.

$$D\ (\%)=[|D-(Et\cdot M)|/(Et\cdot M)]\cdot 100$$

The smaller the absolute value of the difference between the moving cumulative value D of energy and a target value Et·M of the cumulative energy is, the smaller D (%) is. Accordingly, the smaller D (%) is, the higher the stability in dosing is.

Next, at S167c, the analyzing and controlling unit 33 may determine whether D (%) is larger than a predetermined value Dmax (%). Dmax (%) may be in a range from 0.5% to 1%. If D (%) is larger than the predetermined value Dmax (%) (S167c: YES), it may be conceived that the stability in dosing is low and the energy depression is likely to be occurring. Accordingly, the analyzing and controlling unit 33 may proceed to S168a.

The process of S168a may be substantially the same as the corresponding process described with reference to FIG. 11.

At S167c, if D (%) is not larger than the predetermined value Dmax (%) (S167c: NO), the analyzing and controlling unit 33 may end the process of this flowchart without updating the number of times Nd of detecting the energy depression. The analyzing and controlling unit 33 may then return to the process of FIG. 10.

The initial value of the counter m may be set to m=0 at an unillustrated step next to the start of the process of the analyzing and controlling unit shown in FIG. 10.

Figure 14:
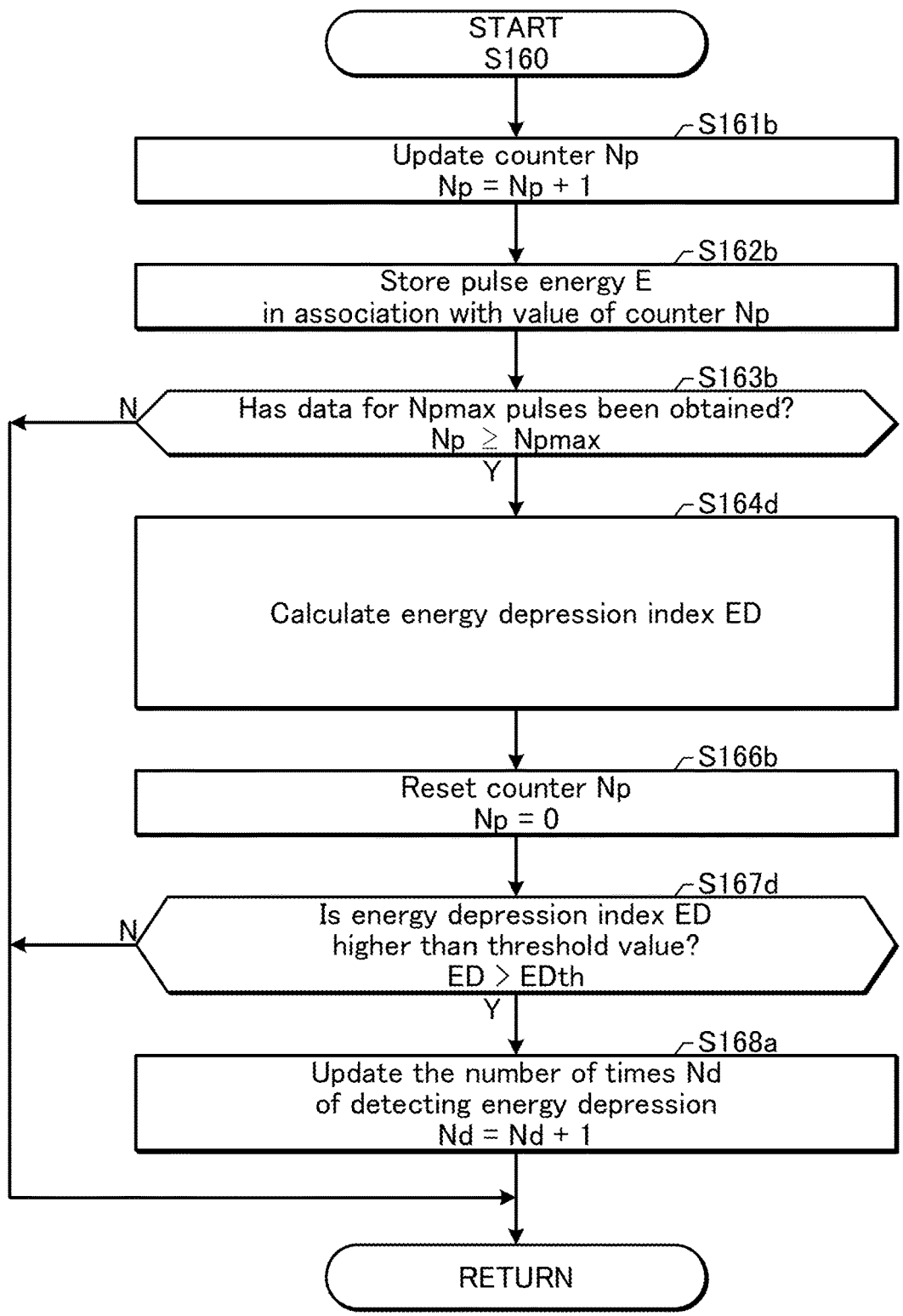
FIG. 14 is a flowchart showing a fourth example of the process to count the number of times Nd of detecting the energy depression shown in FIG. 10.

3.2.1.4 Fourth Example of Process to Count the Number of Times Nd of Detecting Energy Depression FIG. 14 is a flowchart showing a fourth example of the process to count the number of times Nd of detecting the energy depression shown in FIG. 10. The process of FIG. 14 may be performed by the analyzing and controlling unit 33 as a subroutine of S160 shown in FIG. 10. The analyzing and controlling unit 33 may perform the following process to estimate the energy depression index ED and count the number of times Nd of detecting the energy depression based on the estimated index ED.

First, the process of S161b to S163b may be substantially the same as the corresponding process described with reference to FIG. 12. At S163b, if the analyzing and controlling unit 33 has obtained the data on the pulse energies E for Npmax pulses (S163b: YES), it may proceed to S164d. Npmax is a predetermined number. Here, the predetermined number Npmax may be in a range from 10,000 to 100,000.

At S164d, the analyzing and controlling unit 33 may calculate the energy depression index ED based on the data on the pulse energies E for the Npmax pulses. Calculation of the energy depression index ED will be described below with reference to FIGS. 24 and 25.

Next, at S166b, the analyzing and controlling unit 33 may reset the counter Np to 0. Thus, at the start of the next execution of this flowchart, the number of samples may be counted from 0.

Next, at S167d, the analyzing and controlling unit 33 may determine whether the energy depression index ED is higher than a predetermined value EDth. If the energy depression index ED is higher than the predetermined value EDth (S167d: YES), it may be conceived that the frequency or the level of the energy depression is high. Accordingly, the analyzing and controlling unit 33 may proceed to S168a.

The process of S168a may be substantially the same as the corresponding process described with reference to FIG. 11.

At S167d, if the energy depression index ED is not higher than the predetermined value EDth (S167d: NO), the analyzing and controlling unit 33 may end the process of this flowchart without updating the number of times Nd of detecting the energy depression. The analyzing and controlling unit 33 may then return to the process of FIG. 10.

The initial value of the counter Np may be set to Np=0 at an unillustrated step next to the start of the process of the analyzing and controlling unit shown in FIG. 10.

3.2.2 Laser Gas Control Including Control for Reducing Energy Depression

Figure 15:
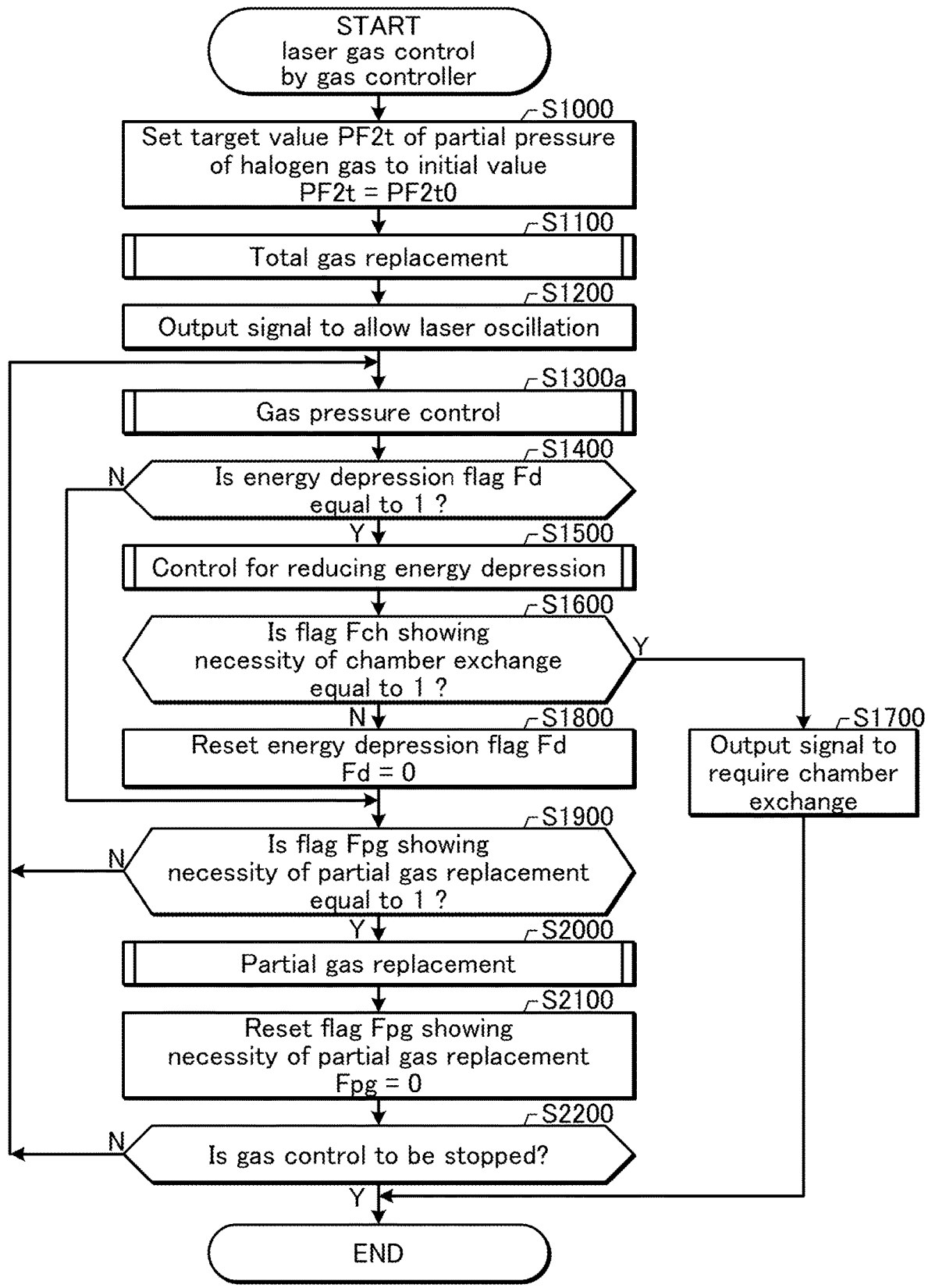
FIG. 15 is a flowchart showing a process of a laser gas control performed by a gas controller 32 of the excimer laser apparatus of the first embodiment.

FIG. 15 is a flowchart showing a process of a laser gas control performed by a gas controller 32 of the excimer laser apparatus of the first embodiment. The gas controller 32 may perform the following process to execute the total gas replacement, a gas pressure control, and a partial gas replacement, and execute a control for reducing the energy depression.

First, the process of S1000 to S1200 may be substantially the same as the corresponding process of the comparative example described with reference to FIG. 3. After S1200, the gas controller 32 may proceed to S1300a.

At S1300a, the gas controller 32 may perform the gas pressure control based on the charging voltage V. Details of the gas pressure control will be described with reference to FIG. 16.

Next, at S1400, the gas controller 32 may determine whether the energy depression flag Fd is 1. The energy depression flag Fd may be set at S190 of FIG. 10 by the analyzing and controlling unit 33.

If the energy depression flag Fd is not 1 (S1400: NO), the gas controller 32 may proceed to S1900. If the energy depression flag Fd is 1 (S1400: YES), the gas controller 32 may proceed to S1500.

At S1500, the gas controller 32 may perform the control for reducing the energy depression, decreasing the partial pressure of halogen gas in the chamber 10. Details of the control for reducing the energy depression will be described below with reference to FIGS. 17 to 19.

Next, at S1600, the gas controller 32 may determine whether the flag Fch showing the necessity of chamber exchange is 1. The flag Fch may be set at S1309 described with reference to FIG. 16 or S1503 described with reference to FIG. 17.

If the flag Fch is not 1 (S1600: NO), the gas controller 32 may proceed to S1800. If the flag Fch is 1 (S1600: YES), the gas controller 32 may proceed to S1700.

At S1700, the gas controller 32 may output a signal to require chamber exchange to the laser controller 30. After S1700, the gas controller 32 may end the process of this flowchart.

At S1800, the gas controller 32 may reset the energy depression flag Fd to 0. This is because the control for reducing the energy depression has been performed at S1500 described above.

After S1800, the gas controller 32 may proceed to S1900. The process of S1900 to S2200 may be substantially the same as the corresponding process of the comparative example described with reference to FIG. 3.

3.2.2.1 Gas Pressure Control

Figure 16:
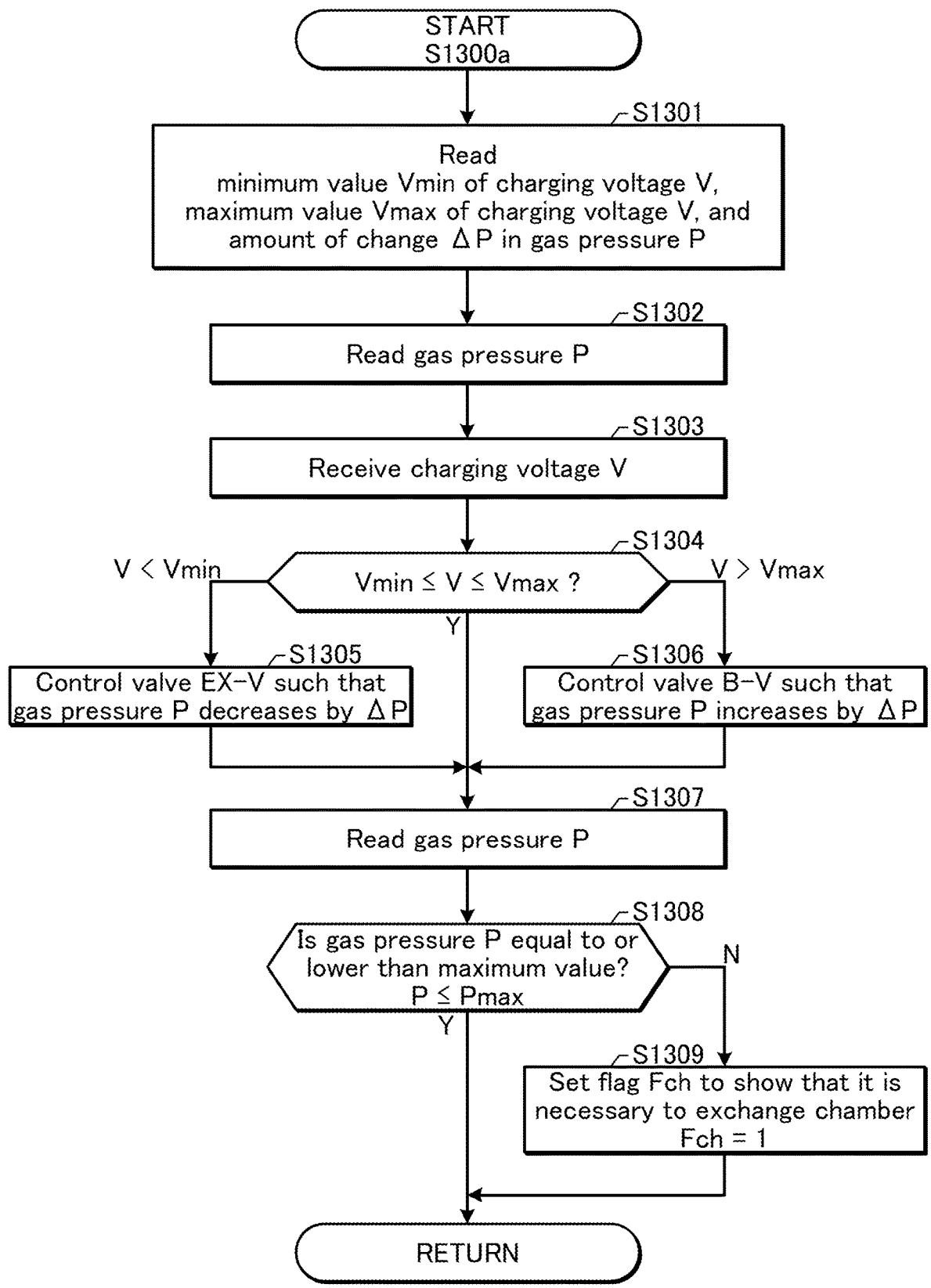
FIG. 16 is a flowchart showing details of a gas pressure control shown in FIG. 15.

FIG. 16 is a flowchart showing details of the gas pressure control shown in FIG. 15. The process of FIG. 16 may be performed by the gas controller 32 as a subroutine of S1300a shown in FIG. 15. The gas controller 32 may control the gas pressure in the chamber 10 based on the charging voltage V set in the energy control shown in FIG. 2.

First, the process from S1301 to S1306 may be substantially the same as the corresponding process of the comparative example described with reference to FIG. 5. If the charging voltage V is in a range from the minimum value Vmin to the maximum value Vmax at S1304, or if S1305 or S1306 has been performed to control the laser gas control system 40, the gas controller 32 may proceed to S1307.

At S1307, the gas controller 32 may read a new value of the gas pressure P in the chamber 10 from the chamber pressure sensor 16.

Next, at S1308, the gas controller 32 may determine whether the new value of the gas pressure P is equal to or lower than a maximum value Pmax. If the new value of the gas pressure P is equal to or lower than the maximum value Pmax (S1308: YES), the gas controller 32 may end the process of this flowchart and return to the process of FIG. 15. If the new value of the gas pressure P is higher than the maximum value Pmax (S1308: NO), the gas controller 32 may proceed to S1309 without further increasing the gas pressure P.

At S1309, the gas controller 32 may set the flag Fch showing the necessity of chamber exchange to 1, showing that it is necessary to exchange the chamber. The gas controller 32 may then end the process of this flowchart and return to the process of FIG. 15. The value of the flag Fch may be used in S1600.

3.2.2.2 Control for Reducing Energy Depression

Figure 17:
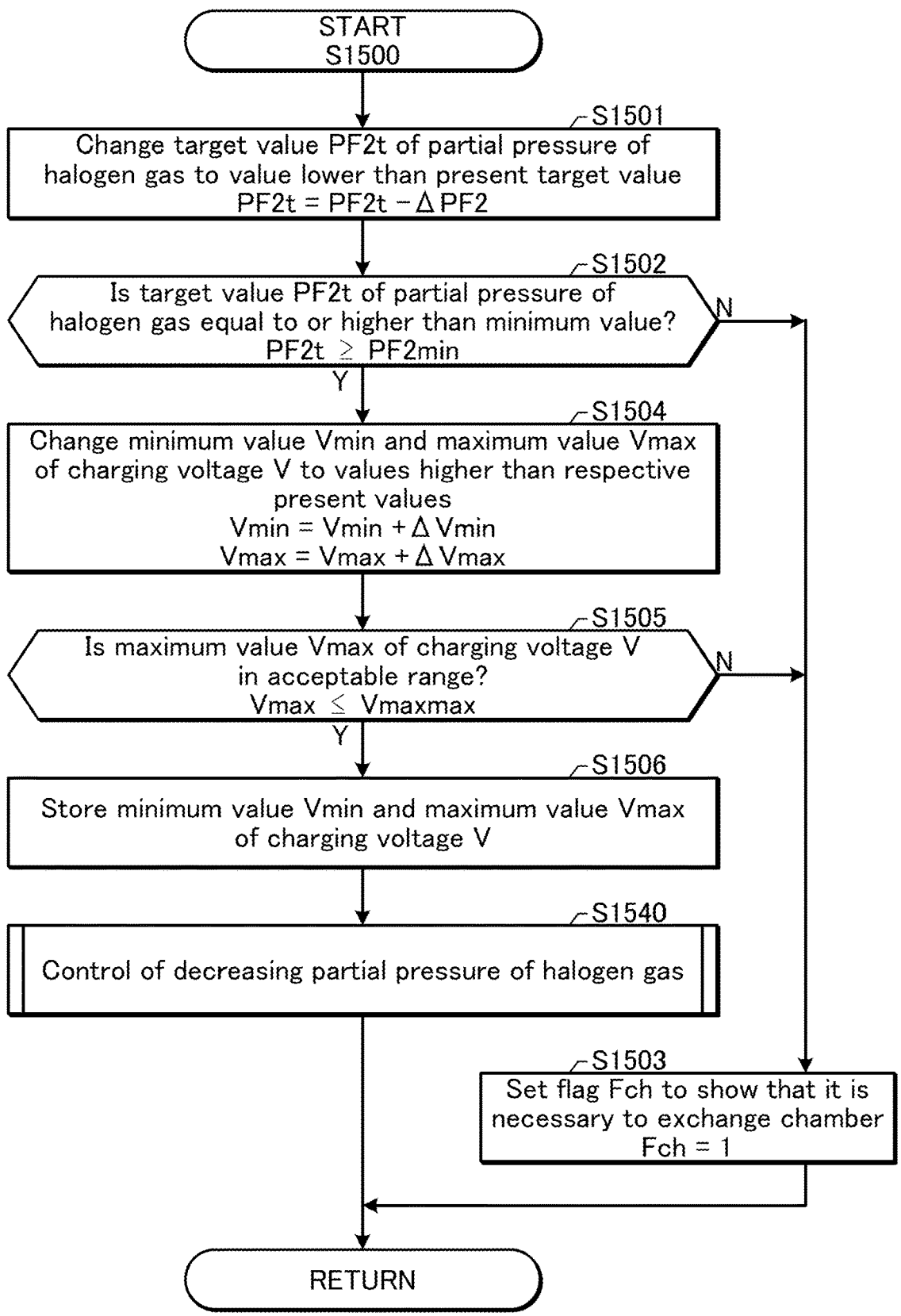
FIG. 17 is a flowchart showing details of a control for reducing the energy depression shown in FIG. 15.

FIG. 17 is a flowchart showing details of the control for reducing the energy depression shown in FIG. 15. The process of FIG. 17 may be performed by the gas controller 32 as a subroutine of S1500 shown in FIG. 15. The gas controller 32 may decrease the partial pressure of halogen gas in the chamber to reduce the energy depression.

First, at S1501, the gas controller 32 may change the target value PF2t of the partial pressure of halogen gas to a value lower than the present target value. Specifically, the gas controller 32 may update PF2t by the following formula.

$PF2t=PF2t-\Delta PF2$ $\Delta PF2$ may be a positive value representing an amount of decrease in the partial pressure of halogen gas.

Next, at S1502, the gas controller 32 may determine whether the target value PF2t of the partial pressure of halogen gas is equal to or higher than a minimum value PF2 min. If the target value PF2t of the partial pressure of halogen gas is lower than the minimum value PF2 min (S1502: NO), the gas controller 32 may proceed to S1503 without further decreasing the partial pressure of halogen gas.

At S1503, the gas controller 32 may set the flag Fch showing the necessity of chamber exchange to 1, showing that it is necessary to exchange the chamber. The gas controller 32 may then end the process of this flowchart and return to the process of FIG. 15. The value of the flag Fch may be used at S1600.

If the target value PF2t of the partial pressure of halogen gas is equal to or higher than the minimum value PF2 min (S1502: YES), the gas controller 32 may proceed to S1504.

At S1504, the gas controller 32 may change the minimum value Vmin and the maximum value Vmax of the charging voltage V to values higher than the respective present values as follows.

$Vmin=Vmin+\Delta Vmin$ $Vmax=Vmax+\Delta Vmax$

The minimum value Vmin and the maximum value Vmax of the charging voltage V may be reference values of the charging voltage in the gas pressure control described with reference to FIG. 16. Decreasing the partial pressure of halogen gas may cause a reduction of the pulse energy, although the energy depression may be reduced. To suppress the reduction of the pulse energy, the minimum value Vmin and the maximum value Vmax of the charging voltage V may be raised at S1504.

Next, at S1505, the gas controller 32 may determine whether the maximum value Vmax of the charging voltage V is in an acceptable range. This may be made by comparing the maximum value Vmax of the charging voltage V with a threshold value Vmaxmax. If the maximum value Vmax of the charging voltage V is not in the acceptable range (S1505: NO), the gas controller 32 may proceed to S1503 without further raising the maximum value Vmax of the charging voltage V.

If the maximum value Vmax of the charging voltage V is in the acceptable range (S1505: YES), the gas controller 32 may proceed to S1506.

At S1506, the gas controller 32 may store the minimum value Vmin and the maximum value Vmax of the charging voltage V in a storage device.

Next, at S1540, the gas controller 32 may perform a control of decreasing the partial pressure of halogen gas. Details of this process will be described below with reference to FIGS. 18 and 19.

After S1540, the gas controller 32 may end the process of this flowchart and return to the process of FIG. 15.

Figure 18:
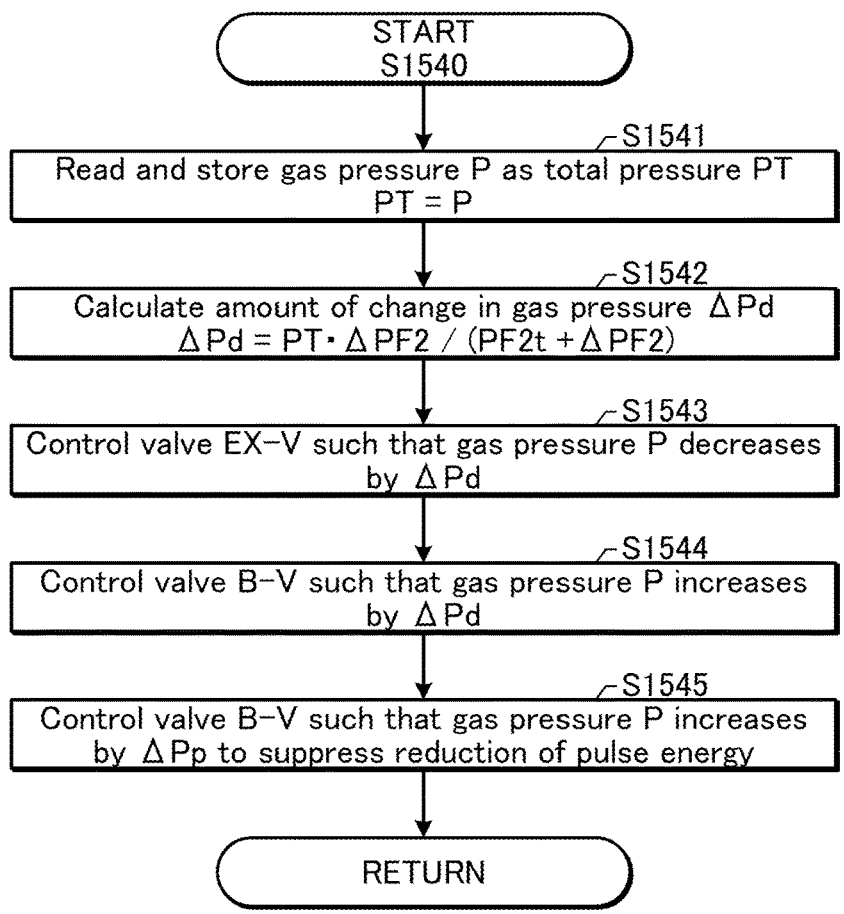
FIG. 18 is a flowchart showing a first example of a control of decreasing the partial pressure of halogen gas shown in FIG. 17.

3.2.2.2.1 First Example of Control of Decreasing Partial Pressure of Halogen Gas FIG. 18 is a flowchart showing a first example of the control of decreasing the partial pressure of halogen gas shown in FIG. 17. The process of FIG. 18 may be performed by the gas controller 32 as a subroutine of S1540 shown in FIG. 17.

First, at S1541, the gas controller 32 may read the gas pressure P from the chamber pressure sensor 16 and store it as a total pressure PT in a storage device.

Next, at S1542, the gas controller 32 may calculate an amount of change $\Delta Pd$ in the gas pressure by the following formula.

$\Delta Pd=PT\cdot \Delta PF2/(PF2t+\Delta PF2)$

Here, PF2t may be the target value of the partial pressure of halogen gas. $\Delta PF2$ may be the positive value showing the amount of decrease in the partial pressure of halogen gas. In other words, $\Delta PF2$ may be the value that is used for changing the target value PF2t of the partial pressure of halogen gas at S1501.

Next, at S1543, the gas controller 32 may control the valve EX-V such that the gas pressure P decreases by $\Delta Pd$. Controlling the valve EX-V may cause a part of the laser gas in the chamber 10 to be exhausted and the gas pressure P to be decreased. The exhausted laser gas may include halogen gas. The partial pressure of halogen gas may thus decrease.

Next, at S1544, the gas controller 32 may control the valve B-V such that the gas pressure P increases by $\Delta Pd$. Controlling the valve B-V may cause buffer gas to be injected into the chamber 10 and the gas pressure P to be increased. The buffer gas may not necessarily include halogen gas. The partial pressure of halogen gas may not be substantially changed by injecting the buffer gas.

Here, the buffer gas is injected at S1544 after a part of the laser gas is exhausted at S1543. However, the present disclosure is not limited to this. A part of the laser gas is exhausted after the buffer gas is injected.

The process described above may decrease the partial pressure of halogen gas in the chamber 10. The amount of the laser gas exhausted at S1543 and the amount of the buffer gas injected at S1544 may be substantially the same. The gas pressure P in the chamber 10 at the end of S1544 may thus be substantially the same as the total pressure PT stored in the storage device at S1541. If the process of this flowchart is ended at S1544, the gas condition other than the partial pressure of halogen gas after the process of this flowchart may be substantially the same as that before the process of this flowchart.

However, decreasing the partial pressure of halogen gas without changing the other condition may cause a reduction of the pulse energy of the pulse laser beam. The process of S1545 may thus be performed in addition to the process from S1541 to S1544.

At S1545, the gas controller 32 may control the valve B-V such that the gas pressure P increases by $\Delta Pp$. Controlling the valve B-V may cause buffer gas to be injected into the chamber 10 and the gas pressure P to be increased. Increasing the gas pressure P may suppress the reduction of the pulse energy. $\Delta Pp$ may be an amount of increase in the gas pressure to suppress the reduction of the pulse energy of the output pulse laser beam.

After S1544 or S1545, the gas controller 32 may end the process of this flowchart and return to the process of FIG. 17.

Figure 19:
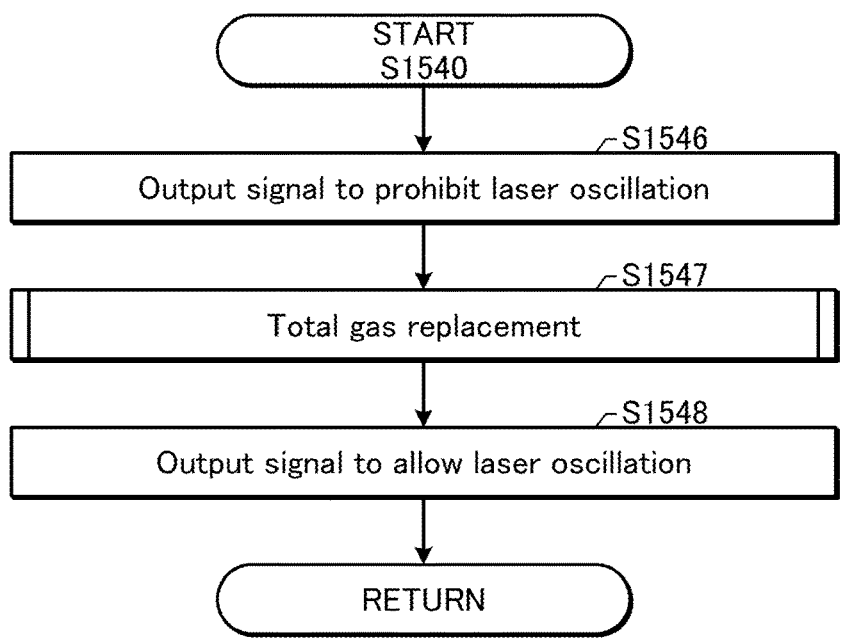
FIG. 19 is a flowchart showing a second example of the control of decreasing the partial pressure of halogen gas shown in FIG. 17.

3.2.2.2.2 Second Example of Control of Decreasing Partial Pressure of Halogen Gas FIG. 19 is a flowchart showing a second example of the control of decreasing the partial pressure of halogen gas shown in FIG. 17. The process of FIG. 19 may be performed by the gas controller 32 as a subroutine of S1540 shown in FIG. 17.

First, at S1546, the gas controller 32 may output a signal to prohibit laser oscillation to the laser controller 30. The laser controller 30 may stop the output of the pulse laser beam based on the signal to prohibit laser oscillation, since it may be conceived that the gas condition in the chamber 10 is not completed.

Next, at S1547, the gas controller 32 may control the laser gas control system 40 to perform the total gas replacement. The total gas replacement may be performed such that the partial pressure of halogen gas in the chamber 10 is adjusted to the target value PF2t of the partial pressure of halogen gas that has been set at S1501. The gas pressure P after the total gas replacement may be substantially the same as that before the total gas replacement. Alternatively, the gas pressure P after the total gas replacement may be made higher than that before the total gas replacement to suppress the reduction of the pulse energy.

Next, at S1548, the gas controller 32 may output a signal to allow laser oscillation to the laser controller 30. The laser controller 30 may start the output of the pulse laser beam based on the signal to allow laser oscillation, since it may be conceived that the gas condition in the chamber 10 is completed.

The process described above may decrease the partial pressure of halogen gas in the chamber 10.

After S1548, the gas controller 32 may end the process of this flowchart and return to the process of FIG. 17.

3.3 Others

The first embodiment may relate to an ArF excimer laser apparatus. However, the present disclosure is not limited to this. As the rare gas, the argon gas may be substituted by krypton gas or xenon gas. As the halogen gas, the fluorine gas may be substituted by chlorine gas. The neon gas may be substituted by helium gas.

In the first embodiment, the analyzing and controlling unit 33 may be provided separately from the laser controller 30. However, the present disclosure is not limited to this. The laser controller 30 may have the function of the analyzing and controlling unit 33. In the first embodiment, the gas controller 32 may be provided separately from the laser controller 30. However, the present disclosure is not limited to this. The laser controller 30 may have the function of the gas controller 32.

In the first embodiment, the excimer laser apparatus is a laser oscillator including a single chamber 10. However, the present disclosure is not limited to this. The excimer laser apparatus may include one or more amplifiers each including a chamber.

3.4 Effect

According to the first embodiment, the excimer laser apparatus may detect the energy depression. The excimer laser apparatus may adjust the partial pressure of halogen gas in the chamber based on the results of detecting the energy depression. Decreasing the partial pressure of halogen gas may suppress the occurrence of the energy depression. The lifetime of the chamber may thus be extended. Stopping the output of the pulse laser beam to replace the chamber may be temporarily avoided. Influence on the production schedule of the semiconductor factory may thus be suppressed.

Decreasing the partial pressure of halogen gas may cause the pulse energy of the output pulse laser beam to be reduced. To achieve desired pulse energy, it may be necessary to raise the charging voltage V or increase the gas pressure P in the chamber. Even if the charging voltage V is raised or the gas pressure P is increased, the occurrence of the energy depression may be suppressed by decreasing the partial pressure of halogen gas, and thus the lifetime of the chamber may be extended.

Figure 20:
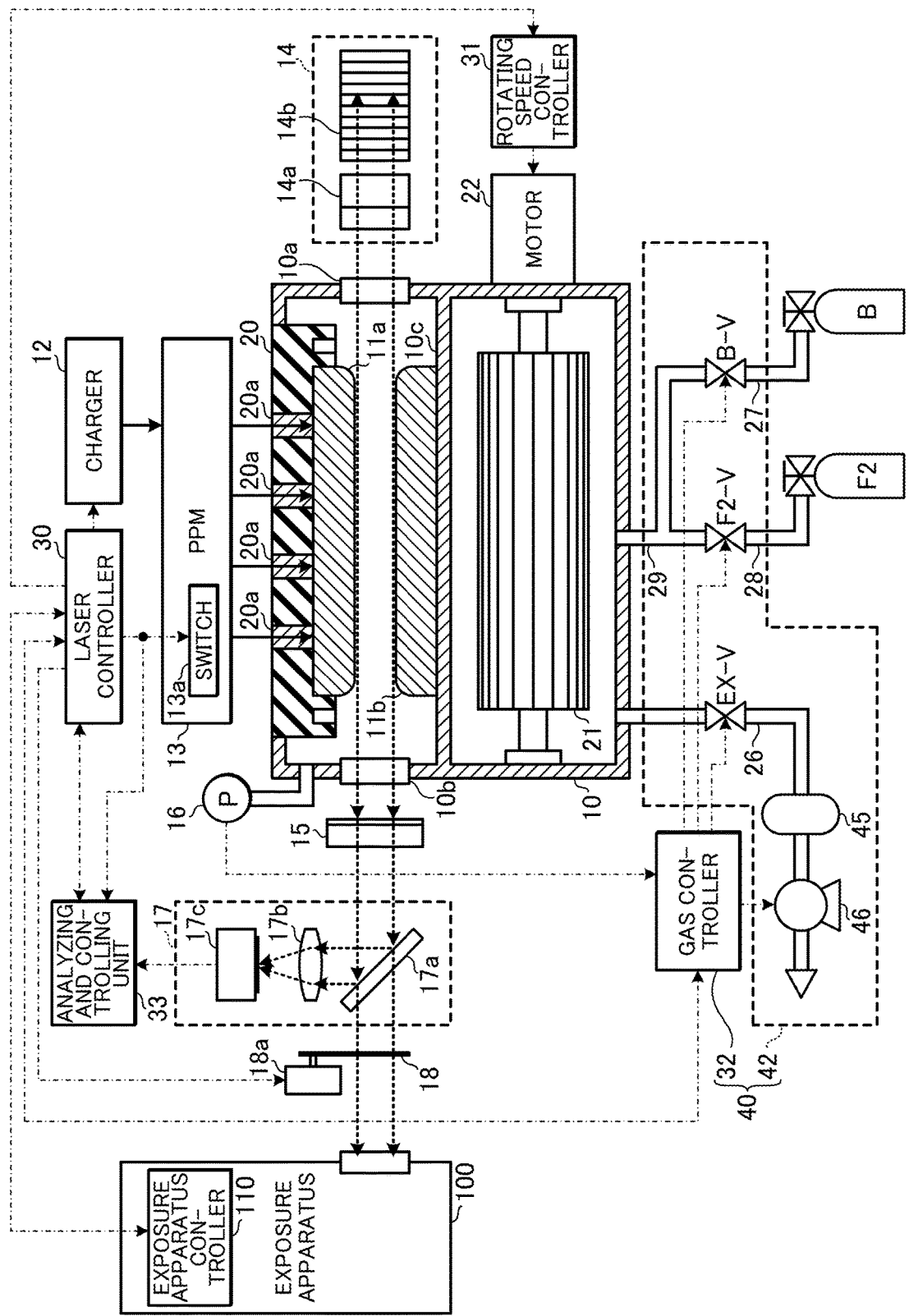
FIG. 20 schematically shows a configuration of an excimer laser apparatus according to a second embodiment of the present disclosure.

4. Excimer Laser Apparatus to Detect Energy Depression with Reduced Rotating Speed of Fan 4.1 Configuration FIG. 20 schematically shows a configuration of an excimer laser apparatus according to a second embodiment of the present disclosure. The excimer laser apparatus in the second embodiment may include a rotating speed controller 31 and a shutter 18.

The rotating speed controller 31 may be connected to the motor 22 and configured to adjust the rotating speed of the cross-flow fan 21. The rotating speed controller 31 may also be connected to the laser controller 30 and configured to be controlled by the laser controller 30. The rotating speed controller 31 may be an inverter if the motor 22 is an alternating current motor. The rotating speed controller 31 may be a voltage variable unit if the motor 22 is a direct current motor.

The shutter 18 may be provided in the optical path of the pulse laser beam between the energy monitor 17 and the exposure apparatus 100. The shutter 18 may include an actuator 18a. The actuator 18a may move the shutter 18 such that the shutter 18 blocks the pulse laser beam or allows the pulse laser beam to be outputted to the exposure apparatus 100. The actuator 18a may be controlled by the laser controller 30.

In other aspects, the second embodiment may have substantially the same configuration as the first embodiment described with reference to FIG. 9.

4.2 Operation

In the excimer laser apparatus of the second embodiment, the process of the laser controller 30 may be substantially the same as the process in the comparative example described with reference to FIGS. 2 and 6.

In the excimer laser apparatus of the second embodiment, the process of the analyzing and controlling unit 33 and the gas controller 32 may be substantially the same as the process in the first embodiment described with reference to FIGS. 10 to 19, except for the points described below.

4.2.1 Control for Reducing Energy Depression

Figure 21:
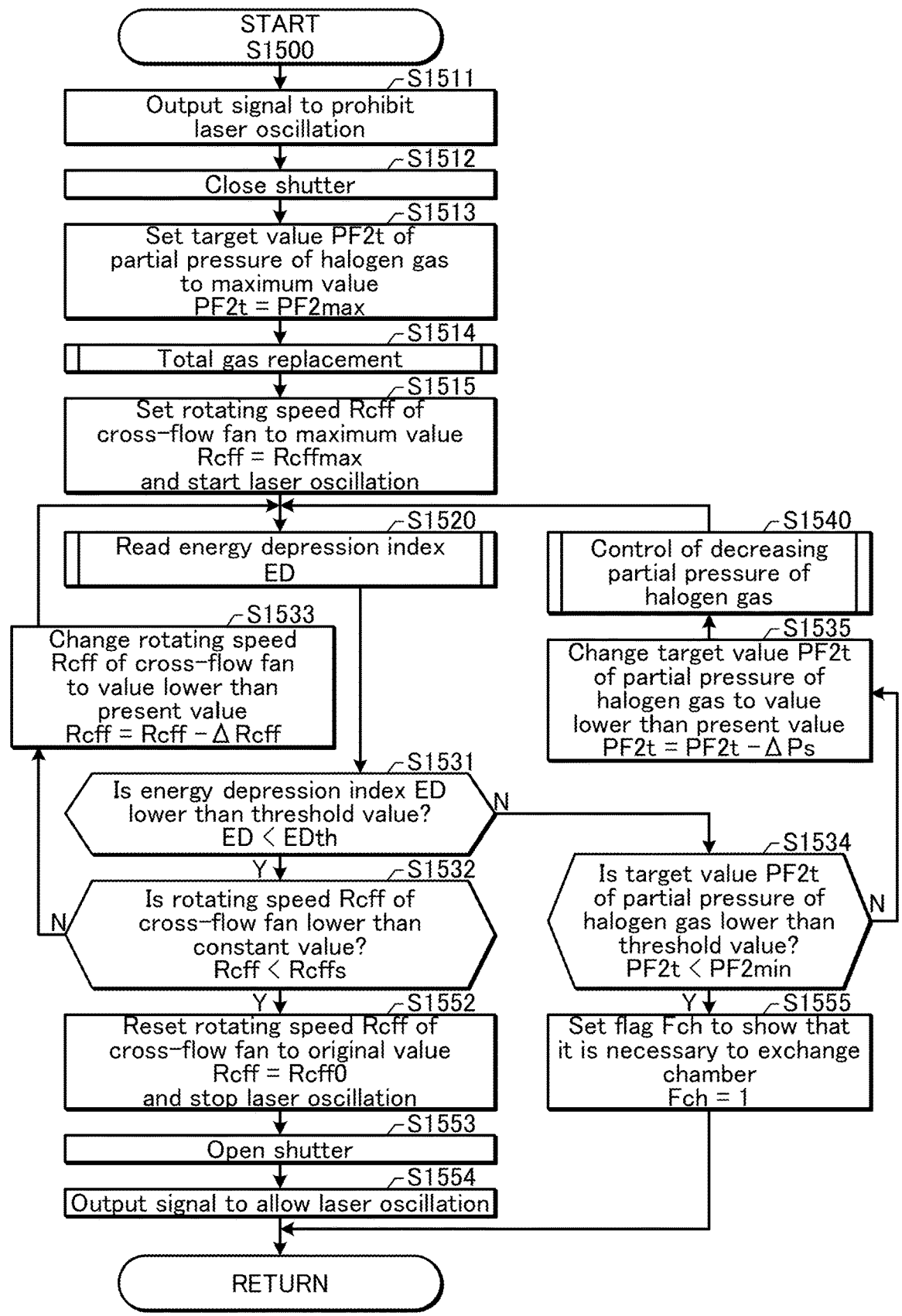
FIG. 21 is a flowchart showing details of a control for reducing the energy depression in the second embodiment.

FIG. 21 is a flowchart showing details of the control for reducing the energy depression in the second embodiment. The process of FIG. 21 may be performed by the gas controller 32 as a subroutine of S1500 shown in FIG. 15.

First, at S1511, the gas controller 32 may output the signal to prohibit laser oscillation to the laser controller 30. The laser controller 30 may stop the output of the pulse laser beam based on the signal to prohibit laser oscillation, since it may be conceived that the gas condition in the chamber 10 is not completed. The laser controller 30 may further send a signal to prohibit exposure to the exposure apparatus controller 110.

Next, at S1512, the gas controller 32 may send a signal to close the shutter 18 to the laser controller 30. Upon receiving this signal, the laser controller 30 may send a control signal to the actuator 18a to close the shutter 18.

Next, at S1513, the gas controller 32 may set the target value PF2t of the partial pressure of halogen gas to the maximum value PF2max.

Next, at S1514, the gas controller 32 may control the laser gas control system 40 to perform the total gas replacement. The total gas replacement may be performed such that the partial pressure of halogen gas in the chamber 10 is adjusted to the target value PF2t of the partial pressure of halogen gas that has been set at S1513.

Next, at S1515, the gas controller 32 may set, via the laser controller 30, the rotating speed Rcff of the cross-flow fan 21 to a maximum value Rcffmax.

Further, the gas controller 32 may start, via the laser controller 30, laser oscillation at a predetermined repetition frequency.

Next, at S1520, the gas controller 32 may read an energy depression index ED from a storage device. The energy depression index ED may be calculated by the process of the analyzing and controlling unit 33 described below with reference to FIG. 24. Details of the process of S1520 will be described below with reference to FIG. 24.

Next, at S1531, the gas controller 32 may determine whether the energy depression index ED is lower than a threshold value.

If the energy depression index ED is lower than the threshold value EDth at S1531 (S1531: YES), the gas controller 32 may proceed to S1532. However, the energy depression index ED may be replaced by the number of times Nd of detecting the energy depression described with reference to FIGS. 11 to 14.

At S1532, the gas controller 32 may determine whether the rotating speed Rcff of the cross-flow fan 21 is lower than a constant value Rcffs.

If the rotating speed Rcff is equal to or higher than the constant value Rcffs at S1532 (S1532: NO), the gas controller 32 may proceed to S1533.

At S1533, the gas controller 32 may change the rotating speed Rcff of the cross-flow fan 21 to a value lower than the present value. The rotating speed Rcff may be set as follows.

$$Rcff = Rcff - \Delta Rcff$$

Here, $\Delta Rcff$ may be a positive value showing the amount of reduction of the rotating speed Rcff.

After S1533, the gas controller 32 may return to S1520. Repeating the process of S1520 and S1531 to S1533 may gradually decrease the rotating speed Rcff of the cross-flow fan 21. Decreasing the rotating speed Rcff of the cross-flow fan 21 may allow the energy depression to tend to occur.

At S1531, if the energy depression index ED is equal to or higher than the threshold value EDth (S1531: NO), the gas controller 32 may proceed to S1534.

At S1534, the gas controller 32 may determine whether the target value PF2t of the partial pressure of halogen gas is lower than a threshold value PF2 min.

If the target value PF2t of the partial pressure of halogen gas is equal to or higher than the threshold value PF2 min at S1534 (S1534: NO), the gas controller 32 may proceed to S1535.

At S1535, the gas controller 32 may change the target value PF2t of the partial pressure of halogen gas to a value lower than the present value. The target value PF2t of the partial pressure of halogen gas may be set as follows.

$$PF2t = PF2t - \Delta Ps$$

Here, $\Delta Ps$ may be a positive value showing the amount of decrease in the target value PF2t of the partial pressure of halogen gas.

Next, at S1540, the gas controller 32 may perform the control of decreasing the partial pressure of halogen gas. Details of this process may be substantially the same as that described with reference to FIGS. 18 and 19.

After S1540, the gas controller 32 may return to S1520.

The process of S1534, S1535 and S1540 may thus be executed when the energy depression index ED is equal to or higher than the threshold value EDth. The partial pressure of halogen gas in the chamber 10 may thus decrease. The energy depression may be reduced.

After the process of S1534, S1535 and S1540 is executed to decrease the partial pressure of halogen gas in the chamber 10, the process of S1520 and S1531 to S1533 may be executed to decrease the rotating speed Rcff of the cross-flow fan 21. Decreasing the partial pressure of halogen gas may be repeated until the energy depression index ED is reduced to a value lower than the threshold value EDth in spite of decreasing the rotating speed Rcff to a value lower than the constant value Rcffs.

At S1532, if the rotating speed Rcff is lower than the constant value Rcffs (S1532: YES), the gas controller 32 may proceed to S1552.

At S1552, the gas controller 32 may reset the rotating speed Rcff of the cross-flow fan 21 to an original value Rcff0. The original value Rcff0 may be a value of the rotating speed where the pulse laser beam is outputted to the exposure apparatus 100. The original value Rcff0 may be a value higher than the constant value Rcffs used in S1532.

The gas controller 32 may then stop, via the laser controller 30, the laser oscillation.

Next, at S1553, the gas controller 32 may send a signal to the laser controller 30 to open the shutter 18. Upon receiving the signal, the laser controller 30 may send a control signal to the actuator 18a to open the shutter 18.

Next, at S1554, the gas controller 32 may output the signal to allow laser oscillation to the laser controller 30. The laser controller 30 may output a signal to allow exposure to the exposure apparatus controller 110 based on the signal to allow laser oscillation, since it may be conceived that the gas condition in the chamber 10 is completed. The laser controller 30 may start outputting the pulse laser beam according to the oscillation trigger signal from the exposure apparatus controller 110.

After S1554, the gas controller 32 may end the process of this flowchart and return to the process of FIG. 15.

At S1534, if the target value PF2t of the partial pressure of halogen gas is lower than the threshold value PF2 min (S1534: YES), the gas controller 32 may proceed to S1555 without further decreasing the partial pressure of halogen gas.

At S1555, the gas controller 32 may set the flag Fch showing the necessity of chamber exchange to 1, showing that it is necessary to exchange the chamber. The gas controller 32 may then end the process of this flowchart and return to the process of FIG. 15. The flag Fch may be used at S1600.

4.2.1.2 Calculating Energy Depression Index ED

Figure 22:
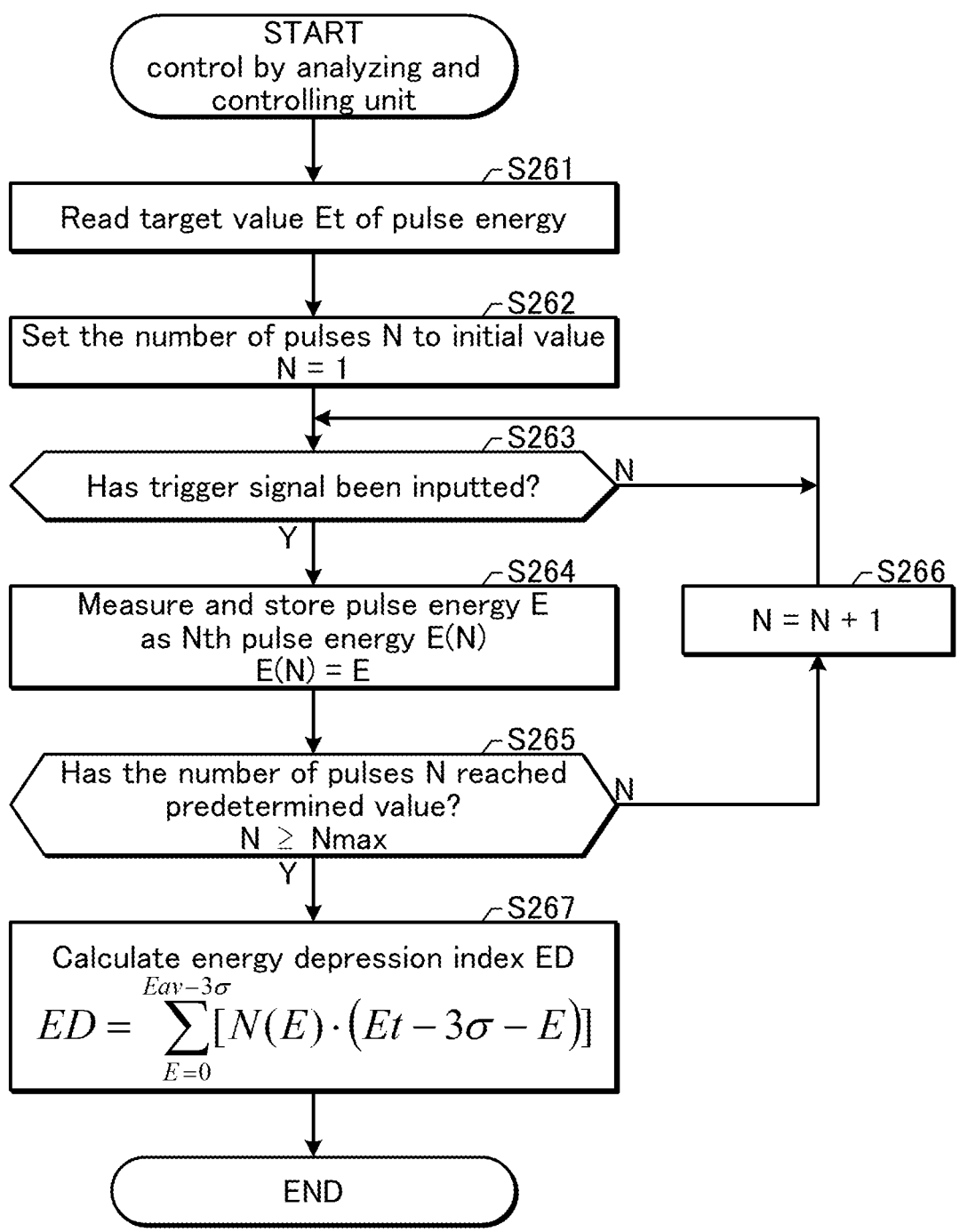
FIG. 22 is a flowchart showing a process of an analyzing and controlling unit 33 in the excimer laser apparatus of the second embodiment.

FIG. 22 is a flowchart showing a process of an analyzing and controlling unit 33 in the excimer laser apparatus of the second embodiment. The analyzing and controlling unit 33 may perform the following process to calculate the energy depression index ED.

First, at S261, the analyzing and controlling unit 33 may receive and read the data on the target value Et of the pulse energy from the laser controller 30.

Next, at S262, the analyzing and controlling unit 33 may set the number of pulses N to an initial value 1.

Next, at S263, the analyzing and controlling unit 33 may determine whether the trigger signal has been inputted. If the trigger signal has not been inputted (S263: NO), the analyzing and controlling unit 33 may wait until the trigger signal is inputted. If the trigger signal has been inputted (S263: YES), the analyzing and controlling unit 33 may proceed to S264.

At S264, the analyzing and controlling unit 33 may measure the pulse energy E based on the output from the energy monitor 17 and store it as an Nth pulse energy E(N) in the storage device.

Next, at S265, the analyzing and controlling unit 33 may determine whether the number of pulses N has reached a predetermined value Nmax. If the number of pulses N has not reached the predetermined value Nmax (S265: NO), the analyzing and controlling unit 33 may add 1 to the number of pulses N at S266 to update the value of N. The analyzing and controlling unit 33 may then return to S263. If the number of pulses N has reached the predetermined value Nmax (S265: YES), the analyzing and controlling unit 33 may proceed to S267.

At S267, the analyzing and controlling unit 33 may calculate the energy depression index ED by the following formula.

$$ED = \sum_{E=0}^{Eav-3\sigma} [N(E) \cdot (Et - 3\sigma - E)]$$

After S267, the analyzing and controlling unit 33 may end the process of this flowchart.

Figure 23:
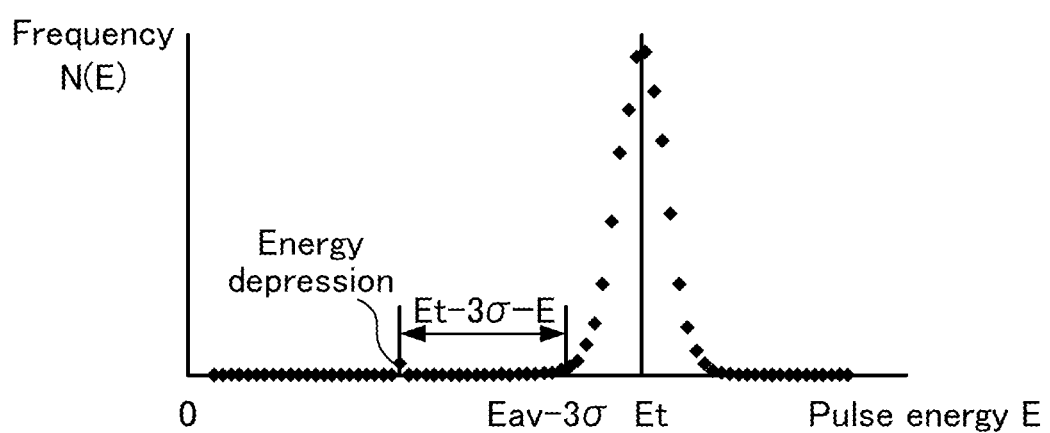
FIG. 23 explains a formula to calculate an energy depression index ED.

FIG. 23 explains the formula to calculate the energy depression index ED shown in FIG. 22. In FIG. 23, the horizontal axis may represent a pulse energy E and the vertical axis may represent a frequency N(E) of the pulse energy. The frequency N(E) of the pulse energy may be represented by the number of times of outputting the pulse energy E. As described with reference to FIG. 2, the pulse energy E may be kept in the vicinity of to the target value Et of the pulse energy. The distribution of pulse energies E shown in FIG. 23 may thus have a steep peak in the vicinity of the target value Et of the pulse energy. The average Eav of the pulse energies E may substantially coincide with the target value Et of the pulse energy. If it is an ideal situation where the deterioration of the electrode has not progressed, the distribution of the pulse energies E may be a substantially normal distribution. In that case, the probability where a certain value of pulse energy E is in a range of $\pm 3\sigma$ from the target value Et of the pulse energy may be approximately 99.73%. Here, $\sigma$ may be the standard deviation of pulse energies E.

However, as the deterioration of the electrode progresses, a frequency of the energy depression where a pulse having a pulse energy E significantly lower than the target value Et of the pulse energy is outputted may increase. The energy depression may be a serious problem in a case where the difference $Et-3\sigma-E$ between the value $Et-3\sigma$ and the pulse energy E is high as well as the frequency N(E) is high. Accordingly, a value obtained by accumulating products of N(E) and $Et-3\sigma-E$ in a predetermined range may be defined as an energy depression index ED. The predetermined range may be, for example, from E=0 to $E=Eav-3\sigma$.

4.2.1.3 Reading Energy Depression Index ED

Figure 24:
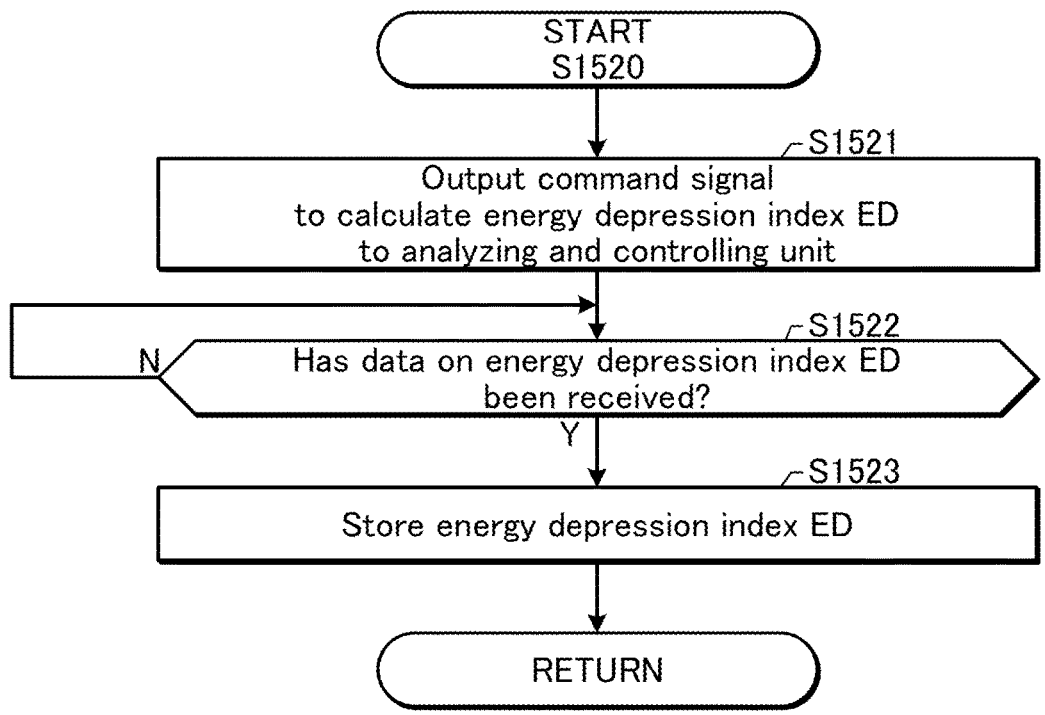
FIG. 24 is a flowchart showing a process to read the energy depression index shown in FIG. 21.

FIG. 24 is a flowchart showing a process to read the energy depression index shown in FIG. 21. The process of FIG. 24 may be performed by the gas controller 32 as a subroutine of S1520 shown in FIG. 21.

First, at S1521, the gas controller 32 may output a command signal to calculate the energy depression index ED to the analyzing and controlling unit 33. The analyzing and controlling unit 33 may calculate the energy depression index ED in the process described with reference to FIGS. 22 and 23.

Next, at S1522, the gas controller 32 may determine whether it has received the data on the energy depression index ED from the analyzing and controlling unit 33. If the gas controller 32 has not received the data on the energy depression index ED, the gas controller 32 may wait until it receives the data. If the gas controller 32 has received the data on the energy depression index ED, the gas controller 32 may proceed to S1523.

At S1523, the gas controller 32 may store the received energy depression index ED in the storage device.

After S1523, the gas controller 32 may end the process of this flowchart and return to the process of FIG. 21.

4.3 Effect

Figure 25:
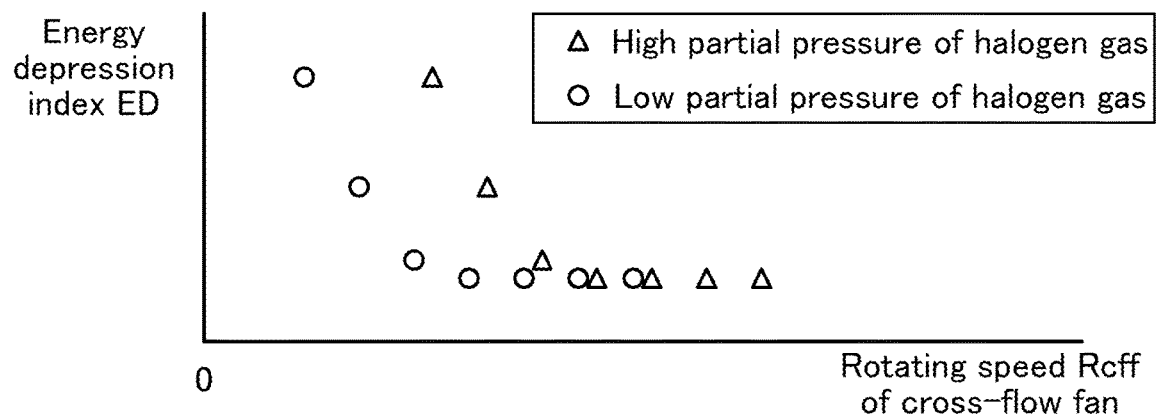
FIG. 25 shows a relationship between the rotating speed Rcff of a cross-flow fan 21 and the energy depression index ED.

FIG. 25 shows a relationship between the rotating speed Rcff of the cross-flow fan 21 and the energy depression index ED. In FIG. 25, the degree of deterioration of the pair of discharge electrodes 11a and 11b included in the chamber 10 may be constant. FIG. 25 shows the energy depression index ED at each of values of the rotating speed Rcff for each of values of the partial pressure of halogen gas.

As shown in FIG. 25, the energy depression index ED may tend to be low at a high rotating speed Rcff of the cross-flow fan 21. Accordingly, when the pulse laser beam is outputted to the exposure apparatus 100, an optimum value of the rotating speed Rcff of the cross-flow fan 21 may be at the right side in FIG. 25. When the pulse laser beam is outputted to the exposure apparatus 100, the optimum value of the rotating speed Rcff of the cross-flow fan 21 may be in a range from 4,000 rpm to 5,000 rpm.

However, the energy depression index ED may tend to be high at a low rotating speed Rcff of the cross-flow fan 21. The second embodiment may use this tendency by measuring the energy depression index ED at a low rotating speed Rcff. The deterioration of the electrodes may thus be found in a short term.

As shown in FIG. 25, even in the equivalent rotating speed Rcff, the energy depression index ED may be high at a high partial pressure of halogen gas and the energy depression index ED may be low at a low partial pressure of halogen gas. Accordingly, there may be a case where the energy depression may be reduced without significantly decreasing the partial pressure of halogen gas and a case where the energy depression may be reduced only by significantly decreasing the partial pressure of halogen gas. In the second embodiment, the energy depression index ED may be measured while gradually decreasing the partial pressure of halogen gas. This may avoid decreasing the partial pressure of halogen gas more than necessary.

Figure 26:
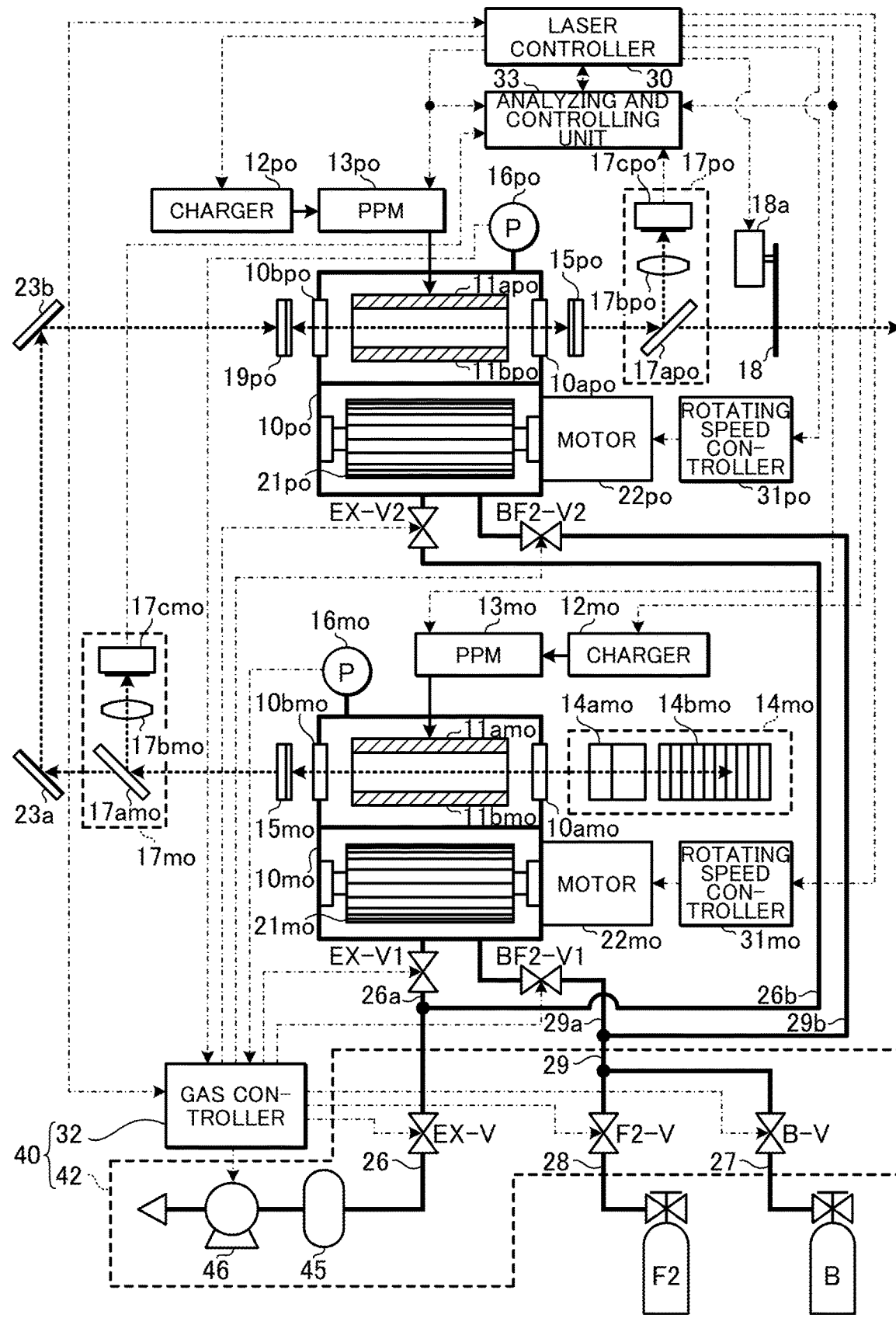
FIG. 26 schematically shows a configuration of an excimer laser apparatus according to a third embodiment of the present disclosure.

5. Excimer Laser Apparatus Including Laser Oscillator and Laser Amplifier 5.1 Configuration FIG. 26 schematically shows a configuration of an excimer laser apparatus according to a third embodiment of the present disclosure. In the third embodiment, the excimer laser apparatus may include a laser oscillator and a laser amplifier.

5.1.1 Laser Oscillator

The laser oscillator may include a chamber $10mo$, a charger $12mo$, a pulse power module $13mo$, a line narrow module $14mo$, an output coupling mirror $15mo$, a chamber pressure sensor $16mo$, an energy monitor $17mo$, a cross-flow fan $21mo$, and a motor $22mo$. The constituent elements of the laser oscillator in the third embodiment are shown in FIG. 26 with reference symbols in which "mo" is added to the last digit of the respective reference symbols of the constituent elements in the first embodiment. The configuration of the laser oscillator in the third embodiment may be substantially the same as the corresponding configuration in the laser oscillation system of the first embodiment and detailed description thereof may be omitted. In the following description, the laser oscillator may be abbreviated to "MO". An optical resonator of the MO may be referred to as a first optical resonator.

5.1.2 Laser Amplifier

The laser amplifier may include a chamber $10po$, a charger $12po$, a pulse power module $13po$, an output coupling mirror $15po$, a chamber pressure sensor $16po$, an energy monitor $17po$, a cross-flow fan $21po$, a motor $22po$, and a partially reflective mirror $19po$. The constituent elements of the laser amplifier in the third embodiment are shown in FIG. 26 with reference symbols in which "po" is added to the last digit of the respective reference symbols of the constituent elements in the laser oscillation system of the first embodiment. The configuration of the laser amplifier in the third embodiment may be substantially the same as the corresponding configuration in the laser oscillation system of the first embodiment and detailed description thereof may be omitted. In the following description, the laser amplifier may be abbreviated to "PO".

High-reflective mirrors $23a$ and $23b$ may be provided in the optical path of the pulse laser beam between the chamber $10mo$ and the chamber $10po$.

In contrast to the MO including the line narrow module $14mo$, the PO may include the partially reflective mirror $19po$. The partially reflective mirror $19po$ may be provided in the optical path of the pulse laser beam between the high-reflective mirror $23b$ and the chamber $10po$. The partially reflective mirror $19po$ may transmit a part of the pulse laser beam outputted from the chamber $10mo$ to allow the pulse laser beam to enter the chamber $10po$. The pulse laser beam entered the chamber $10po$ may reciprocate between the output coupling mirror $15po$ and the partially reflective mirror $19po$ constituting a second optical resonator. The pulse laser beam may thus be amplified each time it passes through the electric discharge space between a pair of discharge electrodes $11apo$ and $11bpo$ provided in the chamber $10po$, causing amplifying oscillation. The pulse laser beam thus amplified may be outputted from the output coupling mirror $15po$.

The shutter 18 may be provided in the optical path of the pulse laser beam outputted from the output coupling mirror $15po$ and passed through the energy monitor $17po$. The shutter 18 may be substantially the same as that described in the second embodiment.

The laser controller 30 may send first and second trigger signals to the pulse power modules $13mo$ and $13po$, respectively. The output timing of the first and second trigger signals may be controlled such that the time at which the pulse laser beam oscillated in the first optical resonator and outputted from the MO is injected into the second optical resonator of the PO and the time at which the electric discharge occurs between the pair of discharge electrodes $11apo$ and $11bpo$ substantially coincide with each other.

In this specification, synchronizing the output of the pulse laser beam from the first optical resonator of the MO and the amplifying oscillation of the pulse laser beam injected into the second optical resonator of the PO is defined as injection locking.

5.1.3 Pipes

The pipe 29 may be branched to a pipe $29a$ and a pipe $29b$. The pipe $29a$ may be connected to the chamber $10mo$. The pipe $29b$ may be connected to the chamber $10po$. The valve BF2-V1 may be provided in the pipe $29a$. The valve BF2-V2 may be provided in the pipe $29b$.

The pipe 26 may be branched to a pipe $26a$ and a pipe $26b$. The pipe $26a$ may be connected to the chamber $10mo$. The pipe $26b$ may be connected to the chamber $10po$. The valve EX-V1 may be provided in the pipe $26a$. The valve EX-V2 may be provided in the pipe $26b$.

In this configuration, opening the valve BF2-V1 while the valve B-V is open may cause buffer gas to be injected into the chamber $10mo$. Opening the valve BF2-V2 while the valve B-V is open may cause buffer gas to be injected into the chamber $10po$.

Opening the valve BF2-V1 while the valve F2-V is open may cause halogen-containing gas to be injected into the chamber $10mo$. Opening the valve BF2-V2 while the valve F2-V is open may cause halogen-containing gas to be injected into the chamber $10po$.

Opening the valve EX-V1 while the valve EX-V is open may cause a part of the laser gas in the chamber $10mo$ to be exhausted. Opening the valve EX-V2 while the valve EX-V is open may cause a part of the laser gas in the chamber $10po$ to be exhausted.

In other aspects, the third embodiment may have substantially the same configuration as the first embodiment.

5.2 Operation 5.2.1 First Example of Process to Detect Energy Depression

Figure 27:
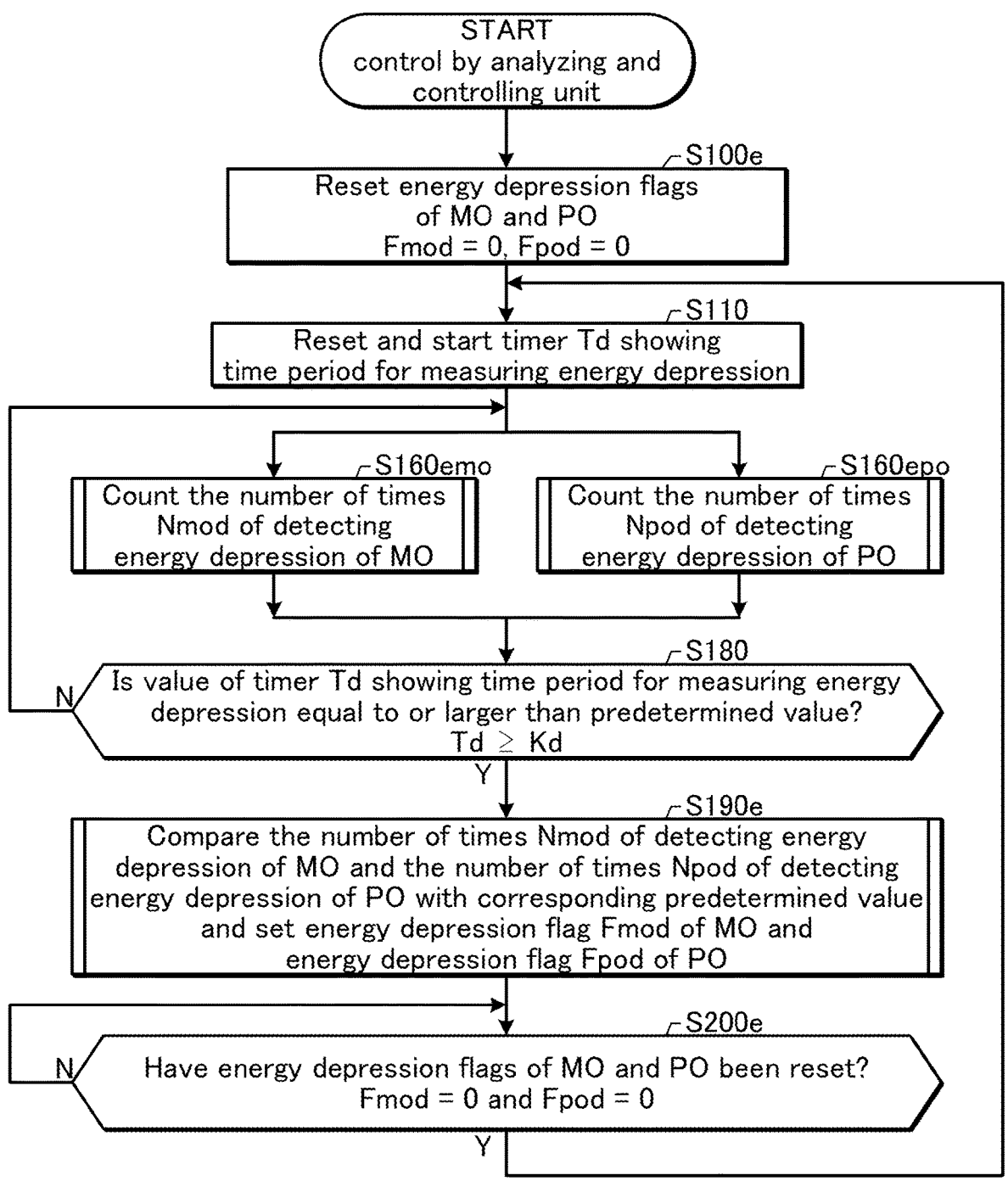
FIG. 27 is a flowchart showing a first example of a process of the analyzing and controlling unit 33 in the excimer laser apparatus of the third embodiment.

FIG. 27 is a flowchart showing a first example of the process of the analyzing and controlling unit 33 in the excimer laser apparatus of the third embodiment. The analyzing and controlling unit 33 may perform the following process to detect the energy depression of the MO and that of the PO.

First, at S100e, the analyzing and controlling unit 33 may reset both an energy depression flag Fmod of the MO and an energy depression flag Fpod of the PO to 0.

Next, at S110, the analyzing and controlling unit 33 may reset and start the timer Td showing the time period for measuring the energy depression. The time period for measuring the energy depression of the MO and that of the PO may be the same with each other. After S110, the analyzing and controlling unit 33 may execute the process of S160emo and the process of S160epo in parallel.

At S160emo, the analyzing and controlling unit 33 may count the number of times Nmod of detecting the energy depression of the MO. An example of the process of counting the number of times Nmod of detecting the energy depression of the MO will be described below with reference to FIG. 28.

At S160epo, the analyzing and controlling unit 33 may count the number of times Npod of detecting the energy depression of the PO. An example of the process of counting the number of times Npod of detecting the energy depression of the PO will be described below with reference to FIG. 29.

After S160emo and S160epo, the analyzing and controlling unit 33 may proceed to S180.

At S180, the analyzing and controlling unit 33 may determine whether the value of the timer Td showing the time period for measuring the energy depression is equal to or larger than a predetermined value Kd. If the value of the timer Td showing the time period for measuring the energy depression is smaller than the predetermined value Kd (S180: NO), the analyzing and controlling unit 33 may return to S160emo and S160epo. If the value of the timer Td showing the time period for measuring the energy depression is equal to or larger than the predetermined value Kd (S180: YES), the analyzing and controlling unit 33 may proceed to S190e.

At S190e, the analyzing and controlling unit 33 may compare the number of times Nmod of detecting the energy depression of the MO and the number of times Npod of detecting the energy depression of the PO with a corresponding predetermined value. The analyzing and controlling unit 33 may then set, based on the results of the comparison, the energy depression flag Fmod of the MO and the energy depression flag Fpod of the PO. Details of the process of S190e will be described below with reference to FIG. 30.

Next, at S200e, the analyzing and controlling unit 33 may determine whether both the energy depression flag Fmod of the MO and the energy depression flag Fpod of the PO have been reset. If these energy depression flags Fmod and Fpod have not been reset (S200e: NO), the analyzing and controlling unit 33 may wait until these energy depression flags Fmod and Fpod are reset. If these energy depression flags Fmod and Fpod have been reset (S200e: YES), the analyzing and controlling unit 33 may return to S110. For example, if the control for reducing the energy depression has been performed by the gas controller 32 in each of FIGS. 34 and 35 described below, the energy depression flags Fmod and Fpod may be reset.

Figure 28:
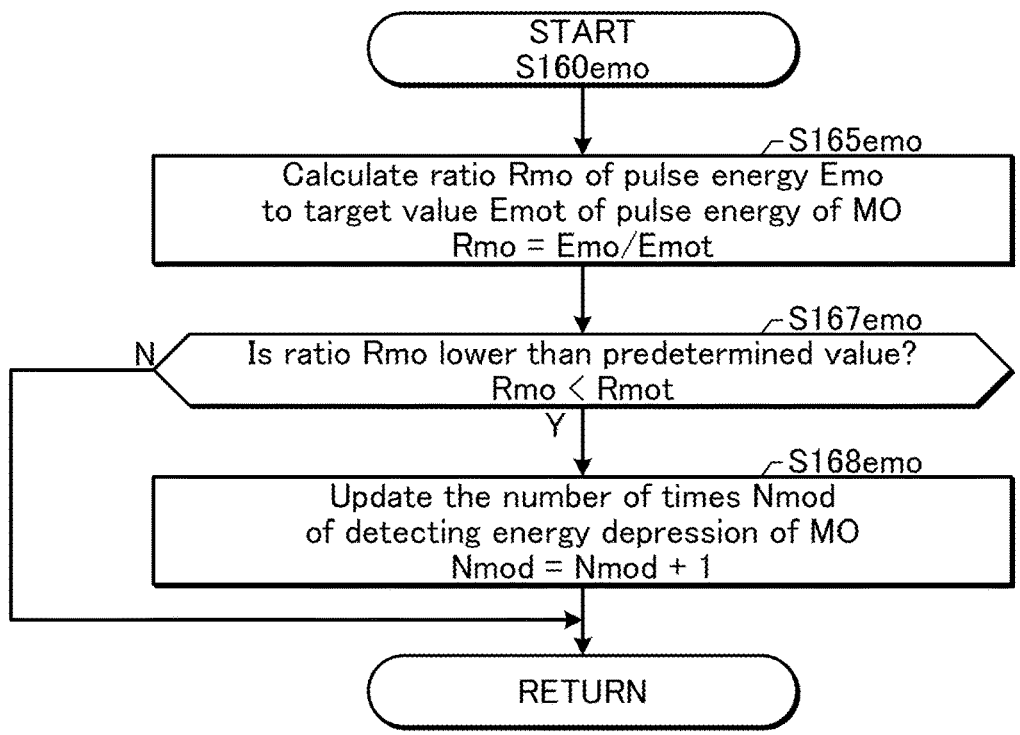
FIG. 28 is a flowchart showing an example of a process to count the number of times Nmod of detecting the energy depression of an MO shown in FIG. 27.

5.2.1.1 Example of Process to Count the Number of Times of Detecting Energy Depression FIG. 28 is a flowchart showing an example of the process to count the number of times Nmod of detecting the energy depression of the MO shown in FIG. 27. The process of FIG. 28 may be performed by the analyzing and controlling unit 33 as a subroutine of S160emo shown in FIG. 27.

The process of FIG. 28 may be substantially the same as the process in the first embodiment described with reference to FIG. 11 except that the last digit of each of the symbols each representing a step is changed from "a" to "emo", and "mo" is added to each of the reference symbols each representing an amount. In the present disclosure, each reference symbol with "mo" may represent the amount related to the MO. Each reference symbol with "mo" may correspond to the reference symbol without "mo" in the first or second embodiment.

In FIG. 28, the analyzing and controlling unit 33 may calculate the ratio Rmo of the pulse energy Emo of the MO measured based on the output from the energy monitor 17mo to the target value Emot of the pulse energy of the MO. The analyzing and controlling unit 33 may then compare the ratio Rmo with a predetermined value Rmot. The analyzing and controlling unit 33 may detect the energy depression of the MO based on the results of the comparison and count the number of times Nmod of detecting the energy depression of the MO.

The target value Emot of the pulse energy of the MO may be set to a value around the pulse energy with which the amplifying capacity of the PO is saturated. The pulse energy with which the amplifying capacity of the PO is saturated may mean a pulse energy of a pulse laser beam that is not further amplified by the PO. The predetermined value Rmot may be a constant value in a range from 0.1 to 0.5.

Figure 29:
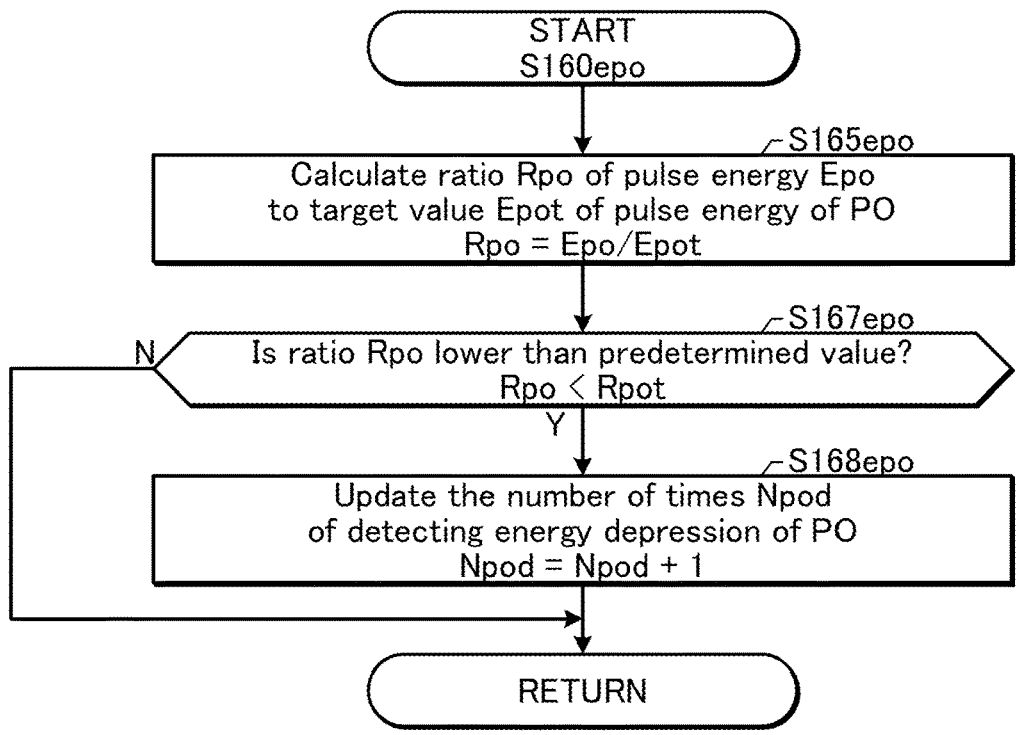
FIG. 29 is a flowchart showing an example of a process to count the number of times Npod of detecting the energy depression of a PO shown in FIG. 27.

FIG. 29 is a flowchart showing an example of the process to count the number of times Npod of detecting the energy depression of the PO shown in FIG. 27. The process of FIG. 29 may be performed by the analyzing and controlling unit 33 as a subroutine of S160epo shown in FIG. 27.

The process of FIG. 29 may be substantially the same as the process in the first embodiment described with reference to FIG. 11 except that the last digit of each of the symbols each representing a step is changed from "a" to "epo", and "po" is added to each of the reference symbols each representing an amount. In the present disclosure, each reference symbol with "po" may represent the amount related to the PO. Each reference symbol with "po" may correspond to the reference symbol without "po" in the first or second embodiment.

In FIG. 29, the analyzing and controlling unit 33 may calculate the ratio Rpo of the pulse energy Epo of the PO measured based on the output from the energy monitor 17po to the target value Epot of the pulse energy of the PO. The analyzing and controlling unit 33 may then compare the ratio Rpo with a predetermined value Rpot. The analyzing and controlling unit 33 may detect the energy depression of the PO based on the results of the comparison and count the number of times Npod of detecting the energy depression of the PO.

The predetermined value Rpot may be set as follows.

$$Rpot = \alpha \cdot Efr / Epot$$

Here, $\alpha$ may be a constant value in a range from 0.1 to 0.5. Efr may be a pulse energy of the pulse laser beam outputted from the PO if the PO is driven alone without driving the MO. Epot may be a target value of the pulse energy set by the exposure apparatus 100.

Even if the PO is in a normal condition, the pulse energy of the pulse laser beam outputted from the PO may depend on the pulse energy of the pulse laser beam outputted from the MO. The predetermined value Rpot may thus be set as described above. Even if the pulse energy of the pulse laser beam outputted from the PO reduces while the energy depression is occurring in the MO, the case where the energy depression is attributed to the PO may be avoided.

Alternatively, the predetermined value Rpot may be set as follows.

$$Rpot=\alpha$$

If the predetermined value Rpot is set as described above, monitoring the pulse energy of the PO, without monitoring the pulse energy of the MO, may reveal that some trouble in one of the MO and the PO is occurring.

Here, as an example of the process to count the number of times of detecting the energy depression, the process substantially the same as the process in FIG. 11 is performed for each of the MO and the PO. However, the present disclosure is not limited to this. The process substantially the same as the process in one of FIGS. 12 to 14 may be performed for each of the MO and the PO.

5.2.1.2 Example of Process to Set Energy Depression Flag

Figure 30:
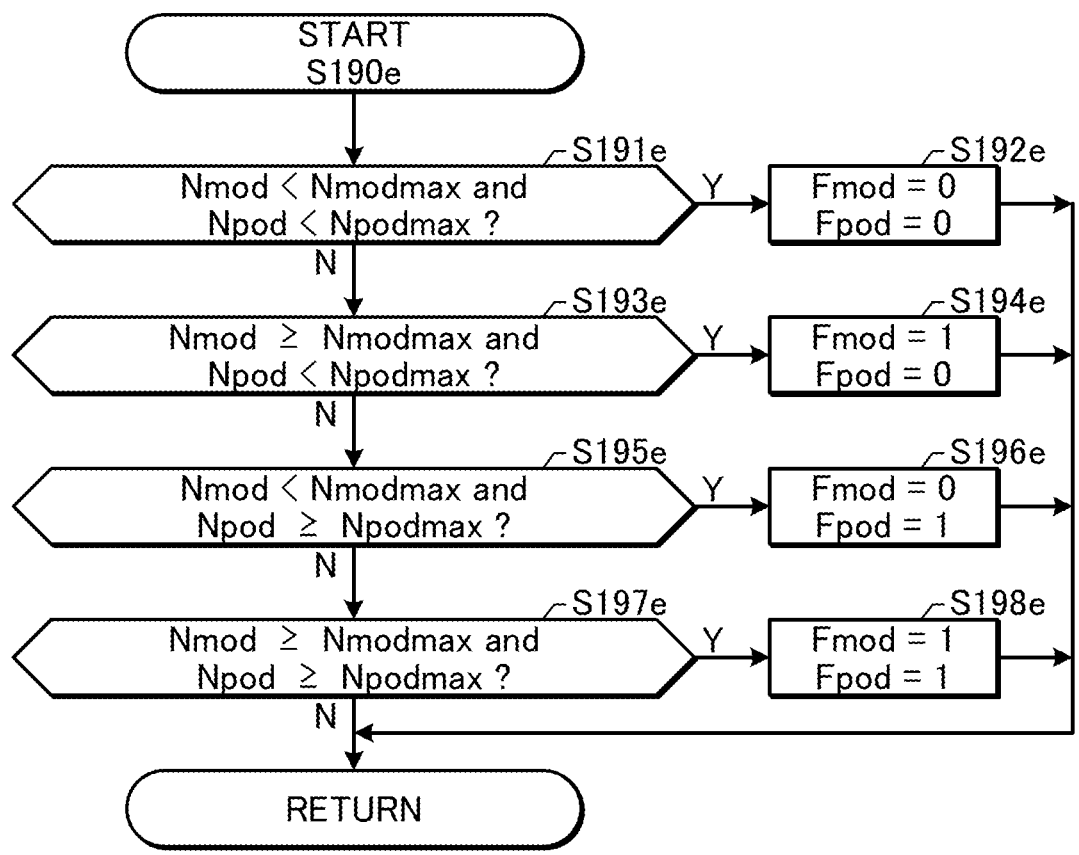
FIG. 30 is a flowchart showing an example of a process to set an energy depression flag shown in FIG. 27.

FIG. 30 is a flowchart showing an example of the process to set the energy depression flag shown in FIG. 27. The process of FIG. 30 may be performed by the analyzing and controlling unit 33 as a subroutine of S190e shown in FIG. 27. As described below, the analyzing and controlling unit 33 may compare the number of times Nmod of detecting the energy depression of the MO with a predetermined value Nmodmax, and compare the number of times Npod of detecting the energy depression of the PO with a predetermined value Npodmax. The analyzing and controlling unit 33 may set, based on the results of this comparison, the energy depression flag Fmod of the MO and the energy depression flag Fpod of the PO. The number of times Nmod of detecting the energy depression of the MO may correspond to a first frequency in the present disclosure. The number of times Npod of detecting the energy depression of the PO may correspond to a second frequency in the present disclosure. The predetermined value Nmodmax in FIG. 30 may correspond to a first predetermined value in the present disclosure. The predetermined value Npodmax in FIG. 30 may correspond to a second predetermined value in the present disclosure.

If Nmod<Nmodmax and Npod<Npodmax (S191e: YES), the analyzing and controlling unit 33 may set Fmod and Fpod to Fmod=0 and Fpod=0 (S192e).

If Nmod≥Nmodmax and Npod<Npodmax (S193e: YES), the analyzing and controlling unit 33 may set Fmod and Fpod to Fmod=1 and Fpod=0 (S194e).

If Nmod<Nmodmax and Npod≥Npodmax (S195e: YES), the analyzing and controlling unit 33 may set Fmod and Fpod to Fmod=0 and Fpod=1 (S196e).

If Nmod≥Nmodmax and Npod≥Npodmax (S197e: YES), the analyzing and controlling unit 33 may set Fmod and Fpod to Fmod=1 and Fpod=1 (S198e).

After setting the energy depression flag Fmod of the MO and the energy depression flag Fpod of the PO, the analyzing and controlling unit 33 may end the process of this flowchart and return to the process of FIG. 27.

5.2.2 Second Example of Process to Detect Energy Depression

Figure 31:
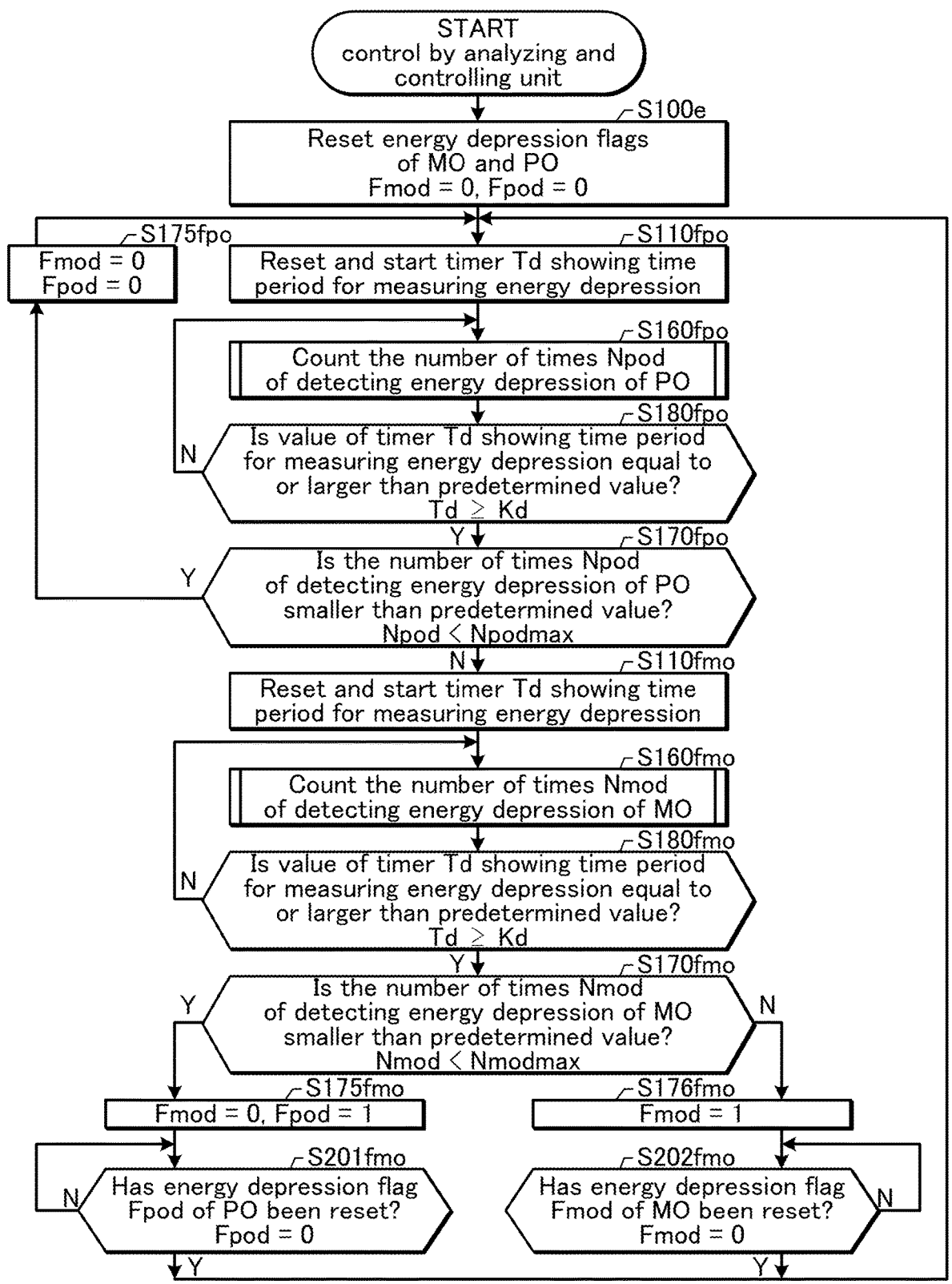
FIG. 31 is a flowchart showing a second example the process of the analyzing and controlling unit 33 in the excimer laser apparatus of the third embodiment.

FIG. 31 is a flowchart showing a second example of the process of the analyzing and controlling unit 33 in the excimer laser apparatus of the third embodiment. The analyzing and controlling unit 33 may perform the following process to detect the energy depression of the MO and the energy depression of the PO.

First, at S100e, the analyzing and controlling unit 33 may reset both the energy depression flag Fmod of the MO and the energy depression flag Fpod of the PO to 0. As described below, after S100e, the analyzing and controlling unit 33 may measure the energy depression of the PO at first. Then, if the number of times of detecting the energy depression of the PO is equal to or larger than a predetermined value, the analyzing and controlling unit 33 may measure the energy depression of the MO.

Next to S100e, at S110fpo, the analyzing and controlling unit 33 may reset and start the timer Td showing the time period for measuring the energy depression. The time period for measuring the energy depression of the MO and that of the PO may be the same.

Next, at S160fpo, the analyzing and controlling unit 33 may count the number of times Npod of detecting the energy depression of the PO. The process of counting the number of times Npod of detecting the energy depression may be substantially the same as the corresponding process in FIG. 27.

Next, at S180fpo, the analyzing and controlling unit 33 may determine whether the value of the timer Td showing the time period for measuring the energy depression is equal to or larger than a predetermined value Kd. If the value of the timer Td showing the time period for measuring the energy depression is smaller than the predetermined value Kd (S180fpo: NO), the analyzing and controlling unit 33 may return to S160fpo. If the value of the timer Td showing the time period for measuring the energy depression is equal to or larger than the predetermined value Kd (S180fpo: YES), the analyzing and controlling unit 33 may proceed to S170fpo.

At S170fpo, the analyzing and controlling unit 33 may determine whether the number of times Npod of detecting the energy depression of the PO is smaller than a predetermined value Npodmax. The predetermined value Npodmax in FIG. 31 may correspond to a third predetermined value in the present disclosure.

If the number of times Npod of detecting the energy depression of the PO is smaller than the predetermined value Npodmax (S170fpo: YES), the analyzing and controlling unit 33 may set, at S175fpo, both the energy depression flag Fmod of the MO and the energy depression flag Fpod of the PO to 0. If the energy of the PO is normal, it may be conceived that both the MO and the PO are in normal conditions. After S175fpo, the analyzing and controlling unit 33 may return to S110fpo.

If the number of times Npod of detecting the energy depression of the PO is equal to or larger than the predetermined value Npodmax (S170fpo: NO), the analyzing and controlling unit 33 may proceed to S110fmo.

Then, the process from S110fmo to S170fmo may detect the energy depression of the MO. The process from S110fmo to S170fmo may be different in this aspect from the process from S110fpo to S170fpo described above to detect the energy depression of the PO. In other aspects, the process from S110fmo to S170fmo may be substantially the same as the process from S110fpo to S170fpo.

If the number of times Nmod of detecting the energy depression of the MO is smaller than the predetermined value Nmodmax (S170fmo: YES), the analyzing and controlling unit 33 may set, at S175fmo, the energy depression flag Fmod of the MO to 0 and the energy depression flag Fpod of the PO to 1. The reason for setting the energy depression flag Fpod of the PO to 1 may be that the number of times Npod of detecting the energy depression of the PO is equal to or larger than the predetermined value Npodmax at S170fpo, while the energy of the MO is normal. In that case, the process of reducing the energy depression of the PO may be performed as described below with reference to FIG. 35. The predetermined value Nmodmax in FIG. 31 may correspond to a fourth predetermined value in the present disclosure.

If the number of times Nmod of detecting the energy depression of the MO is equal to or larger than the predetermined value Nmodmax (S170fmo: NO), the analyzing and controlling unit 33 may set, at S176fmo, the energy depression flag Fmod of the MO to 1. In that case, it is not clear whether the PO has a trouble. As described below with reference to FIG. 34, the process of reducing the energy depression of the MO may be performed.

After S175fmo, the analyzing and controlling unit 33 may proceed to S201fmo. After S176fmo, the analyzing and controlling unit 33 may proceed to S202fmo.

At S201fmo, the analyzing and controlling unit 33 may determine whether the energy depression flag Fpod of the PO has been reset. If the energy depression flag Fpod of the PO has not been reset (S201fmo: NO), the analyzing and controlling unit 33 may wait until the energy depression flag Fpod of the PO is reset. If the energy depression flag Fpod of the PO has been reset (S201fmo: YES), the analyzing and controlling unit 33 may return to S110fpo.

At S202fmo, the analyzing and controlling unit 33 may determine whether the energy depression flag Fmod of the MO has been reset. If the energy depression flag Fmod of the MO has not been reset (S202fmo: NO), the analyzing and controlling unit 33 may wait until the energy depression flag Fmod of the MO is reset. If the energy depression flag Fmod of the MO has been reset (S202fmo: YES), the analyzing and controlling unit 33 may return to S110fpo.

For example, if the energy depression occurs in each of the MO and the PO, the analyzing and controlling unit 33 may pass through S110fpo to S180fmo at first, determine NO at S170fmo, and proceed to S176fmo. The analyzing and controlling unit 33 may then set the energy depression flag Fmod of the MO to Fmod=1. After that, at S202fmo, the analyzing and controlling unit 33 may wait until the energy depression of the MO reduces. After the energy depression of the MO reduces, the analyzing and controlling unit 33 may again pass through S110fpo to S180fmo, determine YES at S170fmo, and proceed to S175fmo. The analyzing and controlling unit 33 may then set the energy depression flag Fmod of the MO to 0 and set the energy depression flag Fpod of the PO to 1. After that, at S201fmo, the analyzing and controlling unit 33 may wait until the energy depression of the PO reduces. The analyzing and controlling unit 33 may thus handle the situation where the energy depression occurs in each of the MO and the PO.

5.2.3 Energy Control

Figure 32:
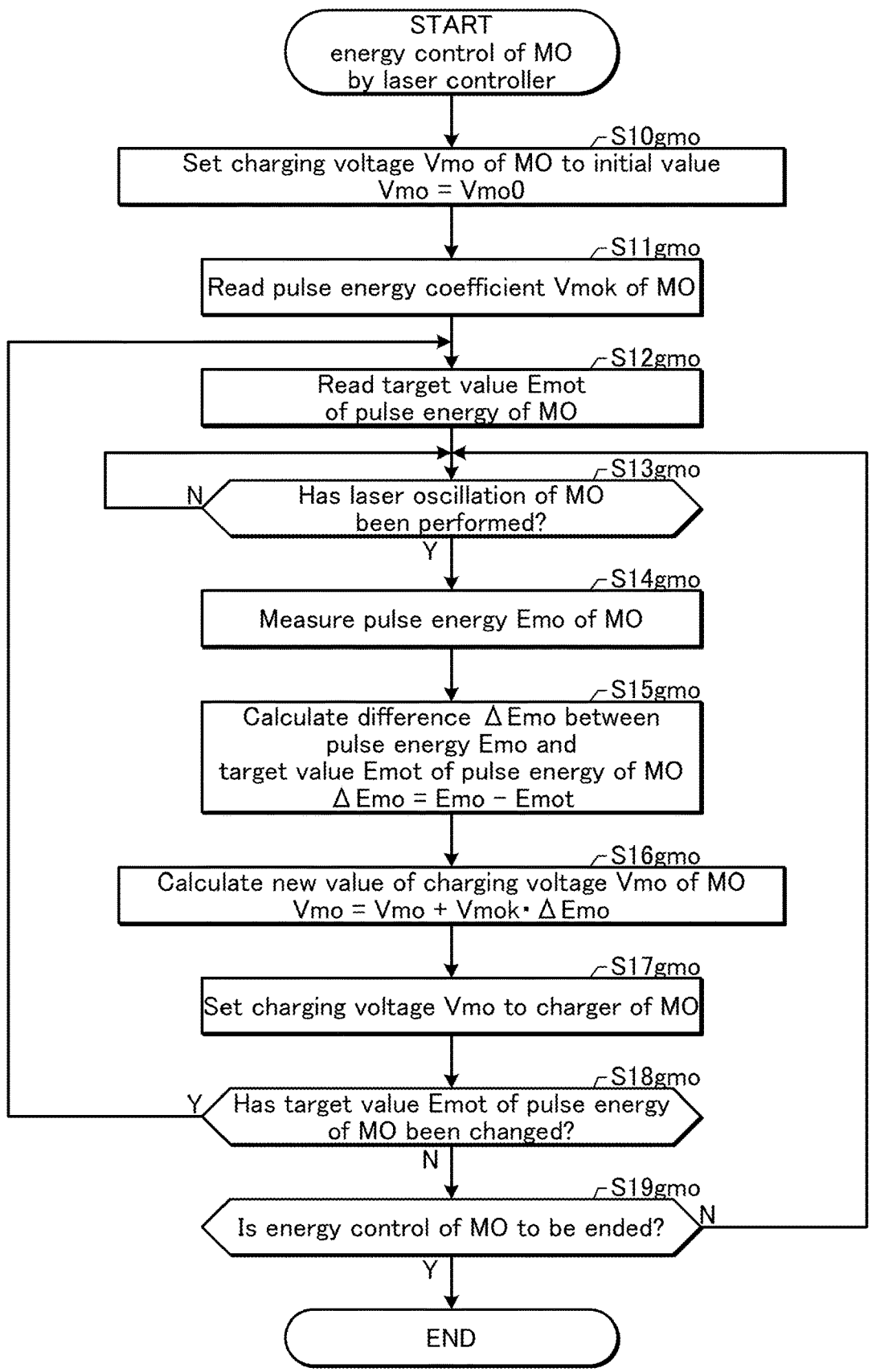
FIG. 32 is a flowchart showing an energy control of the MO performed by the laser controller 30 of the excimer laser apparatus of the third embodiment.

FIG. 32 is a flowchart showing an energy control of the MO performed by the laser controller 30 of the excimer laser apparatus of the third embodiment. The laser controller 30 may perform the following process to keep the pulse energy of the output pulse laser beam of the MO in the vicinity of the target value of the pulse energy of the MO. The pulse energy of the output pulse laser beam of the MO may be measured based on the output from the energy monitor 17mo.

The process of FIG. 32 may be substantially the same as the process in the comparative example described with reference to FIG. 2 except that "gmo" is added to the last digit of each of the symbols each representing a step, and "mo" is added to each of the reference symbols each representing an amount. The detailed description is thus omitted.

Figure 33:
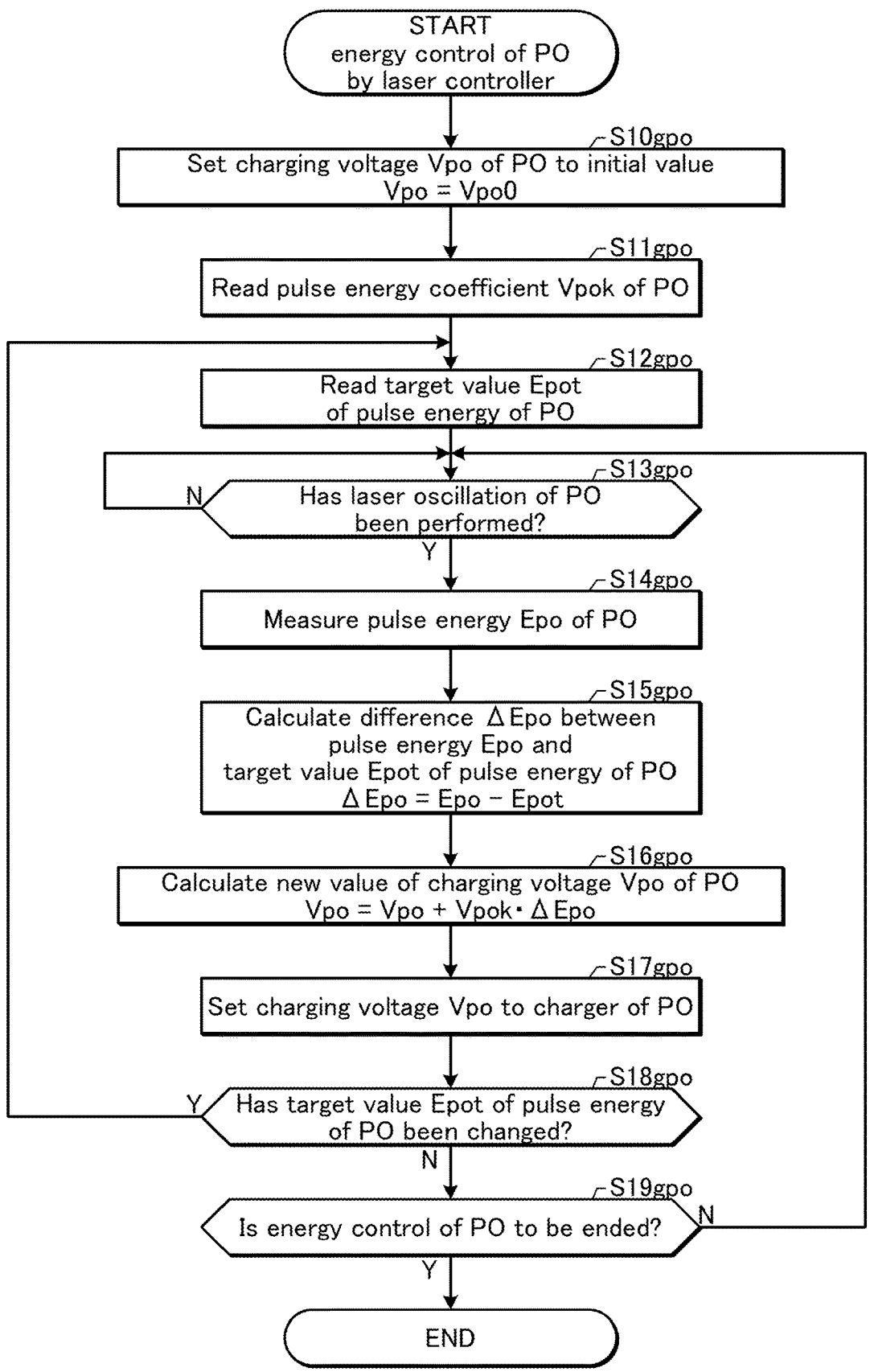
FIG. 33 is a flowchart showing an energy control of the PO performed by the laser controller 30 of the excimer laser apparatus of the third embodiment.

FIG. 33 is a flowchart showing an energy control of the PO performed by the laser controller 30 of the excimer laser apparatus of the third embodiment. The laser controller 30 may perform the following process to keep the pulse energy of the output pulse laser beam of the PO in the vicinity of the target value of the pulse energy of the PO. The pulse energy of the output pulse laser beam of the PO may be measured based on the output from the energy monitor 17po.

The process of FIG. 33 may be substantially the same as the process in the comparative example described with reference to FIG. 2 except that "gpo" is added to the last digit of each of the symbols each representing a step, and "po" is added to each of the reference symbols each representing an amount. The detailed description is thus omitted.

5.2.4 Laser Gas Control Including Control for Reducing Energy Depression

Figure 34:
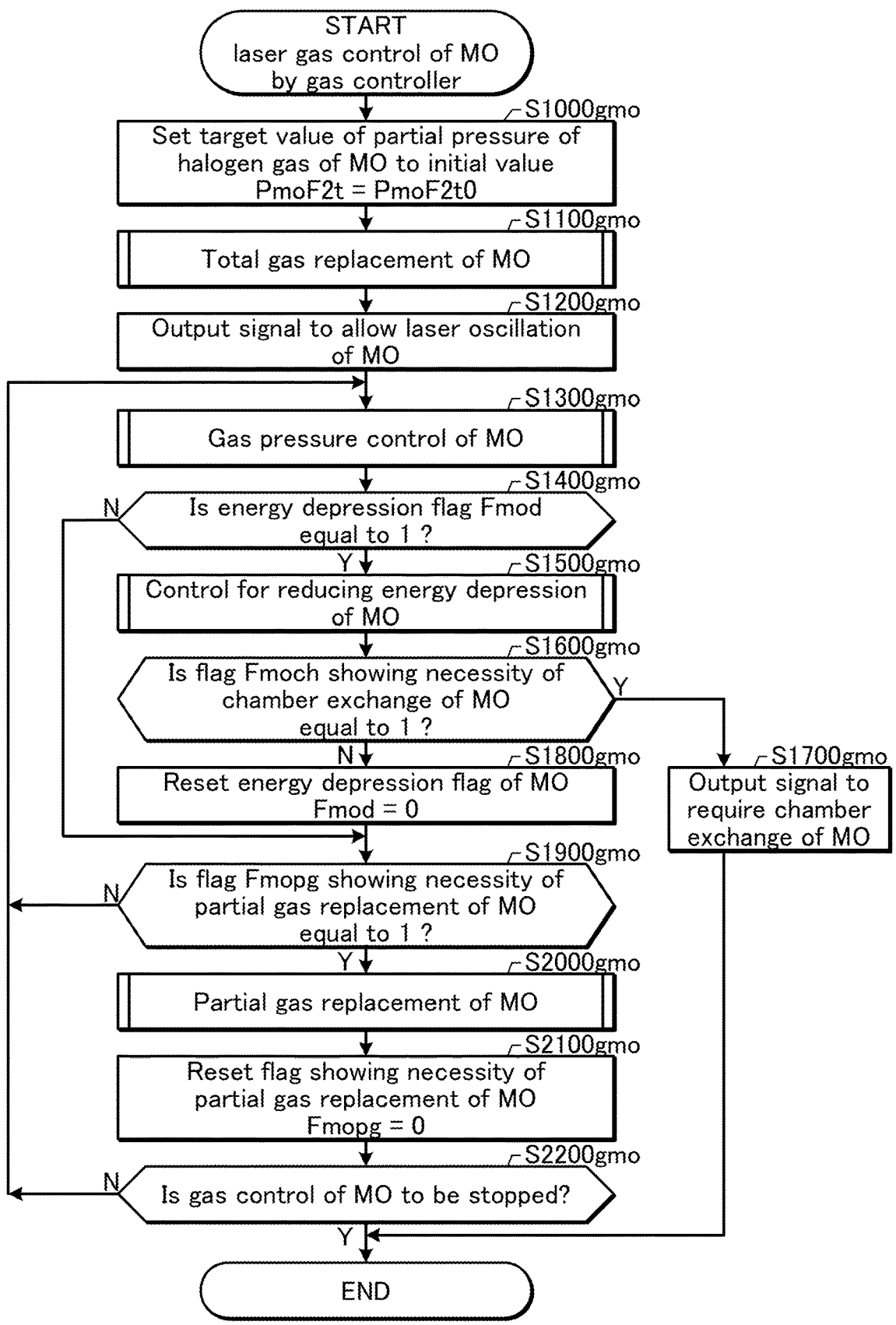
FIG. 34 is a flowchart showing a process of a laser gas control of the MO performed by a gas controller 32 of the excimer laser apparatus of the third embodiment.

FIG. 34 is a flowchart showing a process of a laser gas control of the MO performed by a gas controller 32 of the excimer laser apparatus of the third embodiment. The gas controller 32 may execute a total gas replacement of the MO, a gas pressure control of the MO, and a partial gas replacement of the MO, and execute a control for reducing the energy depression of the MO.

The process of FIG. 34 may be substantially the same as the process in the first embodiment described with reference to FIG. 15 except that "gmo" is added to the last digit of each of the symbols each representing a step, and "mo" is added to each of the reference symbols each representing an amount. The detailed description is thus omitted.

Figure 35:
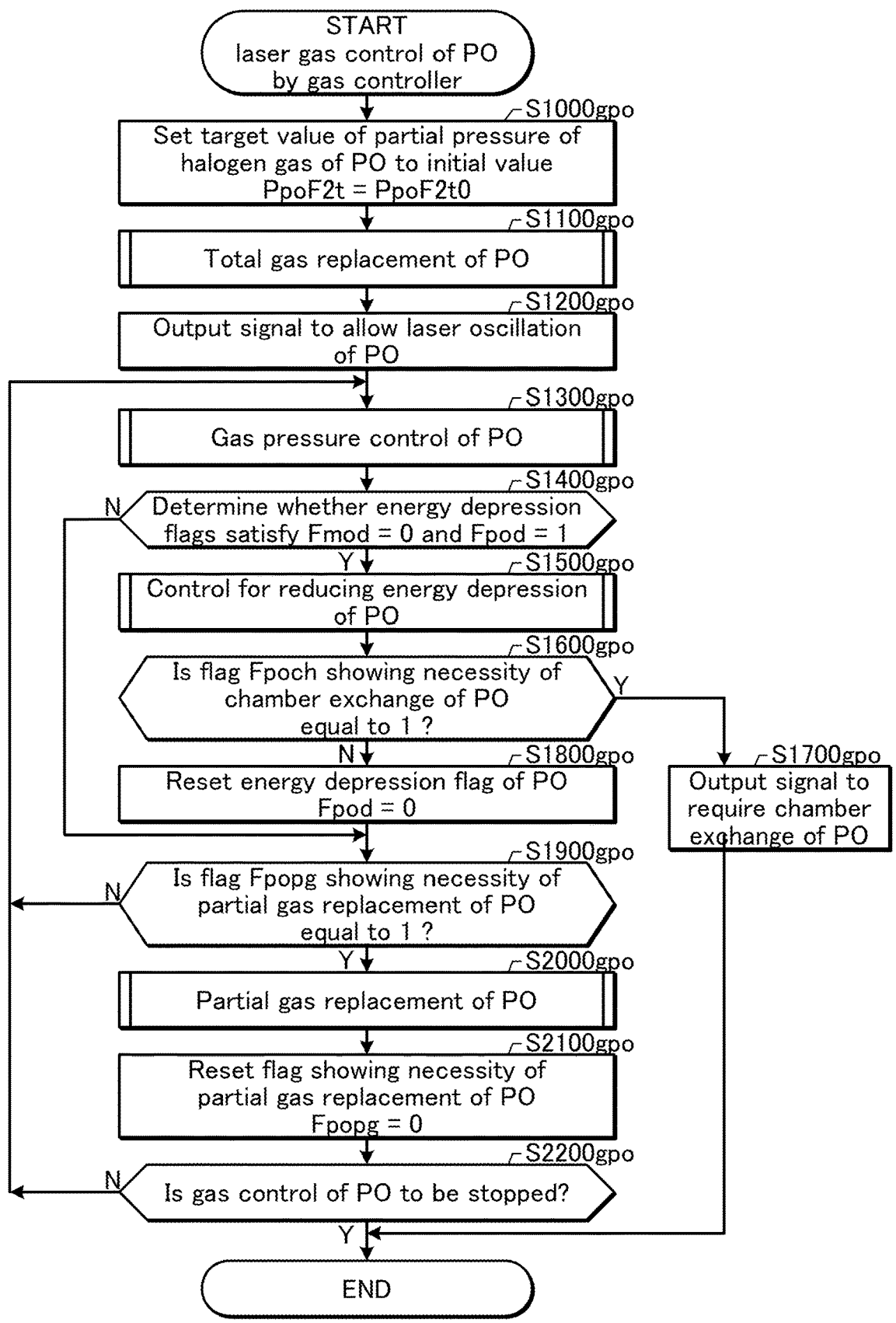
FIG. 35 is a flowchart showing a process of a laser gas control of the PO by the gas controller 32 of the excimer laser apparatus of the third embodiment.

FIG. 35 is a flowchart showing a process of a laser gas control of the PO by the gas controller 32 of the excimer laser apparatus of the third embodiment. The gas controller 32 may execute a total gas replacement of the PO, a gas pressure control of the PO, and a partial gas replacement of the PO, and execute a control for reducing the energy depression of the PO.

The process of FIG. 35 may be different from the process in the first embodiment described with reference to FIG. 15 in that "gpo" is added to the last digit of each of the symbols each representing a step, and "po" is added to each of the reference symbols each representing an amount.

In the process of FIG. 35, the control for reducing the energy depression of the PO may be executed (S1400gpo) only if the energy depression flag Fmod of the MO is 0 and the energy depression flag Fpod of the PO is 1. Namely, if the energy depression flag Fmod of the MO is 1, the control for reducing the energy depression of the MO may be executed at first as shown in FIG. 34, without executing the control for reducing the energy depression of the PO. If the energy depression of the MO has been reduced, and the energy depression flag Fpod of the PO is 1, the control for reducing the energy depression of the PO may be executed.

In other aspects, the process of FIG. 35 may be substantially the same as the process in the first embodiment described with reference to FIG. 15.

5.2.4.1 Total Gas Replacement

Figure 36:
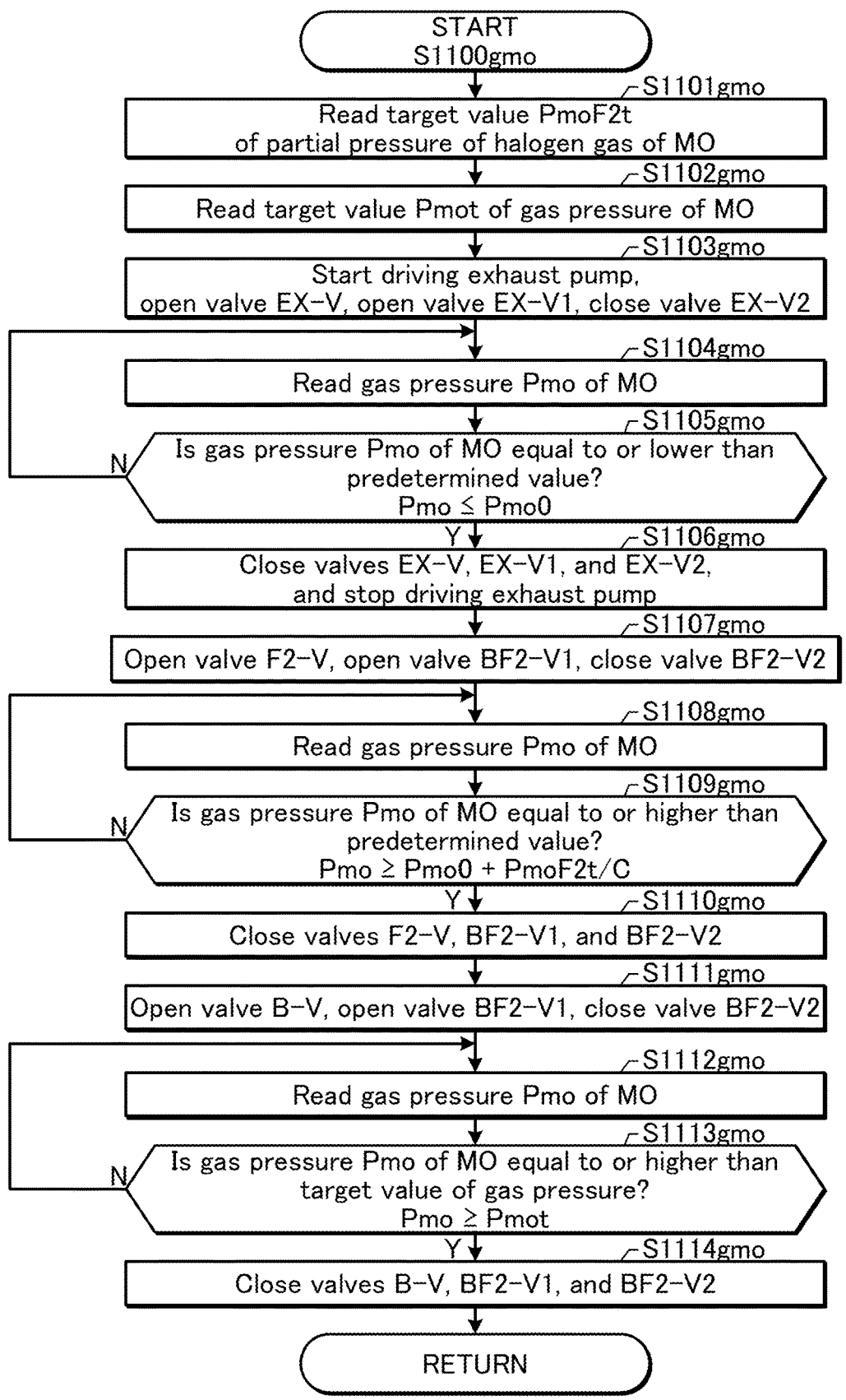
FIG. 36 is a flowchart showing details of a total gas replacement of the MO shown in FIG. 34.

FIG. 36 is a flowchart showing details of the total gas replacement of the MO shown in FIG. 34. The process of FIG. 36 may be performed by the gas controller 32 as a subroutine of S1100gmo shown in FIG. 34.

The process of FIG. 36 may be different from the process in the comparative example described with reference to FIG. 4 in that "gmo" is added to the last digit of each of the symbols each representing a step, and "mo" is added to each of the reference symbols each representing an amount.

In the process of FIG. 36, to inject gas into the chamber 10mo, the gas controller 32 may open not only the valve B-V or the valve F2-V but also the valve BF2-V1 (S1107*gmo*, S1111*gmo*). In this aspect, the process of FIG. 36 may be different from the process in the comparative example described with reference to FIG. 4. To stop injecting gas into the chamber 10*mo*, the gas controller 32 may close not only the valve B-V and the valve F2-V but also the valve BF2-V1 (S1110*gmo*, S1114*gmo*). During the gas control of the MO, the valve BF2-V2 may be kept closed.

Further, in the process of FIG. 36, to exhaust a part of the gas in the chamber 10*mo*, the gas controller 32 may open not only the valve EX-V but also the valve EX-V1 (S1103*gmo*). In this aspect, the process of FIG. 36 may be different from the process in the comparative example described with reference to FIG. 4. To stop exhausting the gas in the chamber 10*mo*, the gas controller 32 may close not only the valve EX-V but also the valve EX-V1 (S1106*gmo*). During the gas control of the MO, the valve EX-V2 may be kept closed.

In other aspects, the process of FIG. 36 may be substantially the same as the process in the comparative example described with reference to FIG. 4.

Figure 37:
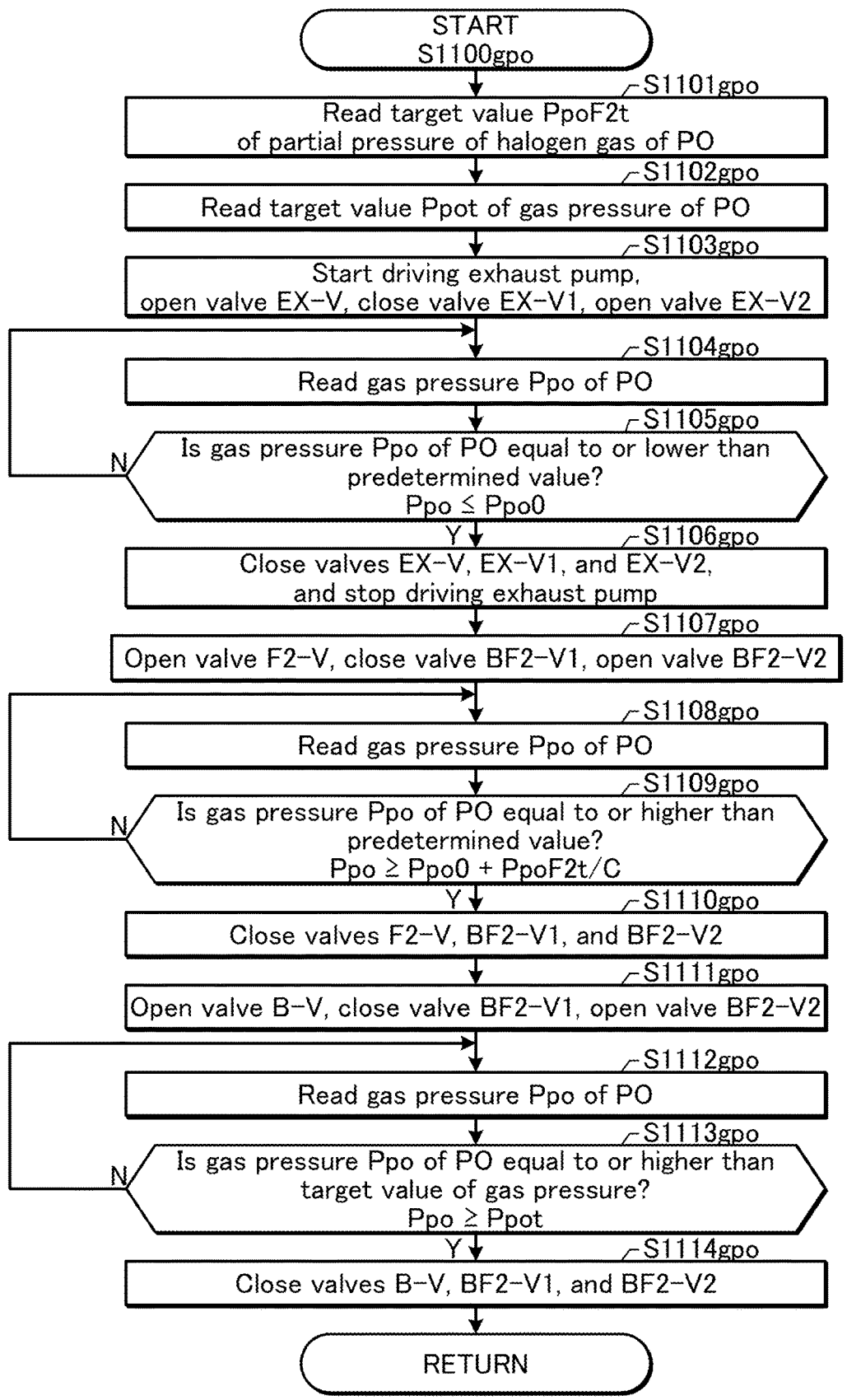
FIG. 37 is a flowchart showing details of a total gas replacement of the PO shown in FIG. 35.

FIG. 37 is a flowchart showing details of the total gas replacement of the PO shown in FIG. 35. The process of FIG. 37 may be performed by the gas controller 32 as a subroutine of S1100*gpo* shown in FIG. 35.

The process of FIG. 37 may be different from the process in the comparative example described with reference to FIG. 4 in that "gpo" is added to the last digit of each of the symbols each representing a step, and "po" is added to each of the reference symbols each representing an amount.

In the process of FIG. 37, to inject gas into the chamber 10*po*, the gas controller 32 may open not only the valve B-V or the valve F2-V but also the valve BF2-V2 (S1107*gpo*, S1111*gpo*). In this aspect, the process of FIG. 37 may be different from the process in the comparative example described with reference to FIG. 4. To stop injecting gas into the chamber 10*po*, the gas controller 32 may close not only the valve B-V and the valve F2-V but also the valve BF2-V2 (S1110*gpo*, S1114*gpo*). During the gas control of the PO, the valve BF2-V1 may be kept closed.

Further, in the process of FIG. 37, to exhaust a part of the gas in the chamber 10*po*, the gas controller 32 may open not only the valve EX-V but also the valve EX-V2 (S1103*gpo*). In this aspect, the process of FIG. 37 may be different from the process in the comparative example described with reference to FIG. 4. To stop exhausting the gas in the chamber 10*po*, the gas controller 32 may close not only the valve EX-V but also the valve EX-V2 (S1106*gpo*). During the gas control of the PO, the valve EX-V1 may be kept closed.

In other aspects, the process of FIG. 37 may be substantially the same as the process in the comparative example described with reference to FIG. 4.

5.2.4.2 Gas Pressure Control

Figure 38:
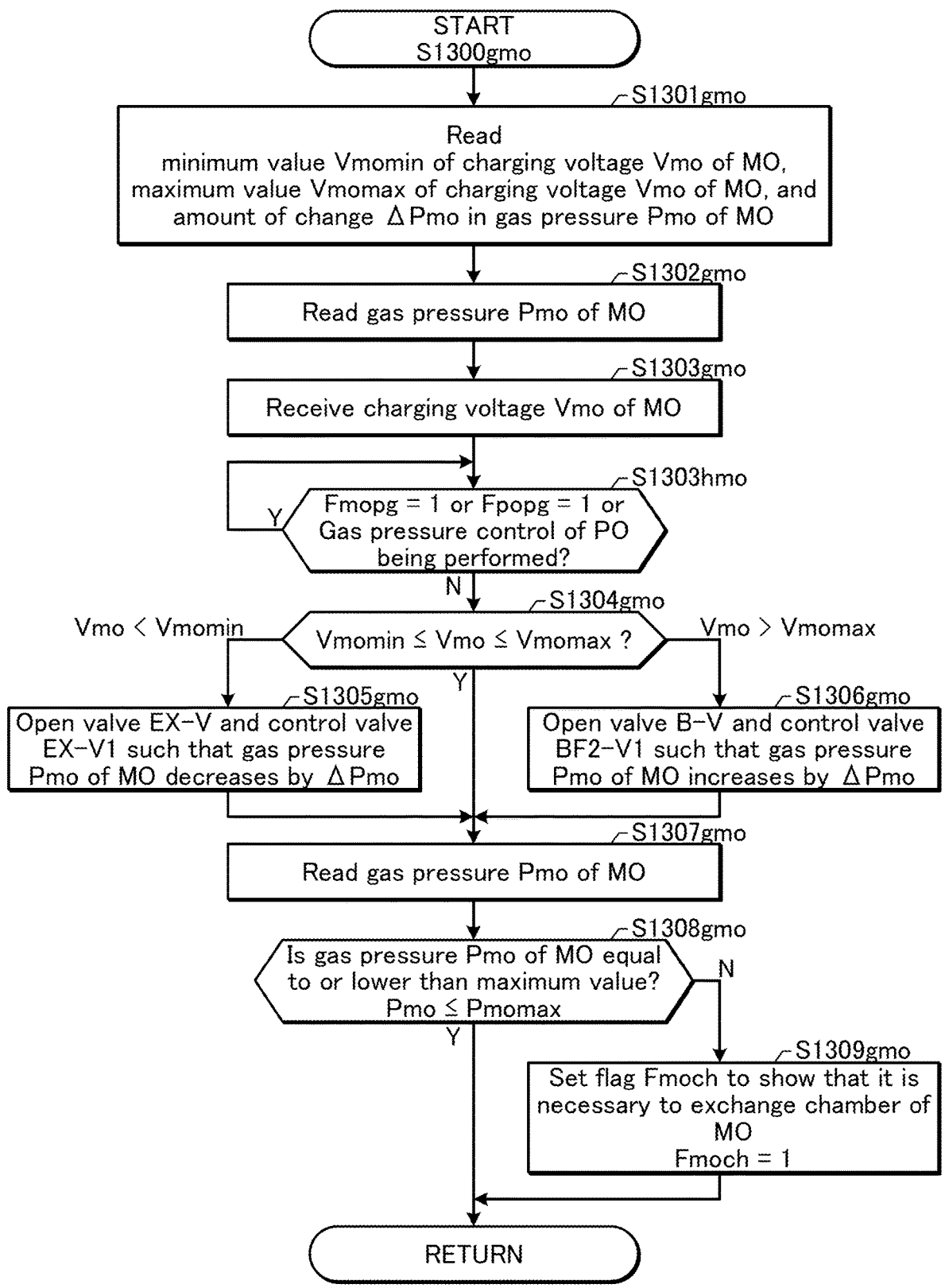
FIG. 38 is a flowchart showing details of a gas pressure control of the MO shown in FIG. 34.

FIG. 38 is a flowchart showing details of the gas pressure control of the MO shown in FIG. 34. The process of FIG. 38 may be performed by the gas controller 32 as a subroutine of S1300*gmo* shown in FIG. 34.

The process of FIG. 38 may be different from the process in the first embodiment described with reference to FIG. 16 in that "gmo" is added to the last digit of each of the symbols each representing a step, and "mo" is added to each of the reference symbols each representing an amount.

In the process of FIG. 38, S1303*hmo* may be added to the steps shown in FIG. 16.

At S1303*hmo*, if the flag Fmopg showing the necessity of the partial gas replacement of the MO is 1, or if the flag Fpopg showing the necessity of the partial gas replacement of the PO is 1, operations of the valves for the gas pressure control of the MO may not be performed. If the flag Fmopg is 1, the partial gas replacement of the MO may be executed as shown in S1900*gmo* and S2000*gmo* in FIG. 34. If the flag Fpopg is 1, the partial gas replacement of the PO may be executed as shown in S1900*gpo* and S2000*gpo* in FIG. 35.

At S1303*hmo*, if the gas pressure control of the PO is being performed, operations of the valves for the gas pressure control of the MO may not be performed.

Further, in the process of FIG. 38, to inject gas into the chamber 10*mo*, the gas controller 32 may perform not only opening the valve B-V but also opening and closing the valve BF2-V1 to increase the gas pressure in the chamber 10*mo* by ΔPmo (S1306*gmo*).

Further, in the process of FIG. 38, to exhaust a part of the gas in the chamber 10*mo*, the gas controller 32 may perform not only opening the valve EX-V but also opening and closing the valve EX-V1 to decrease the gas pressure in the chamber 10*mo* by ΔPmo (S1305*gmo*).

In other aspects, the process of FIG. 38 may be substantially the same as the process in the first embodiment described with reference to FIG. 16.

Figure 39:
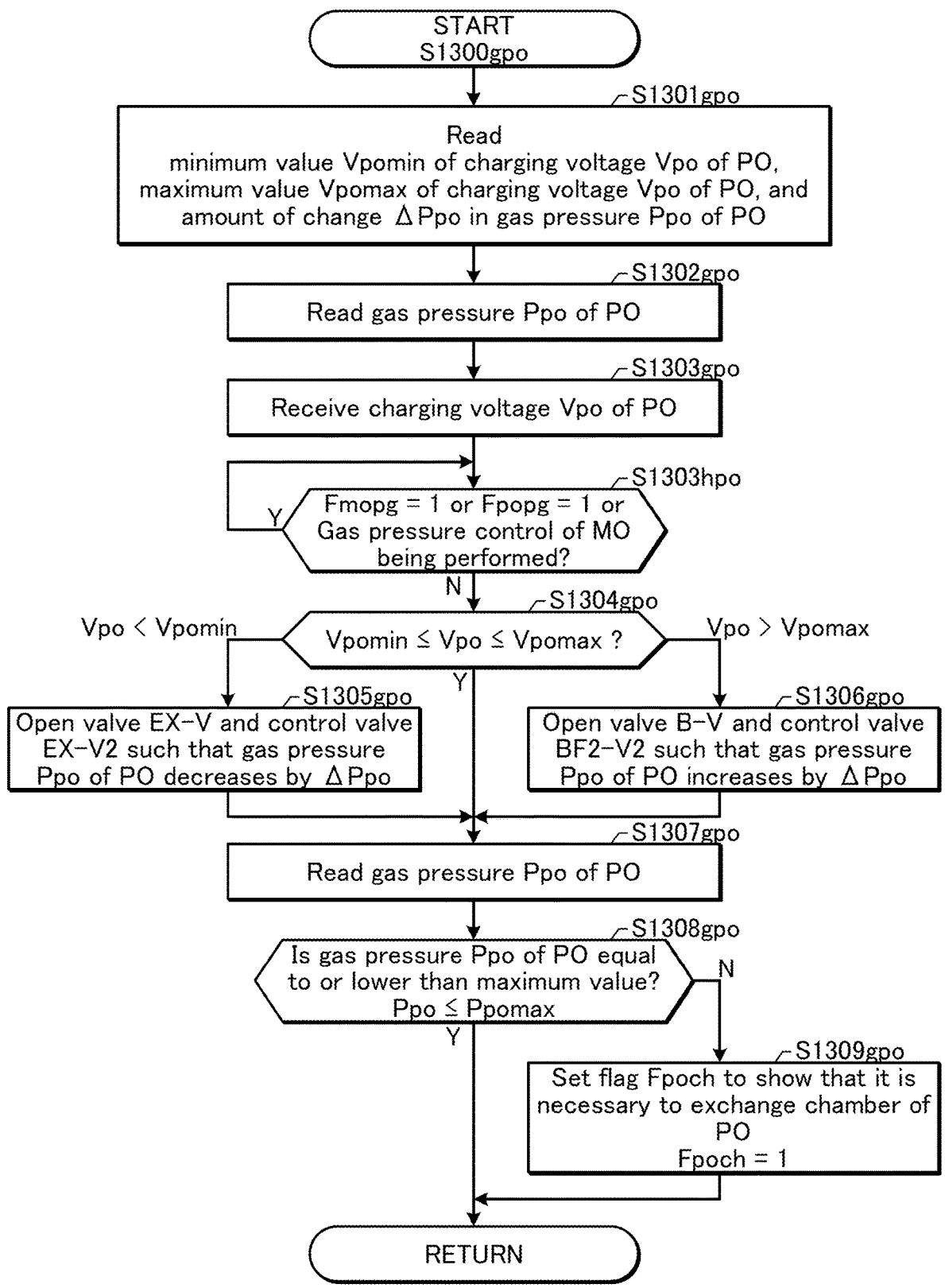
FIG. 39 is a flowchart showing details of a gas pressure control of the PO shown in FIG. 35.

FIG. 39 is a flowchart showing details of the gas pressure control of the PO shown in FIG. 35. The process of FIG. 39 may be performed by the gas controller 32 as a subroutine of S1300*gpo* shown in FIG. 35.

The process of FIG. 39 may be different from the process in the first embodiment described with reference to FIG. 16 in that "gpo" is added to the last digit of each of the symbols each representing a step and "po" is added to each of the reference symbols each representing an amount.

In the process of FIG. 39, S1303*hpo* may be added to the steps shown in FIG. 16.

At S1303*hpo*, if the flag Fmopg showing the necessity of the partial gas replacement of the MO is 1, or if the flag Fpopg showing the necessity of the partial gas replacement of the PO is 1, operations of the valves for the gas pressure control of the PO may not be performed.

At S1303*hpo*, if the gas pressure control of the MO is being performed, operations of the valves for the gas pressure control of the PO may not be performed.

Further, in the process of FIG. 39, to inject gas into the chamber 10*po*, the gas controller 32 may perform not only opening the valve B-V but also opening and closing the valve BF2-V2 to increase the gas pressure in the chamber 10*po* by ΔPpo (S1306*gpo*).

Further, in the process of FIG. 39, to exhaust a part of the gas in the chamber 10*po*, the gas controller 32 may perform not only opening the valve EX-V but also opening and closing the valve EX-V2 to decrease the gas pressure in the chamber 10*po* by ΔPpo (S1305*gpo*).

In other aspects, the process of FIG. 39 may be substantially the same as the process in the first embodiment described with reference to FIG. 16.

5.2.4.3 Measurement of the Number of Pulses

Figure 40:
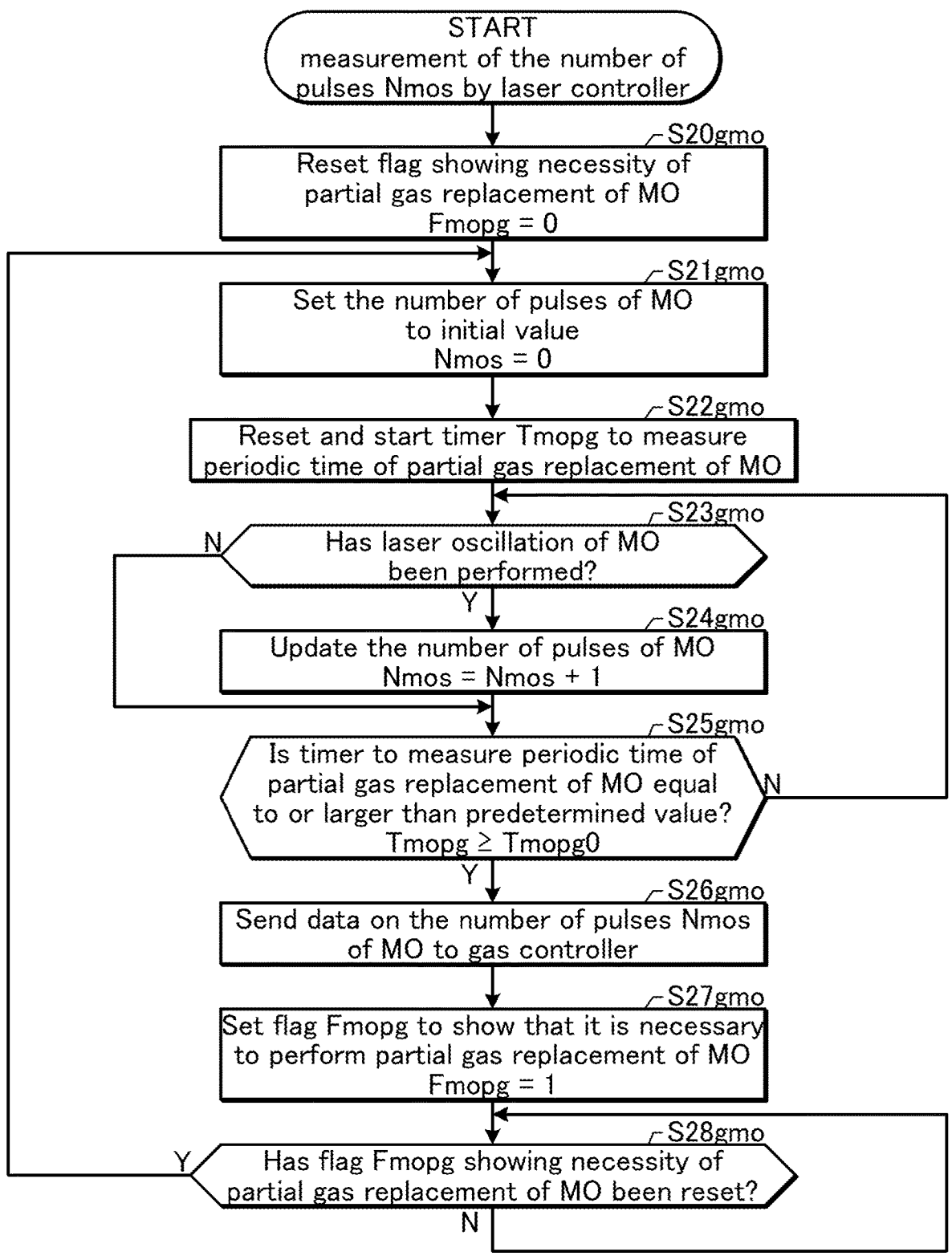
FIG. 40 is a flowchart showing a process to measure the number of pulses Nmos of the MO performed by the laser controller 30 of the excimer laser apparatus of the third embodiment.

FIG. 40 is a flowchart showing a process to measure the number of pulses Nmos of the MO performed by the laser controller 30 of the excimer laser apparatus of the third embodiment.

The process of FIG. 40 may be substantially the same as the process in the comparative example described with reference to FIG. 6 except that "gmo" is added to the last digit of each of the symbols each representing a step, and "mo" is added to each of the reference symbols each representing an amount. The detailed description is thus omitted.

Figure 41:
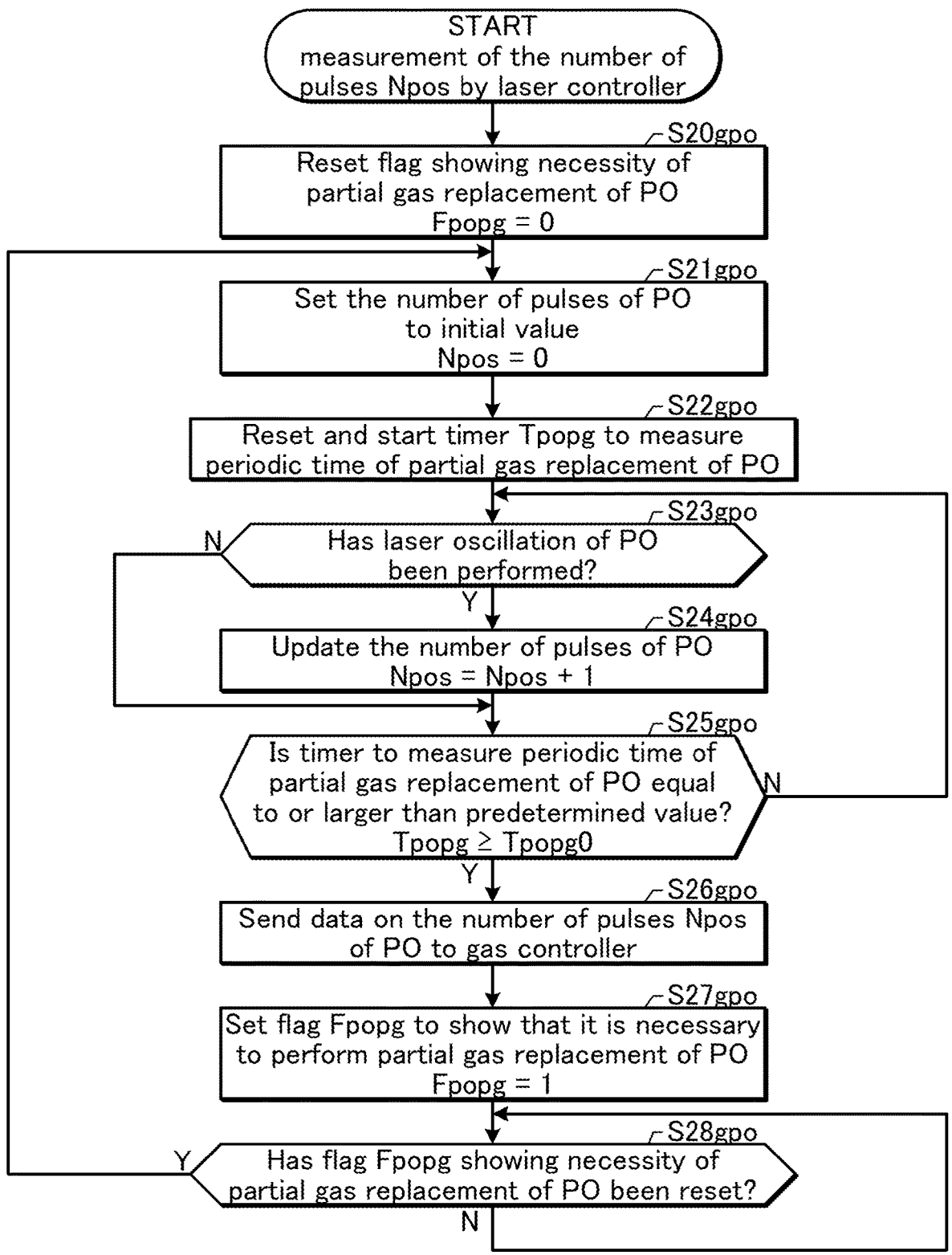
FIG. 41 is a flowchart showing a process to measure the number of pulses Npos of the PO performed by the laser controller 30 of the excimer laser apparatus of the third embodiment.

FIG. 41 is a flowchart showing a process to measure the number of pulses Npos of the PO performed by the laser controller 30 of the excimer laser apparatus of the third embodiment.

The process of FIG. 41 may be substantially the same as the process in the comparative example described with reference to FIG. 6 except that "gpo" is added to the last digit of each of the symbols each representing a step, and "po" is added to each of the reference symbols each representing an amount. The detailed description is thus omitted.

5.2.4.4 Partial Gas Replacement

Figure 42:
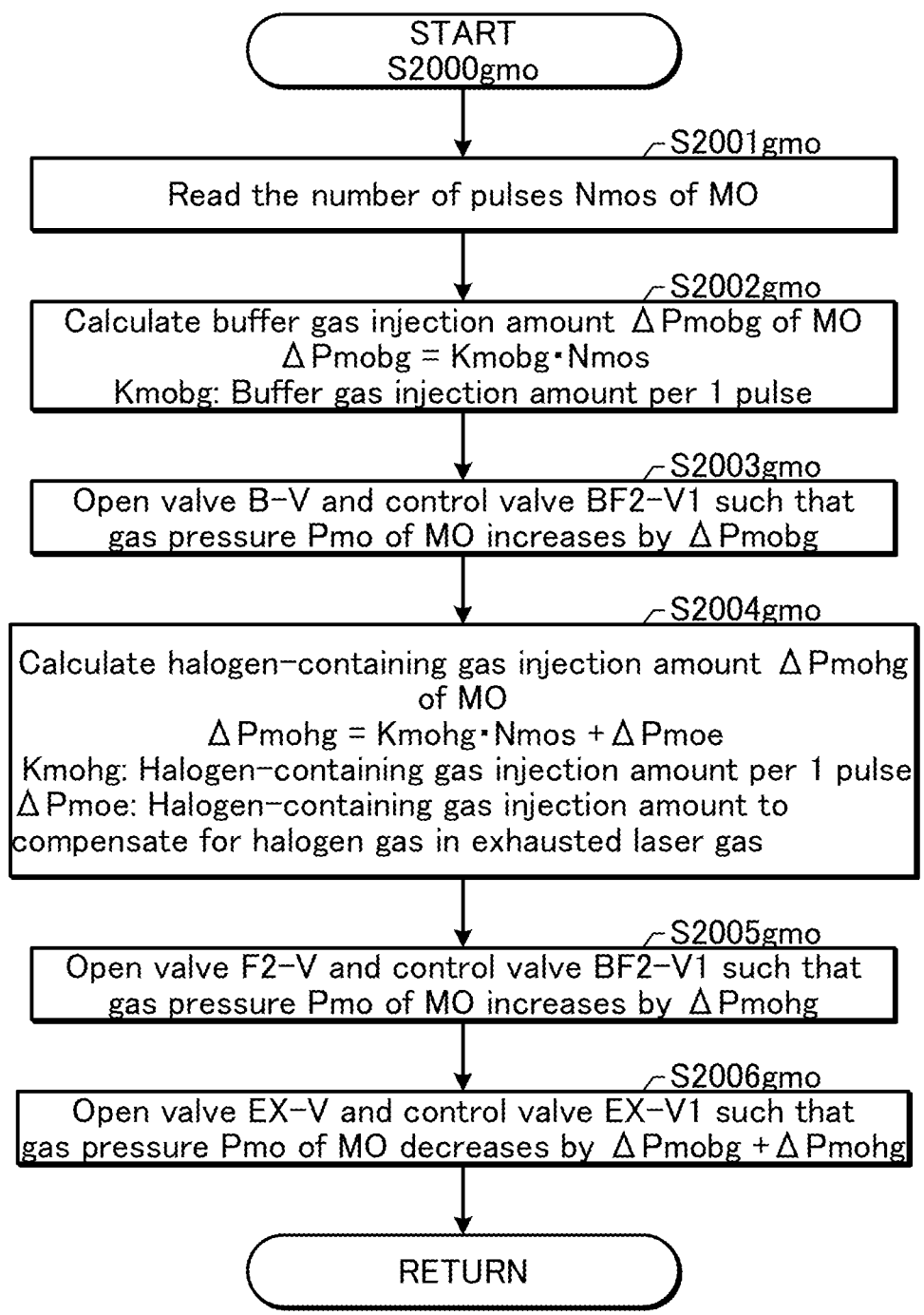
FIG. 42 is a flowchart showing details of a partial gas replacement of the MO shown in FIG. 34.

FIG. 42 is a flowchart showing details of the partial gas replacement of the MO shown in FIG. 34. The process of FIG. 42 may be performed by the gas controller 32 as a subroutine of S2000gmo shown in FIG. 34.

The process of FIG. 42 may be different from the process in the comparative example described with reference to FIG. 7 in that "gmo" is added to the last digit of each of the symbols each representing a step, and "mo" is added to each of the reference symbols each representing an amount.

In the process of FIG. 42, to inject gas into the chamber 10mo, the gas controller 32 may open not only the valve B-V or the valve F2-V but also the valve BF2-V1 to increase the gas pressure in the chamber 10mo by ΔPmobg (S2003gmo) or ΔPmohg (S2005gmo).

Further, in the process of FIG. 42, to exhaust a part of the gas in the chamber 10mo, the gas controller 32 may perform not only opening the valve EX-V but also opening and closing the valve EX-V1 to decrease the gas pressure in the chamber 10mo by ΔPmobg+ΔPmohg (S2006gmo).

In other aspects, the process of FIG. 42 may be substantially the same as the process in the comparative example described with reference to FIG. 7.

Figure 43:
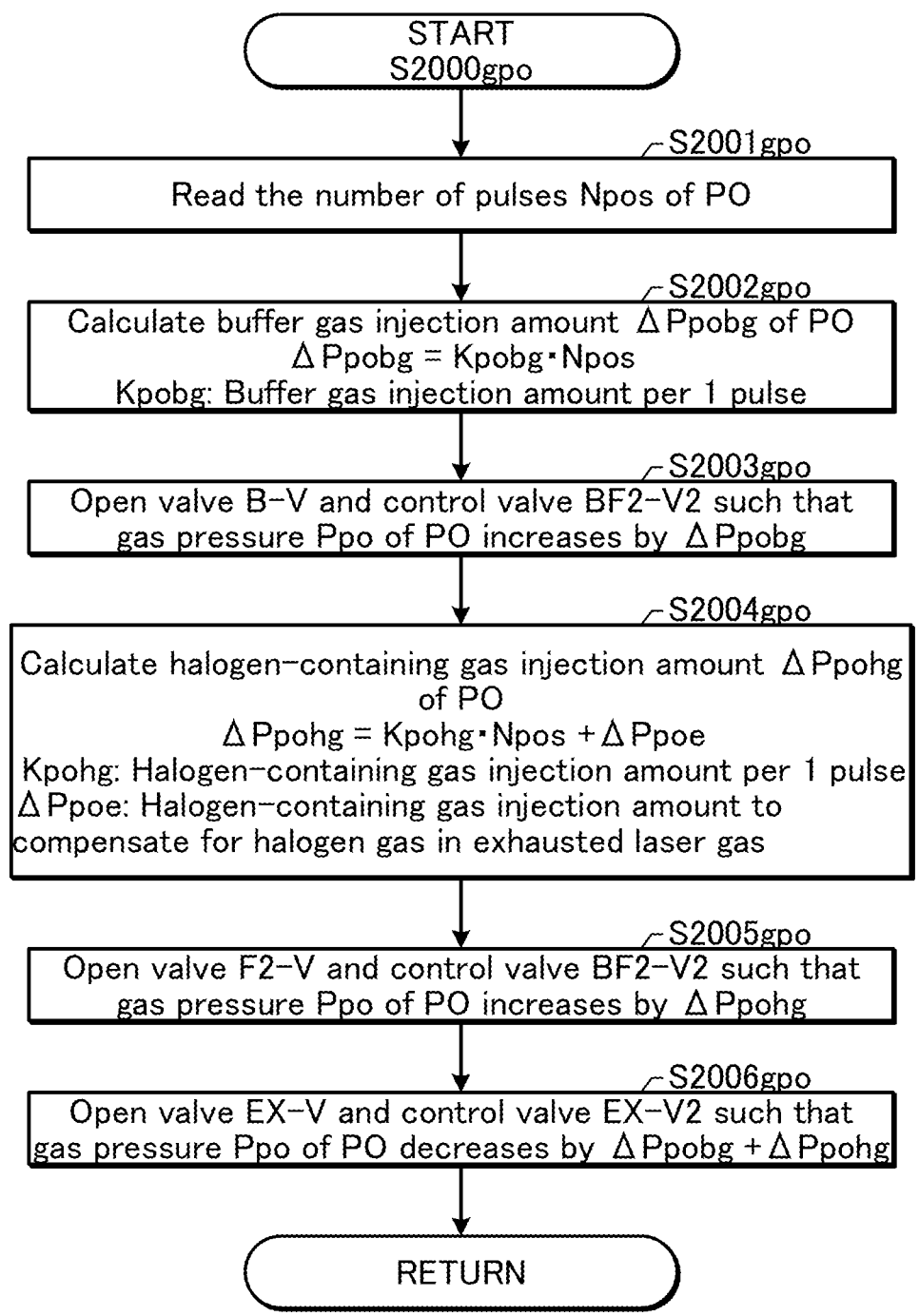
FIG. 43 is a flowchart showing details of a partial gas replacement of the PO shown in FIG. 35.

FIG. 43 is a flowchart showing details of the partial gas replacement of the PO shown in FIG. 35. The process of FIG. 43 may be performed by the gas controller 32 as a subroutine of S2000gpo shown in FIG. 35.

The process of FIG. 43 may be different from the process in the comparative example described with reference to FIG. 7 in that "gpo" is added to the last digit of each of the symbols each representing a step, and "po" is added to each of the reference symbols each representing an amount.

Further, in the process of FIG. 43, to inject gas into the chamber 10po, the gas controller 32 may perform not only opening the valve B-V or the valve F2-V but also opening and closing the valve BF2-V2 to increase the gas pressure in the chamber 10po by ΔPpobg (S2003gpo) or ΔPpohg (S2005gpo).

Further, in the process of FIG. 43, to exhaust a part of the gas in the chamber 10po, the gas controller 32 may perform not only opening the valve EX-V but also opening and closing the valve EX-V2 to decrease the gas pressure in the chamber 10po by ΔPpobg+ΔPpohg (S2006gpo).

In other aspects, the process of FIG. 43 may be substantially the same as the process in the comparative example described with reference to FIG. 7.

5.2.4.5 First Example of Control for Reducing Energy Depression

Figure 44:
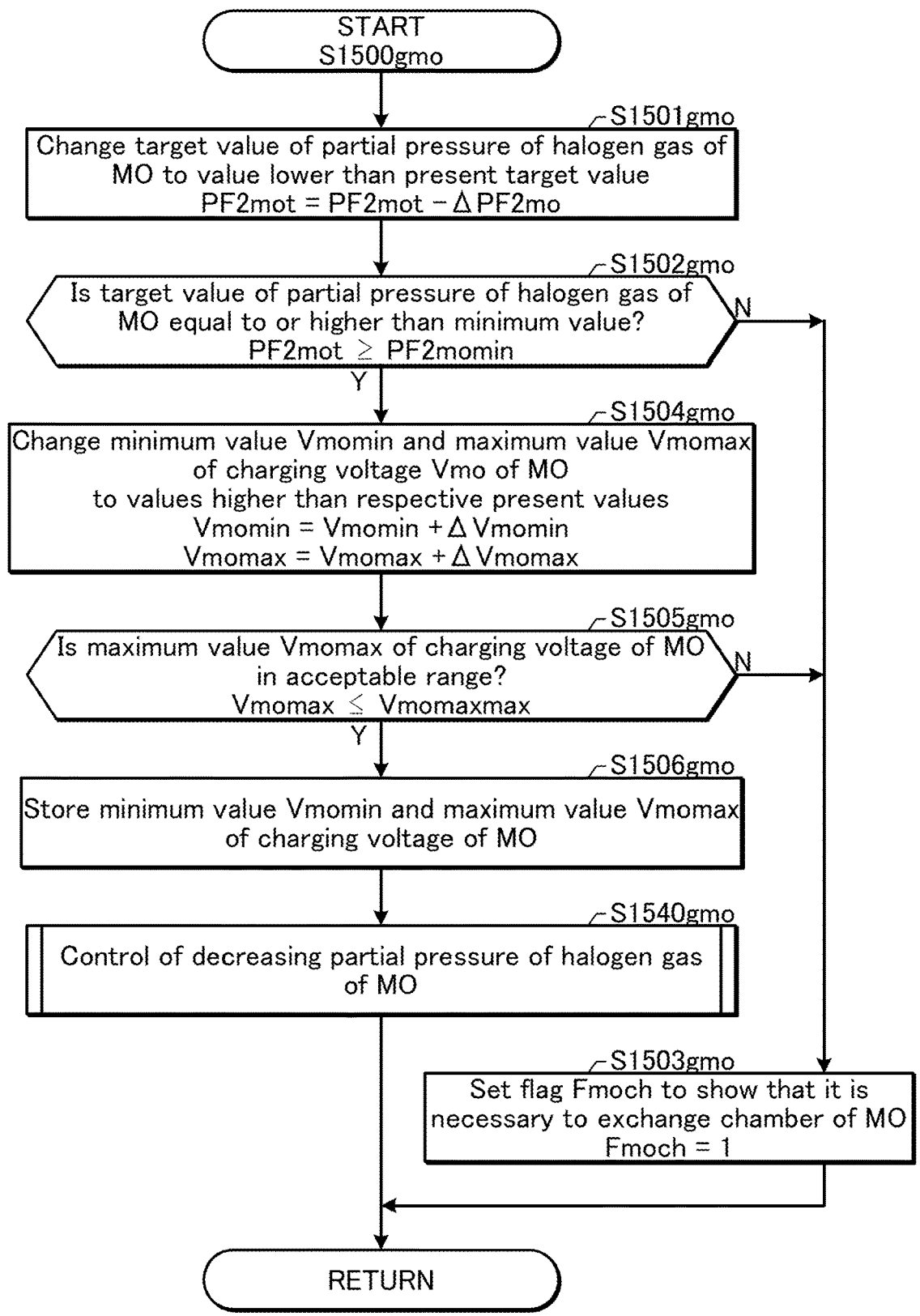
FIG. 44 is a flowchart showing a first example of a process of a control for reducing the energy depression of the MO shown in FIG. 34.

FIG. 44 is a flowchart showing a first example of the process of the control for reducing the energy depression of the MO shown in FIG. 34. The process of FIG. 44 may be performed by the gas controller 32 as a subroutine of S1500gmo shown in FIG. 34.

The process of FIG. 44 may be substantially the same as the process in the first embodiment described with reference to FIG. 17 except that "gmo" is added to the last digit of each of the symbols each representing a step, and "mo" is added to each of the reference symbols each representing an amount. The detailed description is thus omitted.

Figure 45:
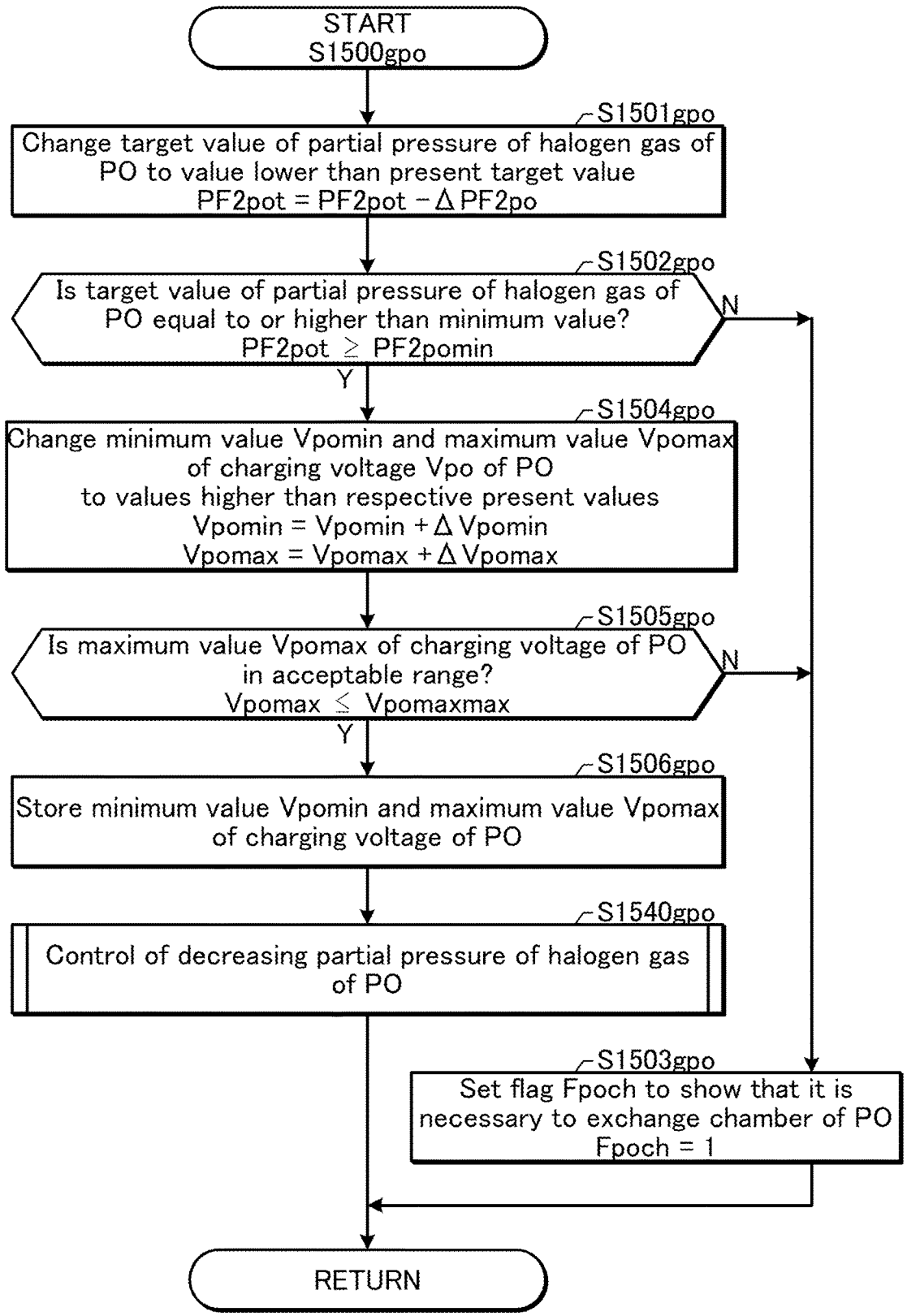
FIG. 45 is a flowchart showing a first example of a process of a control for reducing the energy depression of the PO shown in FIG. 35.

FIG. 45 is a flowchart showing a first example of the process of a control for reducing the energy depression of the PO shown in FIG. 35. The process of FIG. 45 may be performed by the gas controller 32 as a subroutine of S1500gpo shown in FIG. 35.

The process of FIG. 45 may be substantially the same as the process in the first embodiment described with reference to FIG. 17 except that "gpo" is added to the last digit of each of the symbols each representing a step, and "po" is added to each of the reference symbols each representing an amount. The detailed description is thus omitted.

In the first example shown in FIGS. 44 and 45, the control for reducing the energy depression may be executed with injection locking of the MO and the PO.

In contrast, in the second example described below, the control for reducing the energy depression of the MO may be executed without oscillation of the PO, and the control for reducing the energy depression of the PO may be executed without oscillation of the MO.

5.2.4.6 Second Example of Control for Reducing Energy Depression

Figure 46:
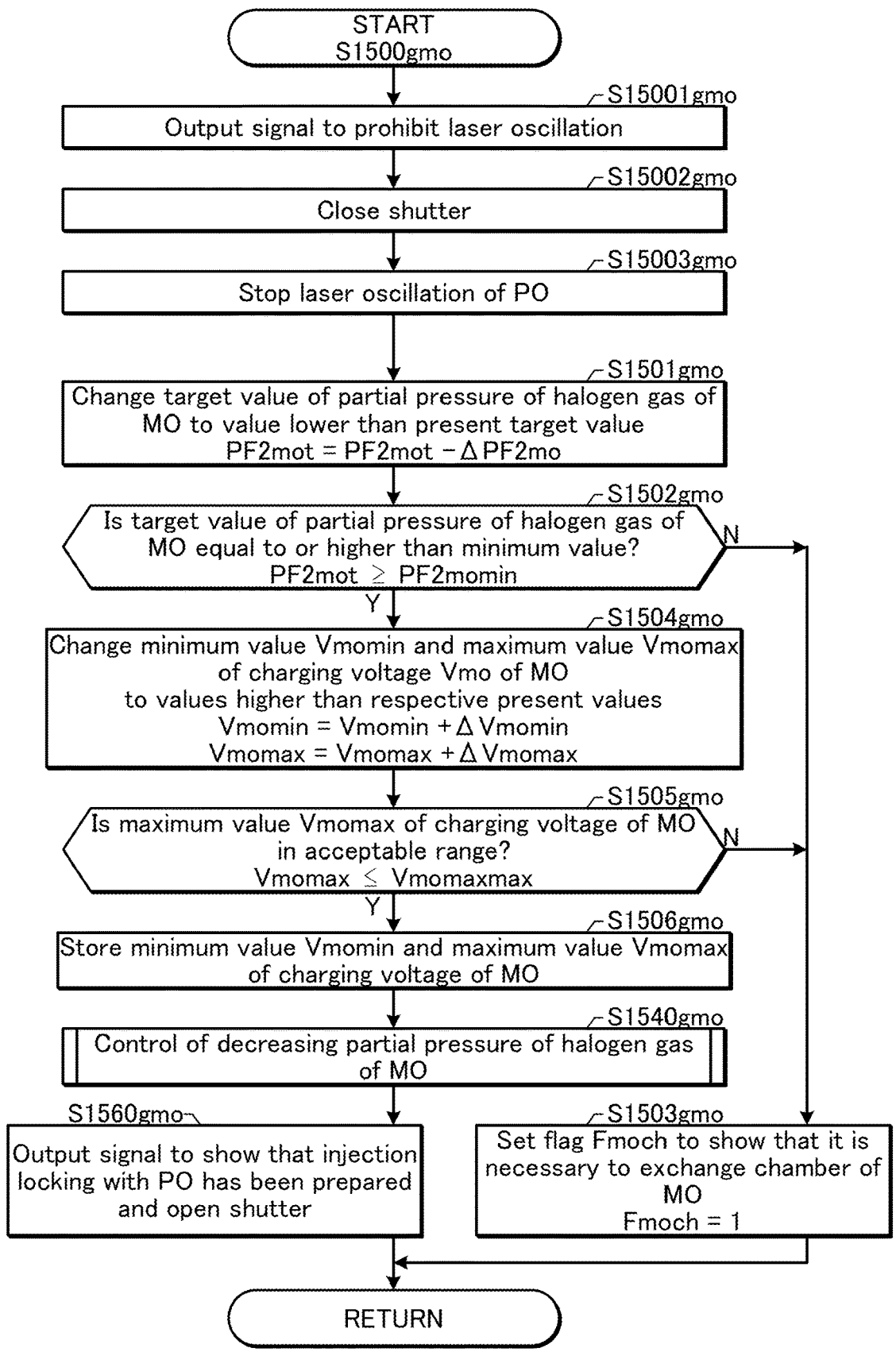
FIG. 46 is a flowchart showing a second example of the process of the control for reducing the energy depression of the MO shown in FIG. 34.

FIG. 46 is a flowchart showing the second example of the process of the control for reducing the energy depression of the MO shown in FIG. 34. The process of FIG. 46 may be performed by the gas controller 32 as a subroutine of S1500gmo shown in FIG. 34.

First, at S15001gmo, the gas controller 32 may output a signal to prohibit laser oscillation of the PO to the laser controller 30.

Next, at S15002gmo, the gas controller 32 may control the actuator 18a to close the shutter 18. The process of S15002gmo may be performed by the laser controller 30 that has received the signal to prohibit laser oscillation.

Next, at S15003gmo, the gas controller 32 may stop oscillation of the PO. The process of S15003gmo may be performed by the laser controller 30 that has received the signal to prohibit laser oscillation of the PO.

After that, in the process from S1501gmo to S1540gmo, the gas controller 32 may perform the control for reducing the energy depression of the MO. The process from S1501gmo to S1540gmo may be substantially the same as the corresponding process in FIG. 44.

Next to S1540gmo, at S1560gmo, the gas controller 32 may output a signal to show that injection locking with the PO has been prepared to the laser controller 30. The gas controller 32 may further control the actuator 18a to open the shutter 18. The process of opening the shutter 18 may be performed by the laser controller 30 that has received the signal to show that injection locking with the PO has been prepared.

After S1560gmo, the gas controller 32 may end the process of this flowchart and return to the process of FIG. 34.

Figure 47:
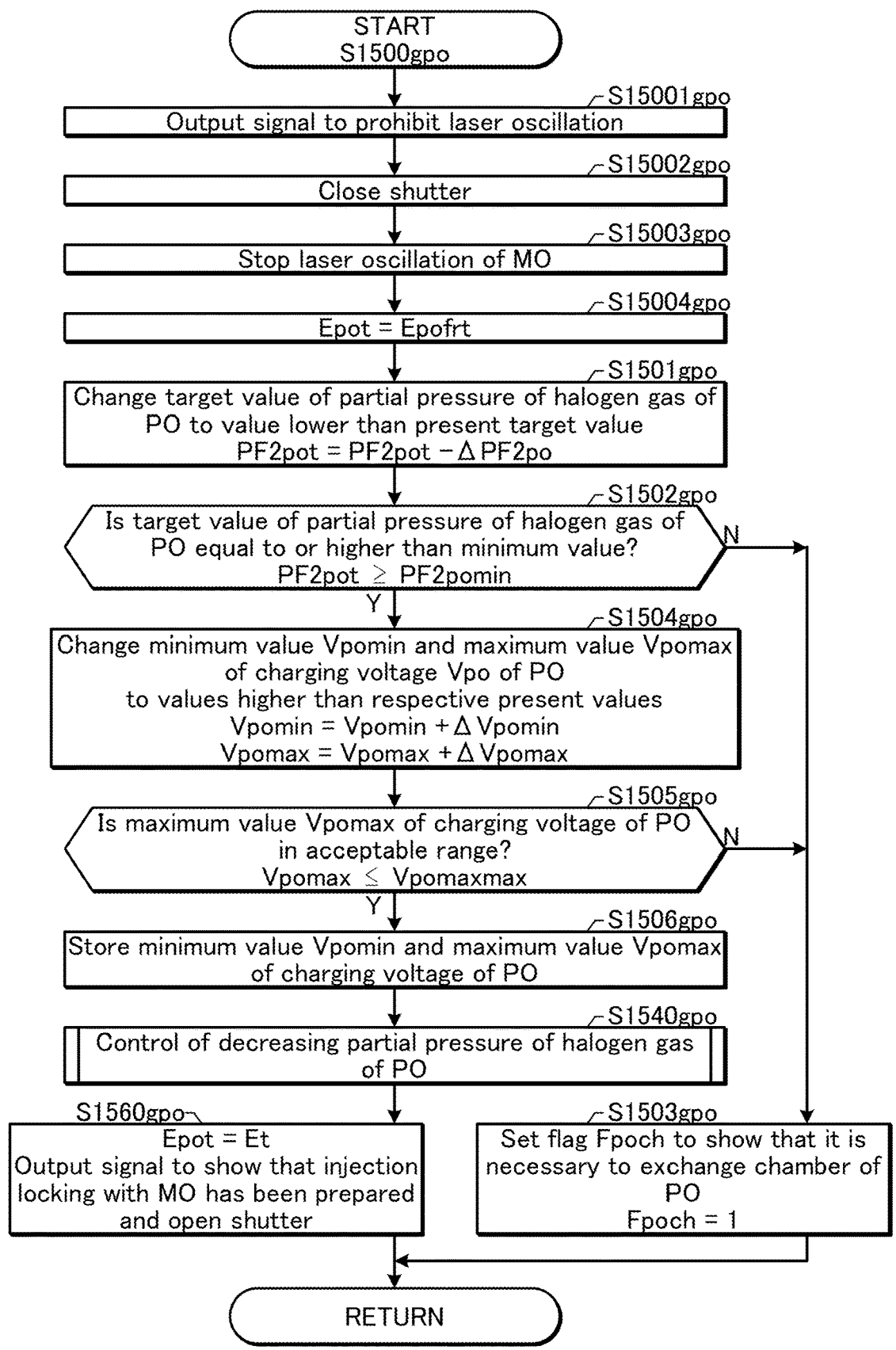
FIG. 47 is a flowchart showing a second example of the process of the control for reducing the energy depression of the PO shown in FIG. 35.

FIG. 47 is a flowchart showing a second example of the process of the control for reducing the energy depression of the PO shown in FIG. 35. The process of FIG. 47 may be performed by the gas controller 32 as a subroutine of S1500gpo shown in FIG. 35.

First, at S15001gpo, the gas controller 32 may output a signal to prohibit laser oscillation of the MO to the laser controller 30.

Next, at S15002gpo, the gas controller 32 may control the actuator 18a to close the shutter 18. The process of S15002gpo may be performed by the laser controller 30 that has received the signal to prohibit laser oscillation.

Next, at S15003gpo, the gas controller 32 may stop oscillation of the MO. The process of S15003gpo may be performed by the laser controller 30 that has received the signal to prohibit laser oscillation of the MO.

Next, at S15004gpo, the gas controller 32 may temporarily set the target value Epot of the pulse energy of the PO to a free-run target value Epofrt of the pulse energy. The free-run target value Epofrt of the pulse energy may be a target value of the pulse energy if the PO is driven alone without oscillation of the MO.

After that, in the process from S1501gpo to S1540gpo, the gas controller 32 may perform the control for reducing the energy depression of the PO. The process from S1501gpo to S1540gpo may be substantially the same as the corresponding process in FIG. 45.

Next to S1540gpo, at S1560gpo, the gas controller 32 may set the target value Epot of the pulse energy of the PO back to the target value Et of the pulse energy. The target value Et of the pulse energy may be a target value when the injection locking of the MO and the PO is performed. At S1560gpo, the gas controller 32 may further output a signal to show that the injection locking with the MO has been prepared to the laser controller 30. The gas controller 32 may also control the actuator 18a to open the shutter 18. The process to open the shutter 18 may be performed by the laser controller 30 that has received the signal to show that the injection locking with the MO has been prepared.

After S1560gpo, the gas controller 32 may end the process of this flowchart and return to the process of FIG. 35.

5.2.4.7 Example of Control of Decreasing Partial Pressure of Halogen Gas

Figure 48:
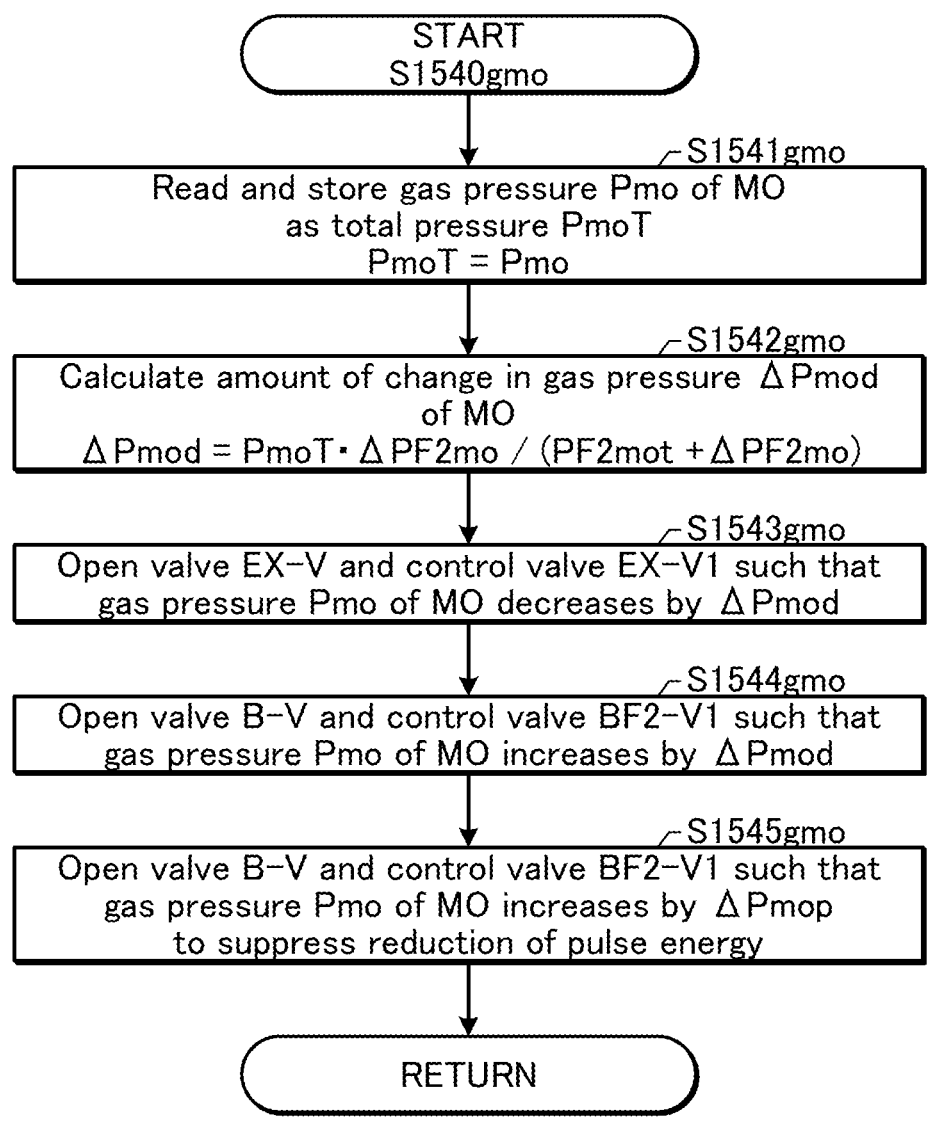
FIG. 48 is a flowchart showing an example of a control of decreasing the partial pressure of halogen gas shown in FIGS. 44 and 46.

FIG. 48 is a flowchart showing an example of the control of decreasing the partial pressure of halogen gas shown in FIGS. 44 and 46. The process of FIG. 48 may be performed by the gas controller 32 as a subroutine of S1540gmo shown in any one of FIGS. 44 and 46.

The process of FIG. 48 may be different from the process in the first embodiment described with reference to FIG. 18 in that "gmo" is added to the last digit of each of the symbols each representing a step, and "mo" is added to each of the reference symbols each representing an amount.

Further, in the process of FIG. 48, to inject gas into the chamber 10mo, the gas controller 32 may open not only the valve B-V but also the valve BF2-V1 (S1544gmo, S1545gmo).

Further, in the process of FIG. 48, to exhaust a part of the gas in the chamber 10mo, the gas controller 32 may open not only the valve EX-V but also the valve EX-V1 (S1543gmo).

In other aspects, the process of FIG. 48 may be substantially the same as the process in the first embodiment described with reference to FIG. 18.

Figure 49:
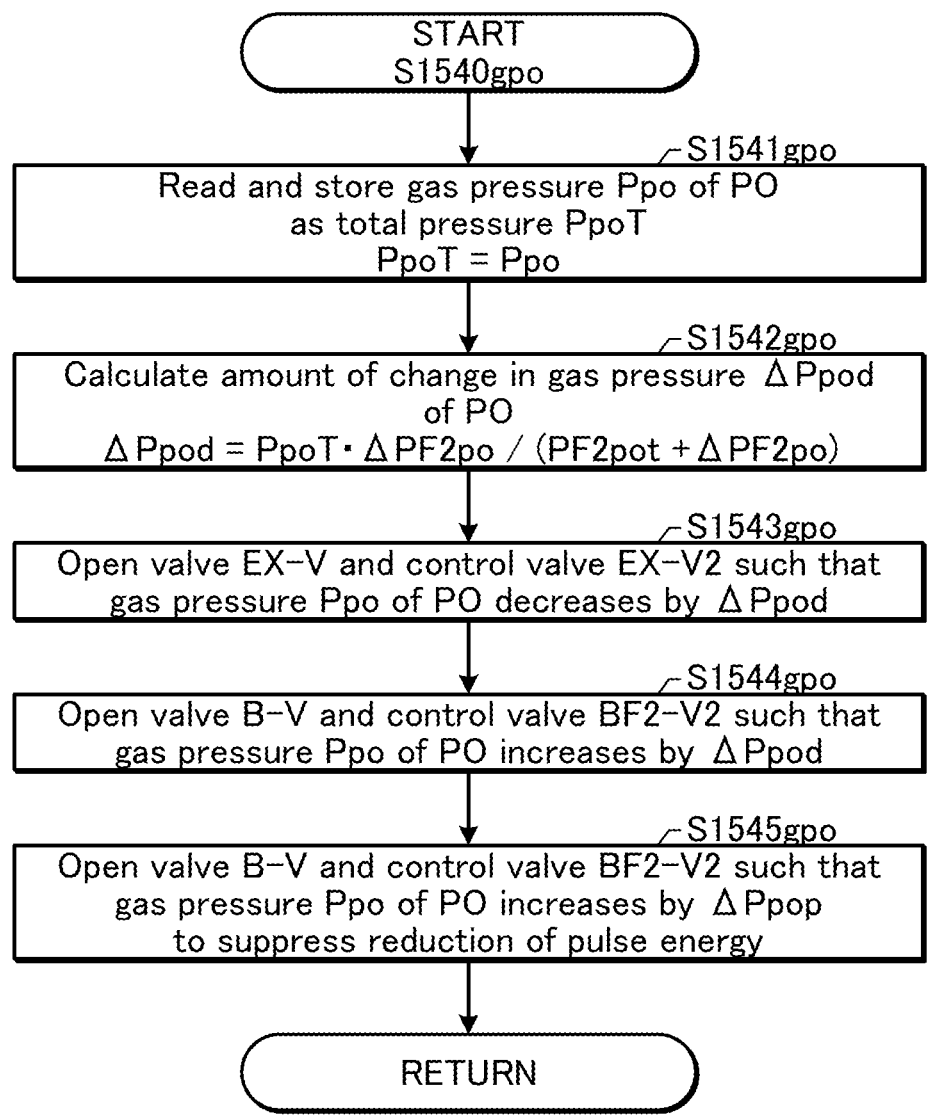
FIG. 49 is a flowchart showing an example of a control of decreasing the partial pressure of halogen gas shown in FIGS. 45 and 47.

FIG. 49 is a flowchart showing an example of the control of decreasing the partial pressure of halogen gas shown in FIGS. 45 and 47. The process of FIG. 49 may be performed by the gas controller 32 as a subroutine of S1540gpo shown in any one of FIGS. 45 and 47.

The process of FIG. 49 may be different from the process in the first embodiment described with reference to FIG. 18 in that "gpo" is added to the last digit of each of the symbols each representing a step, and "po" is added to each of the reference symbols each representing an amount.

Further, in the process of FIG. 49, to inject gas into the chamber 10po, the gas controller 32 may open not only the valve B-V but also the valve BF2-V2 (S1544gpo, S1545gpo).

Further, in the process of FIG. 49, to exhaust a part of the gas in the chamber 10po, the gas controller 32 may open not only the valve EX-V but also the valve EX-V2 (S1543gpo).

In other aspects, the process of FIG. 49 may be substantially the same as the process in the first embodiment described with reference to FIG. 18.

5.2.4.8 Third Example of Control for Reducing Energy Depression

Figure 50:
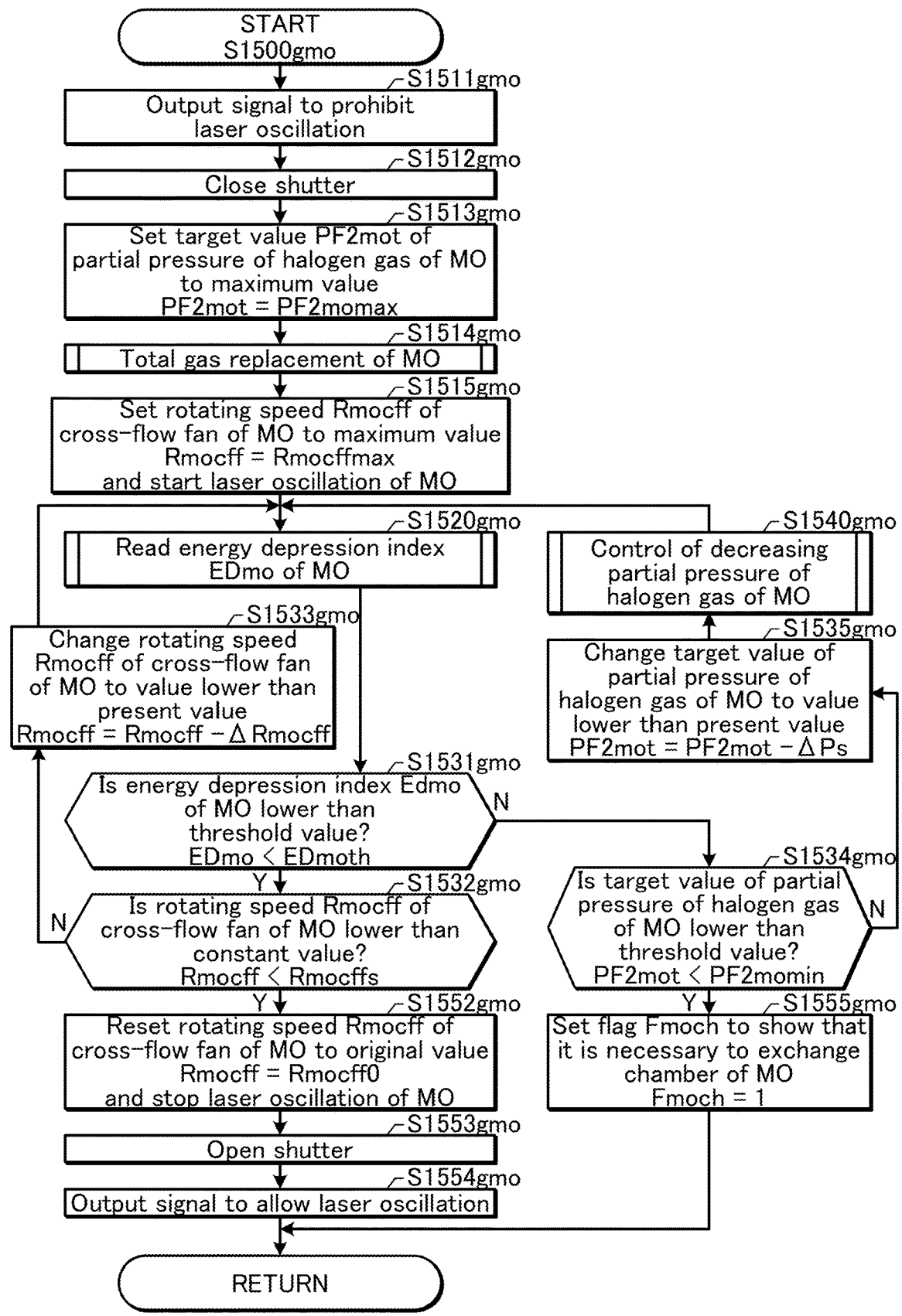
FIG. 50 is a flowchart showing a third example of the process of the control for reducing the energy depression of the MO shown in FIG. 34.

FIG. 50 is a flowchart showing a third example of the process of the control for reducing the energy depression of the MO shown in FIG. 34. The process of FIG. 50 may be performed by the gas controller 32 as a subroutine of S1500gmo shown in FIG. 34.

The process of FIG. 50 may be substantially the same as the process in the second embodiment described with reference to FIG. 21 except that "gmo" is added to the last digit of each of the symbols each representing a step, and "mo" is added to each of the reference symbols each representing an amount. The detailed description is thus omitted.

Figure 51:
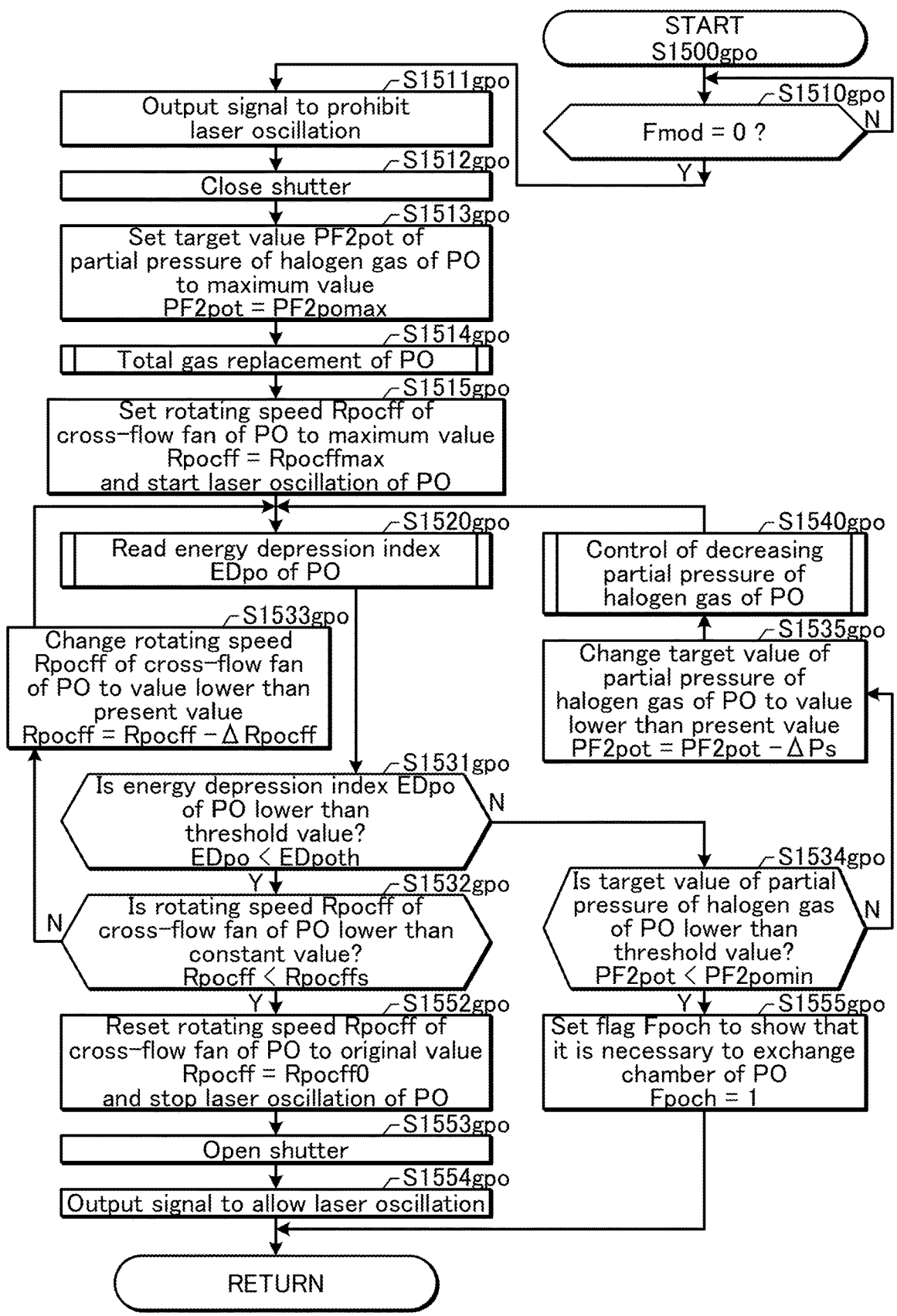
FIG. 51 is a flowchart showing a third example of the process of the control for reducing the energy depression of the PO shown in FIG. 35.

FIG. 51 is a flowchart showing a third example of the process of the control for reducing the energy depression of the PO shown in FIG. 35. The process of FIG. 51 may be performed by the gas controller 32 as a subroutine of S1500gpo shown in FIG. 35.

The process of FIG. 51 may be different from the process in the second embodiment described with reference to FIG. 21 in that "gpo" is added to the last digit of each of the symbols each representing a step, and "po" is added to each of the reference symbols each representing an amount.

Further, as shown in FIG. 51, S1510gpo may be added to the process of FIG. 21.

At S1510gpo, the gas controller 32 may determine whether the energy depression flag Fmod of the MO is 0. If the energy depression flag Fmod of the MO is 0 (S1510gpo: YES), the gas controller 32 may proceed to S1511gpo. If the energy depression flag Fmod of the MO is 1 (S1510gpo: NO), the gas controller 32 may wait without proceeding to S1511gpo.

In other aspects, the process of FIG. 51 may be substantially the same as the process in the second embodiment described with reference to FIG. 21.

5.2.4.8.1 Calculating Energy Depression Index ED

Figure 52:
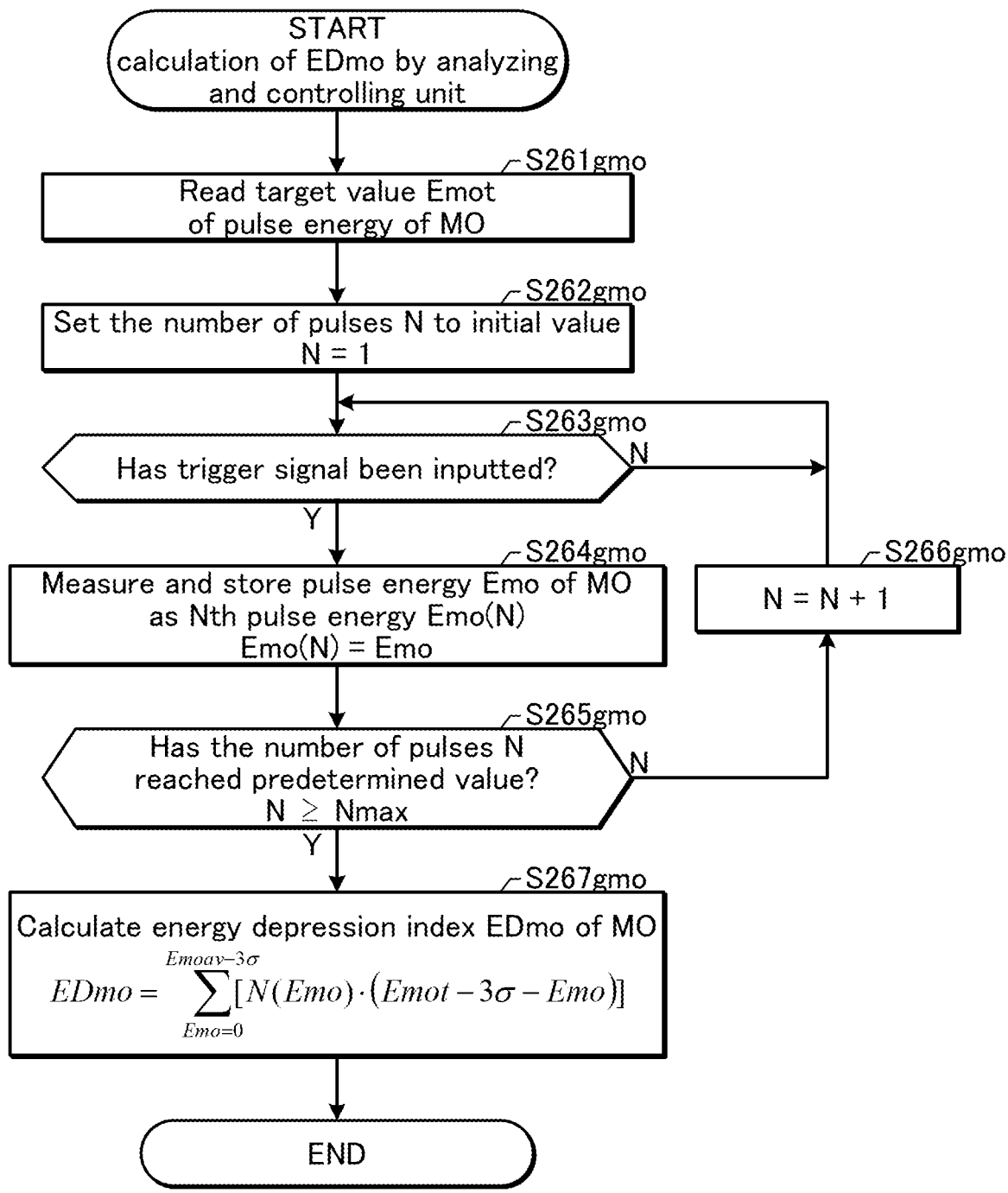
FIG. 52 is a flowchart showing a process performed by the analyzing and controlling unit 33 when the third example of the process of the control for reducing the energy depression of the MO is performed in the excimer laser apparatus of the third embodiment.

FIG. 52 is a flowchart showing a process performed by the analyzing and controlling unit 33 when the third example of the process of the control for reducing the energy depression of the MO is performed in the excimer laser apparatus of the third embodiment. The analyzing and controlling unit 33 may perform the following process to calculate the energy depression index ED.

The process of FIG. 52 may be substantially the same as the process in the second embodiment described with reference to FIG. 22 except that "gmo" is added to the last digit of each of the symbols each representing a step, and "mo" is added to each of the reference symbols each representing an amount. The detailed description is thus omitted.

Figure 53:
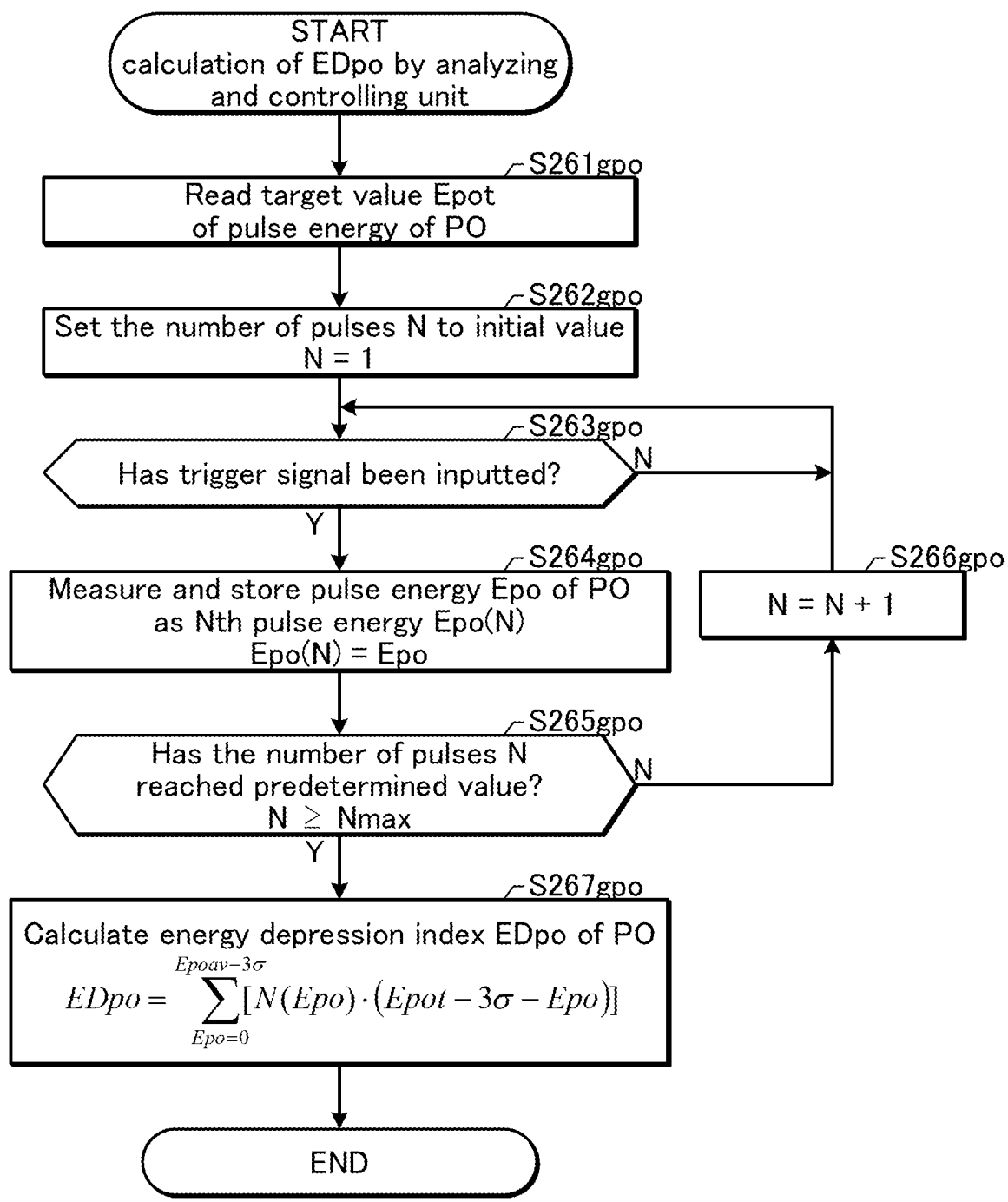
FIG. 53 is a flowchart showing a process performed by the analyzing and controlling unit 33 when the third example of the process of the control for reducing the energy depression of the PO is performed in the excimer laser apparatus of the third embodiment.

FIG. 53 is a flowchart showing the process performed by the analyzing and controlling unit 33 when the third example of the process of the control for reducing the energy depression of the PO is performed in the excimer laser apparatus of the third embodiment.

The process of FIG. 53 may be substantially the same as the process in the second embodiment described with reference to FIG. 22 except that "gpo" is added to the last digit of each of the symbols each representing a step, and "po" is added to each of the reference symbols each representing an amount. The detailed description is thus omitted.

5.2.4.8.2 Reading Energy Depression Index ED

Figure 54:
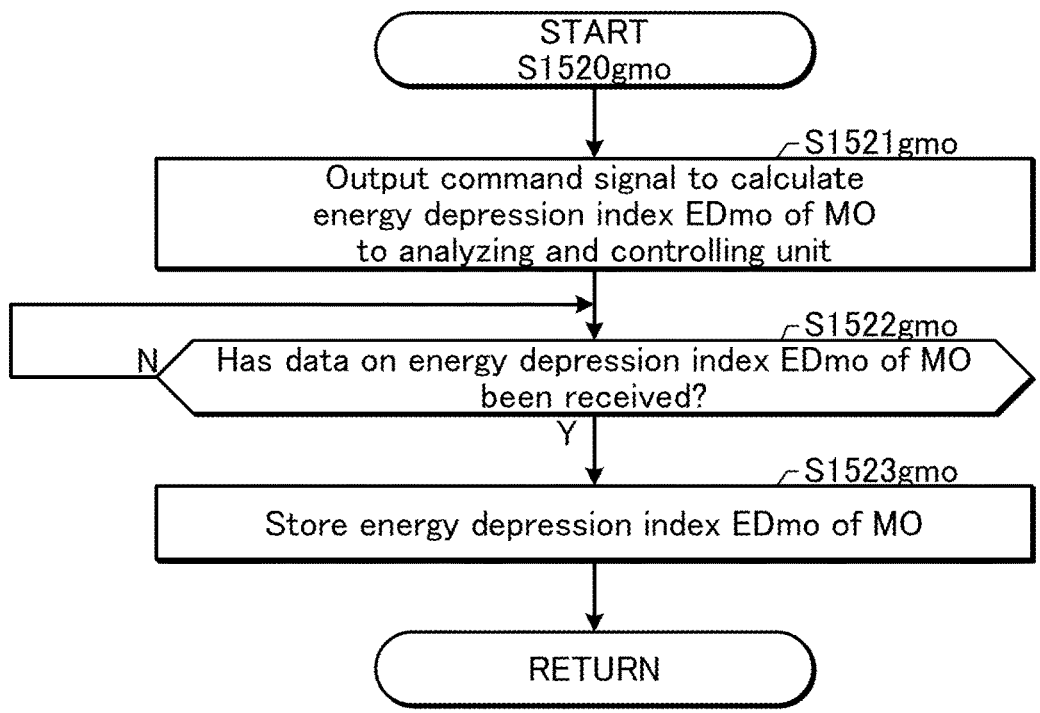
FIG. 54 is a flowchart showing a process to read an energy depression index shown in FIG. 50.

FIG. 54 is a flowchart showing a process to read the energy depression index shown in FIG. 50. The process of FIG. 54 may be performed by the gas controller 32 as a subroutine of S1520gmo shown in FIG. 50.

The process of FIG. 54 may be substantially the same as the process in the second embodiment described with reference to FIG. 24 except that "gmo" is added to the last digit of each of the symbols each representing a step and "mo" is added to each of the reference symbols each representing an amount. The detailed description is thus omitted.

Figure 55:
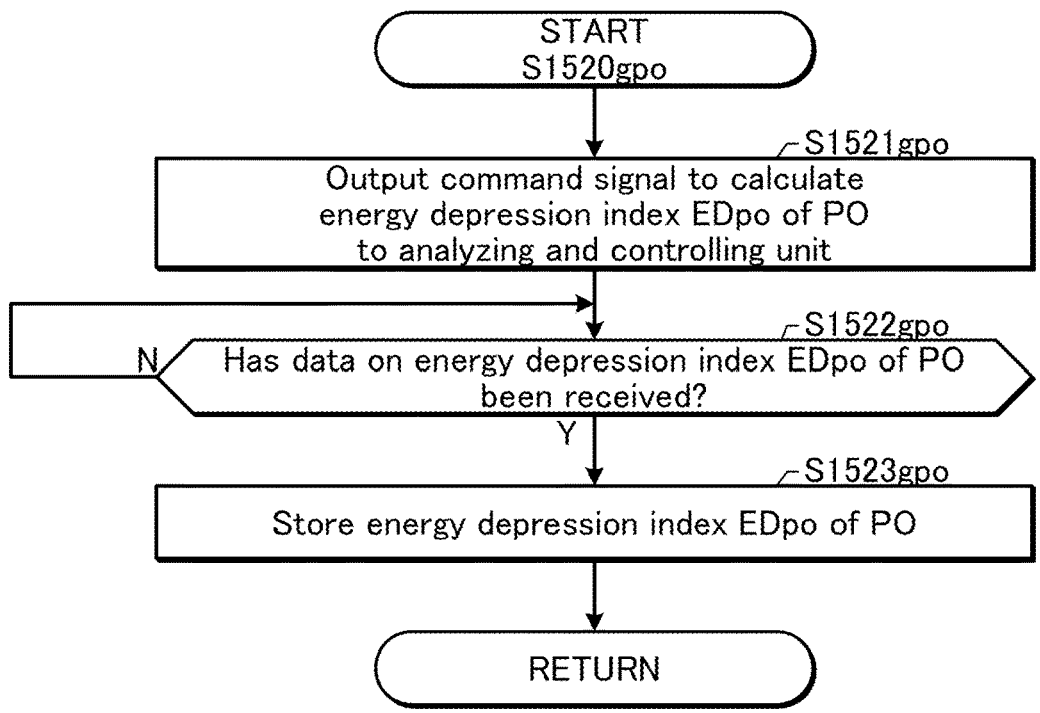
FIG. 55 is a flowchart showing a process to read an energy depression index shown in FIG. 51.

FIG. 55 is a flowchart showing a process to read the energy depression index shown in FIG. 51. The process of FIG. 55 may be performed by the gas controller 32 as a subroutine of S1520gpo shown in FIG. 51.

The process of FIG. 55 may be substantially the same as the process in the second embodiment described with reference to FIG. 24 except that "gpo" is added to the last digit of each of the symbols each representing a step, and "po" is added to each of the reference symbols each representing an amount. The detailed description is thus omitted.

5.3 Effect

As described above, the excimer laser apparatus of the third embodiment may detect the energy depression of the output of the MO and the PO. The third embodiment may then perform the control for reducing the energy depression of the MO or the PO based on the detected result.

Detecting the energy depression of the MO and that of the PO may be performed in parallel (FIG. 27). Alternatively, detecting the energy depression may be performed for the PO at first, and then be performed for the MO if the number of times Npod of detecting the energy depression of the PO is equal to or larger than a predetermined value (FIG. 31). If the number of times Npod of detecting the energy depression of the PO is smaller than the predetermined value, it may be conceivable that none of the MO and the PO has a trouble. In that case, detecting the energy depression of the MO may be omitted.

If the number of times Nmod of detecting the energy depression of the MO is equal to or larger than a predetermined value, the control for reducing the energy depression of the MO may be performed at first regardless of the number of times Npod of detecting the energy depression of the PO (FIG. 34). If the number of times Npod of detecting the energy depression of the PO is equal to or larger than the predetermined value and the number of times Nmod of detecting the energy depression of the MO is smaller than the predetermined value, the control for reducing the energy depression of the PO may be performed (FIG. 35). According to this, even if it is not clear whether the energy depression of the PO is caused by a trouble in the MO alone or troubles in both the MO and the PO, the energy depression may be reduced.

The control for reducing the energy depression of the MO may be performed with injection locking of the MO and the PO (FIG. 44). The control for reducing the energy depression of the PO may be performed with synchronizing oscillation of the MO and the PO (FIG. 45). Alternatively, the control for reducing the energy depression of the MO may be performed while the MO is driven alone without oscillation of the PO (FIG. 46). The control for reducing the energy depression of the PO may be performed while the PO is driven alone without oscillation of the MO (FIG. 47).

6. Configuration of Controller

Figure 56:
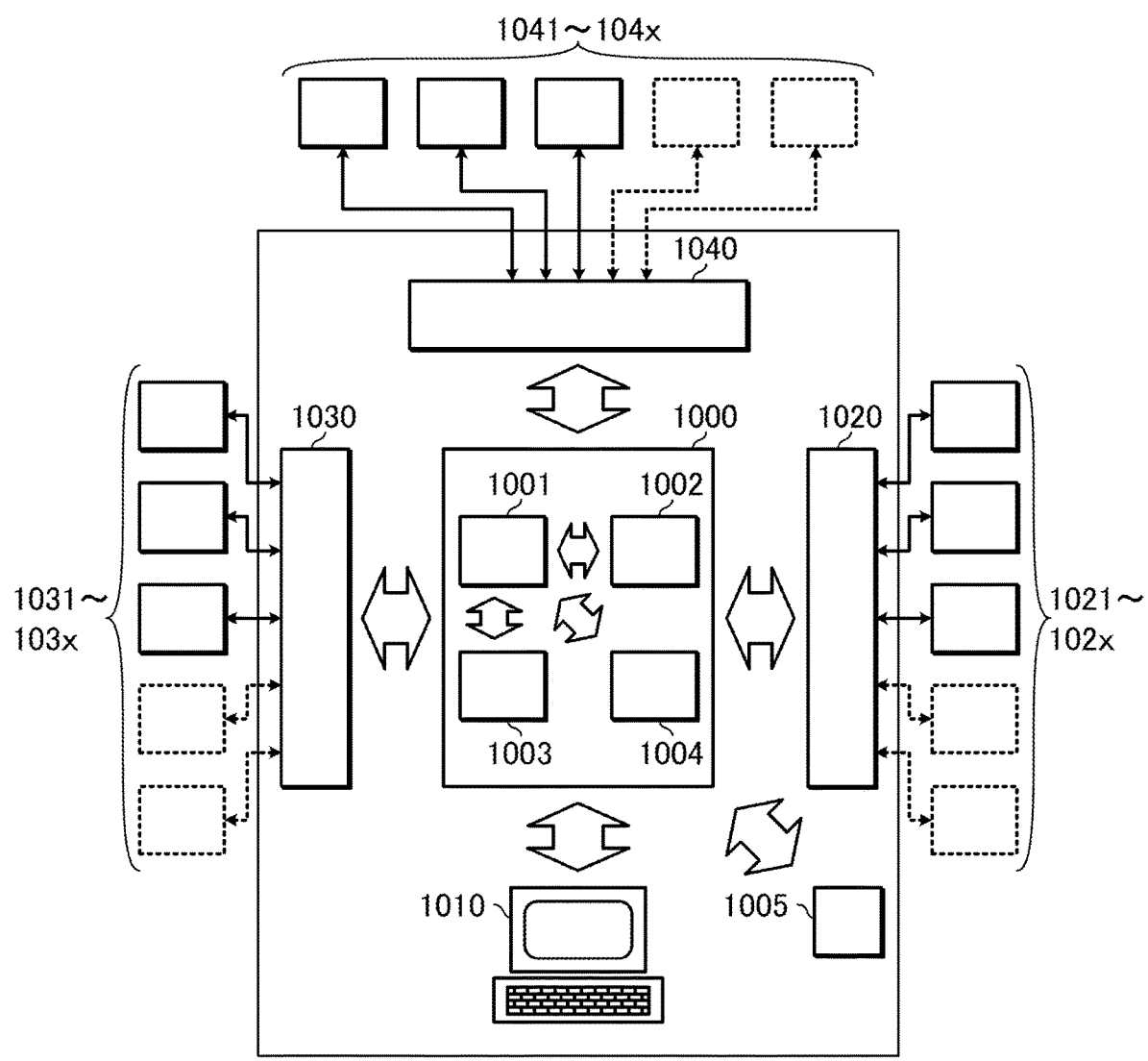
FIG. 56 is a block diagram showing a general configuration of a controller.

FIG. 56 is a block diagram showing a general configuration of a controller.

Controllers of the above-described embodiments, such as the laser controller 30, the gas controller 32, and the analyzing and controlling unit 33, may be configured by general-purpose control devices, such as computers or programmable controllers. For example, the controllers may be configured as follows.

Configuration

The controllers may each be configured by a processor 1000, and a storage memory 1005, a user interface 1010, a parallel input/output (I/O) controller 1020, a serial I/O controller 1030, and an analog-to-digital (A/D) and digital-to-analog (D/A) converter 1040 which are connected to the processor 1000. The processor 1000 may be configured by a central processing unit (CPU) 1001, and a memory 1002, a timer 1003, and a graphics processing unit (GPU) 1004 which are connected to the CPU 1001.

Operation

The processor 1000 may read a program stored in the storage memory 1005, execute the read program, read data from the storage memory 1005 in accordance with the program, or store data in the storage memory 1005.

The parallel I/O controller 1020 may be connected to devices 1021 to 102x with which it may communicate through parallel I/O ports. The parallel I/O controller 1020 may control digital-signal communication through the parallel I/O ports while the processor 1000 executes the program.

The serial I/O controller 1030 may be connected to devices 1031 to 103x with which it may communicate through serial I/O ports. The serial I/O controller 1030 may control digital-signal communication through the serial I/O ports while the processor 1000 executes the program.

The A/D and D/A converter 1040 may be connected to devices 1041 to 104x with which it may communicate through analog ports. The A/D and D/A converter 1040 may control analog-signal communication through the analog ports while the processor 1000 executes the program.

The user interface 1010 may be configured to display the progress of the program being executed by the processor 1000 in accordance with instructions from an operator, or to allow the processor 1000 to stop the execution of the program or perform an interrupt in accordance with instructions from the operator.

The CPU 1001 of the processor 1000 may perform arithmetic processing of the program. The memory 1002 may temporarily store the program being executed by the CPU 1001 or temporarily store data in the arithmetic processing. The timer 1003 may measure time or elapsed time and output it to the CPU 1001 in accordance with the program being executed. When image data is inputted to the processor 1000, the GPU 1004 may process the image data in accordance with the program being executed and output the results to the CPU 1001.

The devices 1021 to 102x, which are connected through the parallel I/O ports to the parallel I/O controller 1020, may be the exposure apparatus 100 to send the oscillation trigger signal or the setting signal of the target value of the pulse energy, other controllers, or the like. The devices 1021 to 102x may also be the charger 12 to receive the setting signal of the charging voltage, the valve B-V, F2-V, or EX-V, or the like.

The devices 1031 to 103x, which are connected through the serial I/O ports to the serial I/O controller 1030, may be the rotating speed controller 31 to receive the setting signal of the rotating speed of the motor 22, or the like.

The devices 1041 to 104x, which are connected through the analog ports to the A/D and D/A converter 1040, may be various sensors such as the chamber pressure sensor 16, the optical sensor 17c, or the like.

The controllers thus configured may be capable of realizing the operations described in the embodiments.

The above descriptions are intended to be only illustrative rather than being limiting. Accordingly, it will be clear to those skilled in the art that various changes may be made to the embodiments of the present disclosure without departing from the scope of the appended claims.

The terms used in this specification and the appended claims are to be interpreted as not being limiting. For example, the term "include" or "included" should be interpreted as not being limited to items described as being included. Further, the term "have" should be interpreted as not being limited to items described as being had. Furthermore, the modifier "a" or "an" as used in this specification and the appended claims should be interpreted as meaning "at least one" or "one or more".

The invention claimed is:

1. An excimer laser apparatus comprising:
   an optical resonator;
   a chamber including a pair of discharge electrodes, the chamber being provided in the optical resonator and configured to store laser gas;
   an electric power source configured to receive a trigger signal and apply a pulsed voltage to the pair of discharge electrodes based on the trigger signal;
   an energy monitor configured to measure pulse energy of a pulse laser beam outputted from the optical resonator;
   a unit for adjusting partial pressure of halogen gas configured to perform exhausting a part of the laser gas stored in the chamber and supplying laser gas to the chamber; and
   a controller configured to acquire measurement results of the pulse energy measured by the energy monitor, detect energy depression based on the measurement results of the pulse energy, and control the unit for adjusting partial pressure of halogen gas based on results of detecting the energy depression to adjust the partial pressure of halogen gas in the chamber,
   wherein the controller decreases the partial pressure of halogen gas in the chamber so as to suppress an occurrence of the energy depression.

2. The excimer laser apparatus according to claim 1, wherein the controller decreases a partial pressure of halogen gas in the chamber, and raises a range of the pulsed voltage applied to the pair of discharge electrodes.

3. The excimer laser apparatus according to claim 1, wherein the controller decreases a partial pressure of halogen gas in the chamber, and increases a gas pressure in the chamber.

4. The excimer laser apparatus according to claim 1, wherein the controller
   performs a comparison of the pulse energy of the pulse laser beam outputted from the optical resonator and a predetermined value for each pulse, and
   detects the energy depression based on results of the comparison.

5. The excimer laser apparatus according to claim 1, wherein the controller
   calculates an average and a standard deviation of values of the pulse energy of the pulse laser beam outputted from the optical resonator for a predetermined number of pulses, and
   detects the energy depression based on a ratio of the standard deviation to the average.

6. The excimer laser apparatus according to claim 1, wherein the controller
   calculates a cumulative energy of the pulse laser beam outputted from the optical resonator for a predetermined number of pulses, and
   detects the energy depression based on a ratio of the cumulative energy to a target value of the cumulative energy.

7. The excimer laser apparatus according to claim 1, wherein the controller detects the energy depression based on an energy depression index,
   the energy depression index being calculated based on
      a difference between the pulse energy of the pulse laser beam outputted from the optical resonator and a target value of the pulse energy, and
      a frequency of the pulse energy.

8. The excimer laser apparatus according to claim 1, further comprising
   a fan configured to circulate the laser gas in the chamber, wherein the controller performs
      a first mode to allow the pulse laser beam outputted from the optical resonator to be outputted outside of the excimer laser apparatus with a rotating speed of the fan being set to a first rotating speed, and
      a second mode to acquire measurement results of the pulse energy measured by the energy monitor with a rotating speed of the fan being set to a second rotating speed lower than the first rotating speed, and to detect the energy depression based on the measurement results of the pulse energy.

9. The excimer laser apparatus according to claim 8, wherein the controller
   controls the unit for adjusting the partial pressure of halogen gas such that the partial pressure of halogen gas in the chamber is set to a first value, sets the rotating speed of the fan to the second rotating speed, and acquires the measurement results of the pulse energy,
   sets, if a frequency of the energy depression is lower than a predetermined value, the partial pressure of halogen gas in the chamber to the first value to perform the first mode, and
   controls, if the frequency of the energy depression is equal to or higher than the predetermined value, the unit for adjusting the partial pressure of halogen gas such that the partial pressure of halogen gas in the chamber is set to a second value lower than the first value.

10. The excimer laser apparatus according to claim 9, wherein the controller
    acquires measurement results of the pulse energy with the rotating speed of the fan being set to the first rotating speed, and
    acquires, if the frequency of the energy depression is lower than the predetermined value, measurement results of the pulse energy with the rotating speed of the fan being set to the second rotating speed.

11. The excimer laser apparatus according to claim 9, wherein the first value and the second value of the partial pressure of halogen gas are in a range from 0.13 kPa to 0.18 kPa.

12. The excimer laser apparatus according to claim 8, wherein the first rotating speed and the second rotating speed of the fan are in a range from 4000 rpm to 5000 rpm.

13. An excimer laser apparatus comprising:
    an optical resonator;
    a chamber including a pair of discharge electrodes, the chamber being provided in the optical resonator and configured to store laser gas;

a fan configured to circulate the laser gas in the chamber;

an electric power source configured to receive a trigger signal and apply a pulsed voltage to the pair of discharge electrodes based on the trigger signal;

an energy monitor configured to measure pulse energy of a pulse laser beam outputted from the optical resonator; and a controller configured to perform
- a first mode to allow the pulse laser beam outputted from the optical resonator to be outputted outside of the excimer laser apparatus with a rotating speed of the fan being set to a first rotating speed, and
- a second mode to acquire measurement results of the pulse energy measured by the energy monitor with a rotating speed of the fan being set to a second rotating speed lower than the first rotating speed, and to detect energy depression based on the measurement results of the pulse energy.

14. An excimer laser apparatus comprising:

a first optical resonator;

a first chamber including a first pair of discharge electrodes, the first chamber being provided in the first optical resonator and configured to store laser gas;

a first electric power source configured to receive a first trigger signal and apply a pulsed voltage to the first pair of discharge electrodes based on the first trigger signal;

a first energy monitor configured to measure first pulse energy of a first pulse laser beam outputted from the first optical resonator;

a second optical resonator which the first pulse laser beam enters;

a second chamber including a second pair of discharge electrodes, the second chamber being provided in the second optical resonator and configured to store laser gas;

a second electric power source configured to receive a second trigger signal and apply a pulsed voltage to the second pair of discharge electrodes based on the second trigger signal;

a second energy monitor configured to measure second pulse energy of a second pulse laser beam outputted from the second optical resonator;

a unit for adjusting partial pressure of halogen gas configured to perform
- exhausting a part of the laser gas stored in the first chamber and supplying laser gas to the first chamber, and
- exhausting a part of the laser gas stored in the second chamber and supplying laser gas to the second chamber; and a controller configured to
- detect energy depression of the first chamber based on measurement results of the first pulse energy measured by the first energy monitor, and control the unit for adjusting partial pressure of halogen gas based on results of detecting the energy depression of the first chamber to adjust the partial pressure of halogen gas in the first chamber, and
- detect energy depression of the second chamber based on measurement results of the second pulse energy measured by the second energy monitor, and control the unit for adjusting partial pressure of halogen gas based on results of detecting the energy depression of the second chamber to adjust the partial pressure of halogen gas in the second chamber, wherein the controller
- detects a second frequency of the energy depression of the second chamber based on the measurement results of the second pulse energy measured by the second energy monitor, and determines whether the second frequency is equal to or higher than a third predetermined value, and
- detects, if the second frequency of the energy depression of the second chamber is equal to or higher than the third predetermined value, a first frequency of the energy depression of the first chamber based on the measurement results of the first pulse energy measured by the first energy monitor, and determines whether the first frequency is equal to or higher than a fourth predetermined value.

15. The excimer laser apparatus according to claim 14, wherein the controller
- controls, if the first frequency of the energy depression of the first chamber is equal to or higher than the fourth predetermined value and the second frequency of the energy depression of the second chamber is equal to or higher than the third predetermined value, the unit for adjusting the partial pressure of halogen gas to adjust the partial pressure of halogen gas in the first chamber, and
- controls, if the first frequency of the energy depression of the first chamber is lower than the fourth predetermined value and the second frequency of the energy depression of the second chamber is equal to or higher than the third predetermined value, the unit for adjusting the partial pressure of halogen gas to adjust the partial pressure of halogen gas in the second chamber.

* * * * *